United States Patent [19]
Lowry

[11] Patent Number: 5,664,177
[45] Date of Patent: Sep. 2, 1997

[54] DATA PROCESSING SYSTEM HAVING A DATA STRUCTURE WITH A SINGLE, SIMPLE PRIMITIVE

[75] Inventor: Edward S. Lowry, Acton, Mass.

[73] Assignee: Digital Equipment Corporation, Maynard, Mass.

[21] Appl. No.: 181,105

[22] Filed: Apr. 13, 1988

[51] Int. Cl.[6] .................................................. G06F 17/30
[52] U.S. Cl. ........................................................ 395/611
[58] Field of Search ................................. 364/200, 900, 364/DIG. 1, DIG. 2; 395/600, 611

[56] References Cited

U.S. PATENT DOCUMENTS

| | | | |
|---|---|---|---|
| 4,183,083 | 1/1980 | Chatfield | 364/200 |
| 4,462,077 | 7/1984 | York | 364/200 |
| 4,511,958 | 4/1985 | Funk | 364/200 |
| 4,583,164 | 4/1986 | Tolle | 364/200 |
| 4,631,664 | 12/1986 | Bachman | 364/200 |
| 4,635,189 | 1/1987 | Kendall | 364/200 |
| 4,649,479 | 3/1987 | Advani et al. | 364/200 |
| 4,774,661 | 9/1988 | Kumpati | 364/300 |
| 4,791,561 | 12/1988 | Huber | 364/300 |
| 4,805,134 | 2/1989 | Calo et al. | 364/900 |

FOREIGN PATENT DOCUMENTS 0251461   1/1988   European Pat. Off. .

OTHER PUBLICATIONS

Van Horn, "Expressing Product Development Information In Application Terms," Proc. ICCD '85, pp. 82–85 (Oct. 7–10, 1985).
Charts and text used during a presentation by Ed Lowry in May 1985 to two groups at MCC.
Dawn language reference manual (Dec. 1982) (CR. 1983), Lowry et al.
Dawn Specification (Sep. 1982) (CR. 1983), Lowry et al.
Dawn (CR. 1983), Lowry et al.
P155 Computer Assisted Instruction CAI, No Date, Lowry et al.
A Comparison between Dawn and Prolog (E. Lowry Nov. 1982).
Dawn examples compared with Sequel II (Updated Jan. 1981), Lowry et al.
Potential for a near–universal data model and formal language (E. Lowry Sep. 1983).
Nodes and Arcs the Ideal Primitive Data Structures, E. Lowry, Digital Equipment Corporation (Nov. 1980).
Prose Specification, E. Lowry Nov. 23, 1977.
N. Winterbottom, "General purpose database structure", IBM Technical Disclosure Bulletin, vol. 20, No. 8, Jan. 1978, pp. 3320–3323.
N. Winterbottom, "Integrated data dictionary for a database", IBM Technical Disclosure Bulletin, vol. 20, No. 8, Jan. 1978, pp. 3324–3327.
C.J. Date, "An introduction to database systems", vol. 1, 4th Ed., Addison–Wesley Publishing Co., 1986, pp. 503–540.
T.A. Gibson, et al, "Master links–A hierarchial data system", The Bell System Technical Journal, vol. 52, No. 10, Dec. 1973, AT&T, pp. 1691–1723.
R.A. Crus, et al, "Methods for deleting records from a hierarchial data base", IBM Technical Disclosure Bulletin, vol. 25, No. 11B, Apr. 1983, pp. 5886–5888.
S. Sem–Sanberg, "Pluto, a data base management system", Ericsson Technics, vol. 26, No. 3, 1970, p. 131–156.
J.D. Ullman, "Principles of Database Systems", Pitman, 1980, pp. 30–51.

*Primary Examiner*—Thomas G. Black
*Assistant Examiner*—Maria N. Von Buhr
*Attorney, Agent, or Firm*—Kenneth F. Kozik

[57] ABSTRACT

A data structure in a computer memory is constructed from a single primitive data element or attribute. Attributes of the data structure are arranged in accordance with certain rules which impose a hierarchical organization upon the attributes as well as non-hierarchical relationships. The attributes may be created and erased by a data processing system containing the memory.

29 Claims, 32 Drawing Sheets

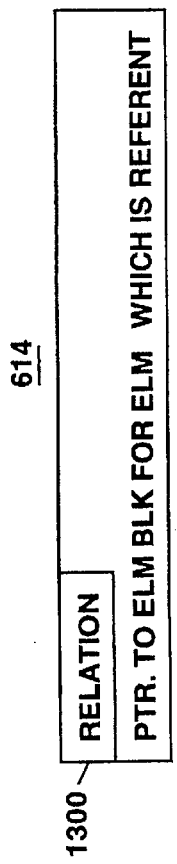
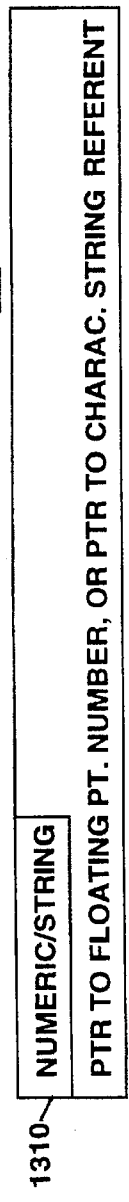
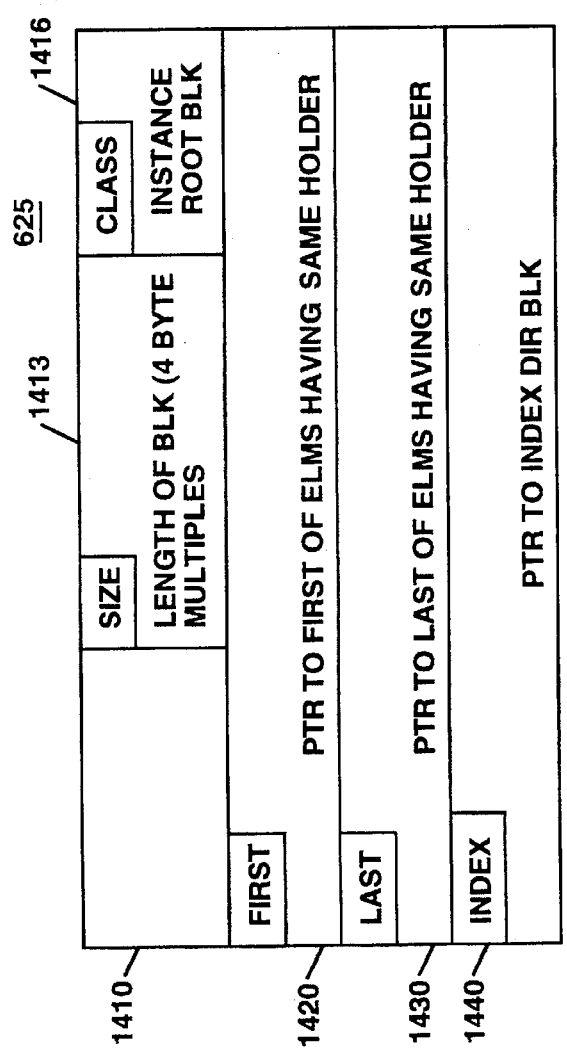
Figure 13A
Figure 13B
Figure 14

| | 1703 | | 712 | | 1706 |
|---|---|---|---|---|---|
| | SIZE | LENGTH OF BLK (4 BYTE MULTIPLES) | | CLASS | ELM. TYPE BLK. |

1700

1710 — NODE FORM — WHETHER ELEMENTS OF THIS TYPE ARE ORDERED

1720 — NAME — PTR TO SYM TABLE - IDENTIFIER FOR ELEMENT TYPE

— INSTANCE LENGTH — LENGTH OF ELM BLK IN ATTRIBUTE FILE FOR ELMS OF THIS TYPE

1730

1740 — NEXT — PTR TO "NEXT" ELM TYPE BLK FOR ELEMENTS OF SAME CONTEXT

1750 — CONTEXT — PTR TO CONTEXT BLK FOR CONTEXT IN WHICH ELMS OF THIS TYPE ARE FOUND

1760 — INSTANCES — PTR TO ATTRIBUTE FILE INSTANCES BLK WITH PTR TO ELM BLKS OF THIS TYPE

1770 — ATTRIBUTE — PTR TO ATTRIBUTE TYPE FOR ATTRIBUTE TYPES OF THIS ELM. TYPE

| USER COUNT | — 3005 |
| --- | --- |
| ROLLBACK VERSION NO. | — 3010 |
| ROLLBACK VERSION PTR. | — 3015 |
| NEXT VERSION NO. | — 3020 |
| NEXT VERSION PTR. | — 3025 |
| CURRENT VERSION NO. | — 3030 |
| CURRENT VERSION PTR. | — 3035 |
| OLDEST VERSION NO. | — 3040 |
| OLDEST VERSION PTR. | — 3045 |
| INITIAL VERSION NO. | — 3050 |

| VERSION NO. | — 3110 |
| --- | --- |
| VERSION USE-COUNT | — 3120 |
| NEWER VERSION | — 3130 |
| OLDER VERSION | — 3140 |
| VERSION LAST CHANGE | — 3150 |
| FIRST ATTRIBUTE (ATT.) SWITCH (SWT.) | — 3160 |
| FIRST INDEX SWT. | — 3165 |
| VERSION HIGHEST ATT. MPAGE NO. | — 3170 |
| VERSION HIGHEST SNP. MPAGE NO. | — 3175 |
| VERSION HIGHEST NDX MPAGE NO. | — 3180 |
| VERSION HIGHEST SNAPSHOT MPAGE NO. | — 3185 |

*Figure 31*

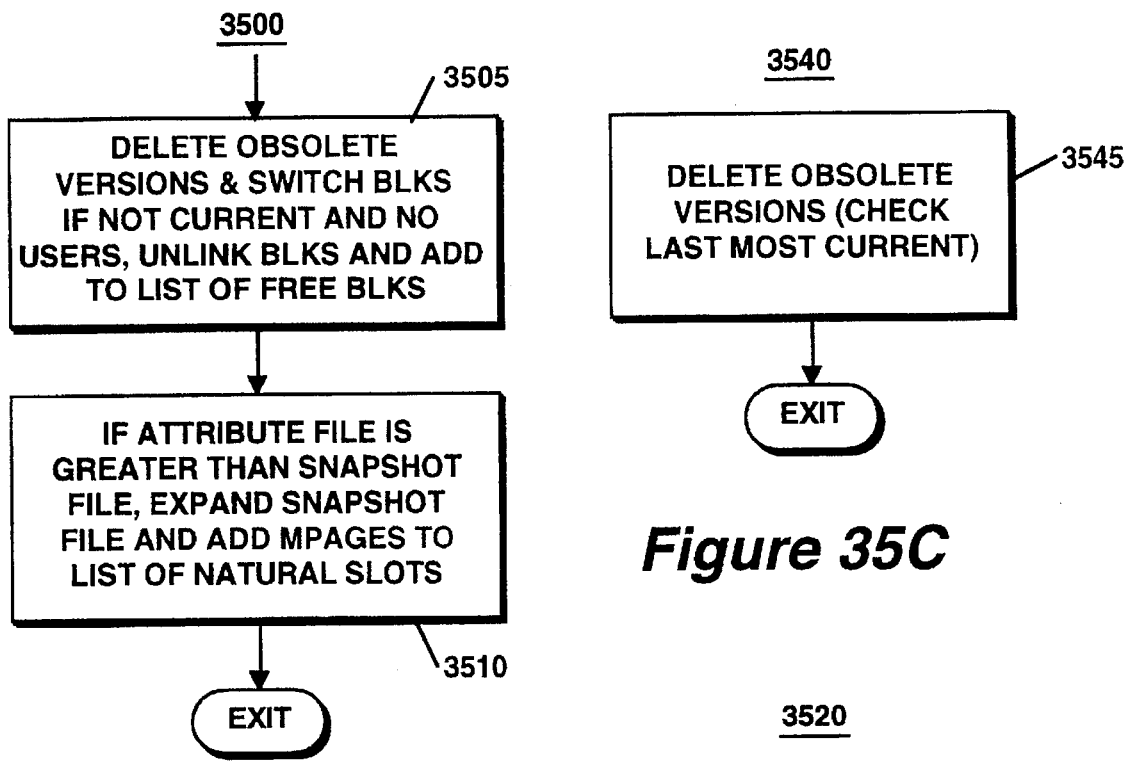
*Figure 35A*
*Figure 35C*
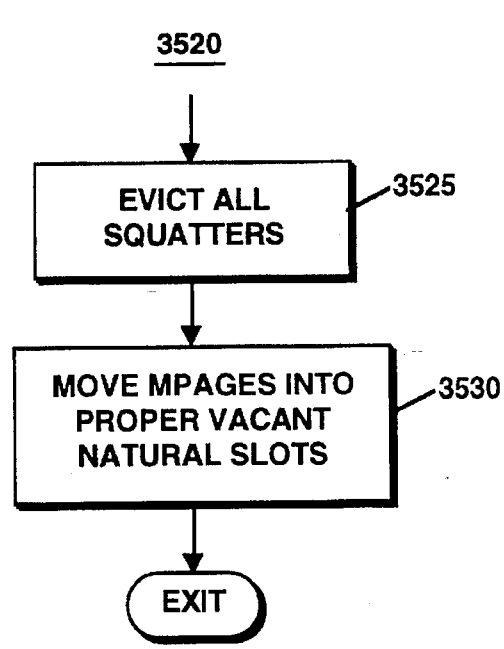
*Figure 35B*

DATA PROCESSING SYSTEM HAVING A DATA STRUCTURE WITH A SINGLE, SIMPLE PRIMITIVE

RELATED APPLICATION

This application is related to U.S. Ser. No. 07/185,095, entitled "Method of Integrating Software Application Programs Using An Attributive Data Model Database" by Edward S. Lowry, Earl C. Van Horn, and David M. Nixon, filed on Apr. 13, 1988, which issued as U.S. Pat. No. 4,864,497 on Sep. 5, 1989.

BACKGROUND OF THE INVENTION

This invention relates to software and more specifically to data models as they are used to represent information in application programs and databases.

Software systems, especially large ones, suffer from a variety of problems in their development, use, and adaption to new requirements. Programs tend to be complex and obscure. Interfaces to functionality tend to be numerous, specialized, and hard to coordinate. Data structures tend to reflect indirectly the information they represent. Independently developed data structures and applications tend to interact only with the help of elaborate conversion subsystems.

The choice and variety of data models used can affect the severity experienced with these problems. A data model is that part of a language (i.e., a type of interface to functionality) which defines the permissible structures for subject matter of the language. For example, operations described using relational database languages necessarily talk about tables of tuples. Programs written in APL necessarily talk about integer indexed arrays. Programs written in PL/1 talk about a wider variety of data structures, composed from records, arrays, pointers, strings, etc.

Languages tend to have one of two general kinds of data models, each with different limitations. Some languages such as relational database languages and APL are "functionally expressive." They can be used to express many operations on large aggregates of data all in a single statement. However, each such language has a very limited range of data structures allowing accurate representation of conceptual structures for only a narrow class of applications. Operations in such languages tend to be complicated by a need to deal with special conventions used to adapt the conceptual structures of the application to the limited available data structures in the language.

Other languages such as PL/1 and COBOL have a greater ability to represent rich structures accurately. They may be described as "structurally expressive." However, the variety of elementary data structures used in such a language makes it impractical to also provide powerful nested operations on large data aggregates within a language of manageable size. The lack of powerful operations leads to complications of expression in the language of a different kind.

One object of the present invention is to provide a data model on which it is possible to design interfaces to functionality which largely eliminates both those kinds of complication.

It is also an object of the present invention to simplify interfaces to functionality.

SUMMARY OF THE INVENTION

To achieve the foregoing objects, and in accordance with the purpose of the invention as embodied and broadly described herein, a data structure is constructed from a single primitive data object, the attribute, to provide functional expressiveness. Structural expressiveness is achieved by making that primitive data object extremely simple and allowing for highly unconstrained interconnections between attribute instances.

More specifically, the data structure of the present invention resides in a memory of a data processing system for access by an application program being executed by the data processing system. The data structure comprises a plurality of attribute data objects stored in the memory.

The data structure further comprises a single holder attribute data object for each of the attribute data objects. Each of the holder attribute data objects is chosen from the plurality of attribute data objects such that a being-held relationship exists between each attribute data object and its holder attribute data object and such that a hierarchy of the attribute data objects is established by ensuring that each of the attribute data objects has a being-held relationship with only a single other attribute data object.

The data structure also comprises a single referent attribute data object for selected ones of the attribute data objects. A referent attribute data object is nonhierarchically related to the holder attribute data object of the same attribute data objects. Those attribute data objects with only holder attribute data objects are called "element data objects," and those attribute data objects also pointing to referent attribute data objects are called "relation data objects."

The data structure further includes an apex data object stored in the memory. The apex data object has no being-held relationship with any attribute data object, however, at least one attribute data object has a being-held relationship with the apex data object.

In connection with the above-described data structure, the present invention also includes methods for creating attribute data objects for storage in the memory, and for retrieving attribute data objects.

The accompanying drawings, which are incorporated in and which constitute a part of this specification, illustrate an embodiment of the invention and, together with the description, explain the principles of the invention.

BRIEF DESCRIPTION OF THE DRAWINGS

FIGS. 13A and 13B show block diagrams of the preferred embodiments of two kinds of plural relation sub-blocks shown in FIG. 8;

FIG. 14 shows a block diagram of the preferred embodiment of an instance root block shown in FIG. 8;

FIG. 17 shows a block diagram of a preferred embodiment of an element type block shown in FIG. 15;

FIG. 30 shows a block diagram of a preferred embodiment of the pointer/counter section of a controller shown in FIG. 29;

FIG. 31 shows a block diagram of version blocks shown in FIG. 29;

FIGS. 35A, 35B and 35C show flow diagrams of the procedures followed in the initial, intermediate and final housekeeping steps, respectively, of the COMMIT routine shown in FIG. 34.

DESCRIPTION OF THE PREFERRED EMBODIMENTS

Reference will now be made in detail to presently preferred embodiments of this invention, examples of which are illustrated in the accompanying drawings.

A. Common Database Structure

Figure 1:
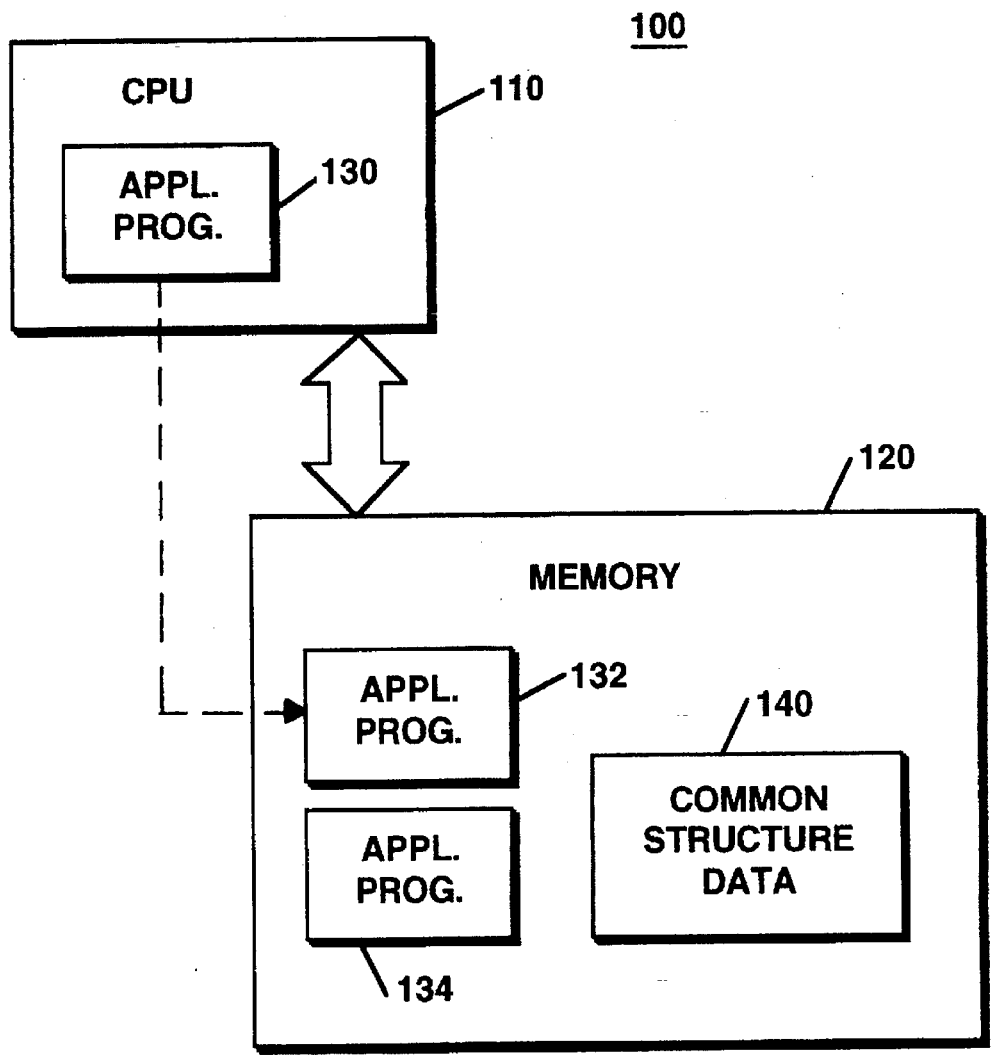
FIG. 1 shows an example of a data processing system in accordance with the present invention.

FIG. 1 shows a picture of a data processing system 100 including a central processing unit (CPU) 110 and a memory 120. CPU 110 can be any standard and commonly known central processing unit, and memory 120 can include magnetic core, semiconductor RAM, magnetic disks and magnetic tapes, or any other known memory device. CPU 110 can also represent several independently running central processing units which may be executing application programs simultaneously. As shown in FIG. 1, application programs 130, 132, and 134 are alternately executed by CPU 110. FIG. 1 shows CPU 110 executing application program 130 while application programs 132 and 134 are stored in memory 120.

In accordance with the present invention, application programs 130, 132, and 134 share a common data structure 140 which is based upon an Attributive data model. The Attributive data model represents all of the information accessed by application programs 130, 132 and 134 as various combinations of a single primitive. In general, application programs 130, 132, and 134 have their own databases which contain data either in the Attributive data model's format or in some other format. If the application program information is not in the Attributive data model format, it is converted into that format by means described below. In this manner, data structure 140 can be accessed by each of the application programs 130, 132, and 134.

The common data structure 140 is different from more conventional database systems by the unique data structures which are created and accessed by the application programs. The Attributive data model uses, as its single primitive, an attribute or attribute data object which contains certain hierarchical information about its relationship with other attributes, and which can "point to" attributes to reflect a nonhierarchical relationship. The use of the attributes in accordance with the present invention is limited by the use of certain simple rules. This limited number of rules allows the attributes the flexibility to accurately represent complex objects and relationships.

Figure 2:
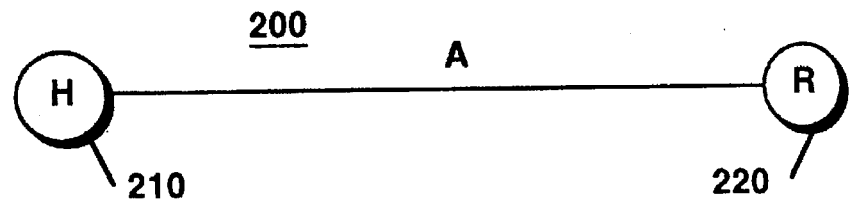
FIG. 2 shows an example of an attribute data object as taught by the present invention.

FIG. 2 shows an example of an attribute data object 200. Attribute data object 200's hierarchical relationship with other attribute data objects is denoted as a holding or being-held relationship, depending upon how the relationship is considered. In general, each attribute data object can have a being-held relationship with (i.e., can be held by) only one other attribute data object, but each attribute data object can have a holding relationship with (i.e., can hold) several other attribute data objects.

Each attribute data object 200 is related hierarchically to a holder attribute data object 210. Holder attribute data object 210 is the attribute data object which has a holding relationship with attribute data object 200. Conversely, attribute data object A 200 has a being-held relationship with attribute data object 210.

The nonhierarchical or pointing relationship describes the relationships between the information represented by attribute data objects. Certain attribute data objects may also be related to a single referent attribute data object to reflect the pointing relationship. A referent attribute data object 220 represents the information which has a nonhierarchal relationship with the information represented by attribute data object 200.

Each attribute data object 200 may also be related to type data which describes the relationship between the attribute data object 200 and those attribute data objects for which attribute data object 200 has a holding relationship as well as the referent attribute data objects which attribute data object 200 "points to."

There are only a few rules which the attribute data objects must obey in accordance with this invention. Although each attribute data object may hold several other attribute data objects, each attribute data object can only have a being-held relationship with a single other attribute data object. Thus, each attribute data object has only one holder attribute data object.

One kind of attribute data object, the element data object or element, does not have a separate referent attribute data object because elements are considered to "point to" themselves, i.e., each element is its own referent. Another kind of attribute data object, the relation data object, is related to a single separate referent attribute data object. Each attribute data object may be a referent attribute data object for a plurality of attribute data objects.

Basic to the Attributive data model is the concept that the single primitive element, the attribute, can represent complex information in other databases. An attribute expresses the idea that one thing is attributed to another thing. For example, things normally attributed to an automobile include its color, its engine, and its owner. To organize complex databases around the attribute as a primitive represents the view that a database is basically a collection of attributions. Common data structure 140 is a concrete representation of that view.

As indicated, elements or element data objects are attribute data objects which refer to themselves, or in other words have only a holder attribute data object and no separate referent attribute data objects. An element can represent a thing, such as an automobile, an engine, a version of a multiplier circuit, or a signal. Elements which have a being-held relationship with an element can, for example, represent the internal structure of the thing represented by that element. For example, if an element represents an engine, other elements having a being-held relationship with the element representing the engine can include the pistons, the cylinders, and the rings.

Each embodiment of data structure 140 has one attribute data object which does not have a being-held relationship with another attribute data object. That attribute data object is called the apex or apex attribute data object and holds at least one other attribute data object. In addition to the requirement of a single apex attribute data object and the single holder for each attribute data object, each embodiment of data structure 140 has the configuration of attribute data objects in accordance with the invention such that it is possible, but not necessary, to create the configuration by starting with the apex and by adding the other attributes, one at a time, in a holding relationship. This restriction creates a hierarchy and prevents certain circular or loop configurations, such as when a first attribute data object has a holding relationship with a second attribute data object, which in turn has a holding relationship with a third attribute data object, which then has a holding relationship back with the first attribute data object. Such a configuration would not be hierarchical according to this invention.

The relation or relation data object, as explained above, is an attribute data object which is related to a referent attribute data object different from the attribute data object itself. Relations can have a being-held relationship with elements, for example, if an element represents a multiplier circuit, one relation can attribute to that element a previous version of the multiplier. In addition, relations can have holding and being-held relationships with other relations. For example, if a first relation attribute data object attributes a part number to a multiplier, that first relation attribute data object may hold a second relation attribute data object which attributes to the first relation attribute data object the date on which the part number was assigned to the multiplier.

Figure 3:
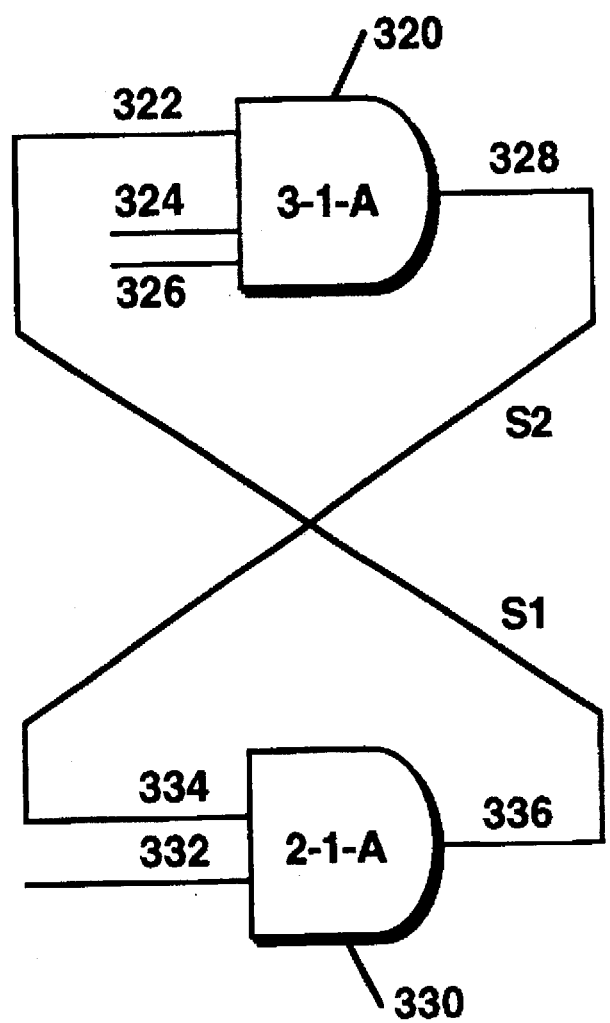
FIG. 3 shows a circuit for use in illustrating the use of the Attributive data model of the present invention.

The Attributive data model can be better understood by an example. FIG. 3 shows a circuit including two AND gates, 320 and 330, having three inputs and two inputs, respectively. The inputs of AND gate 320 are 322, 324, and 326, and the inputs of AND gate 330 are 332 and 334. Input 322 of AND gate 320 is driven by output 336 of AND gate 330, and input 334 of AND gate 330 is driven by output 328 of AND gate 320.

The circuit in FIG. 3 can be represented according to many different data models. For example, if it were represented by a relational data model, there would be separate tables for gates, inputs, and loads of the gates. Those tables would then contain identifiers of entries in the other tables.

Figure 4:
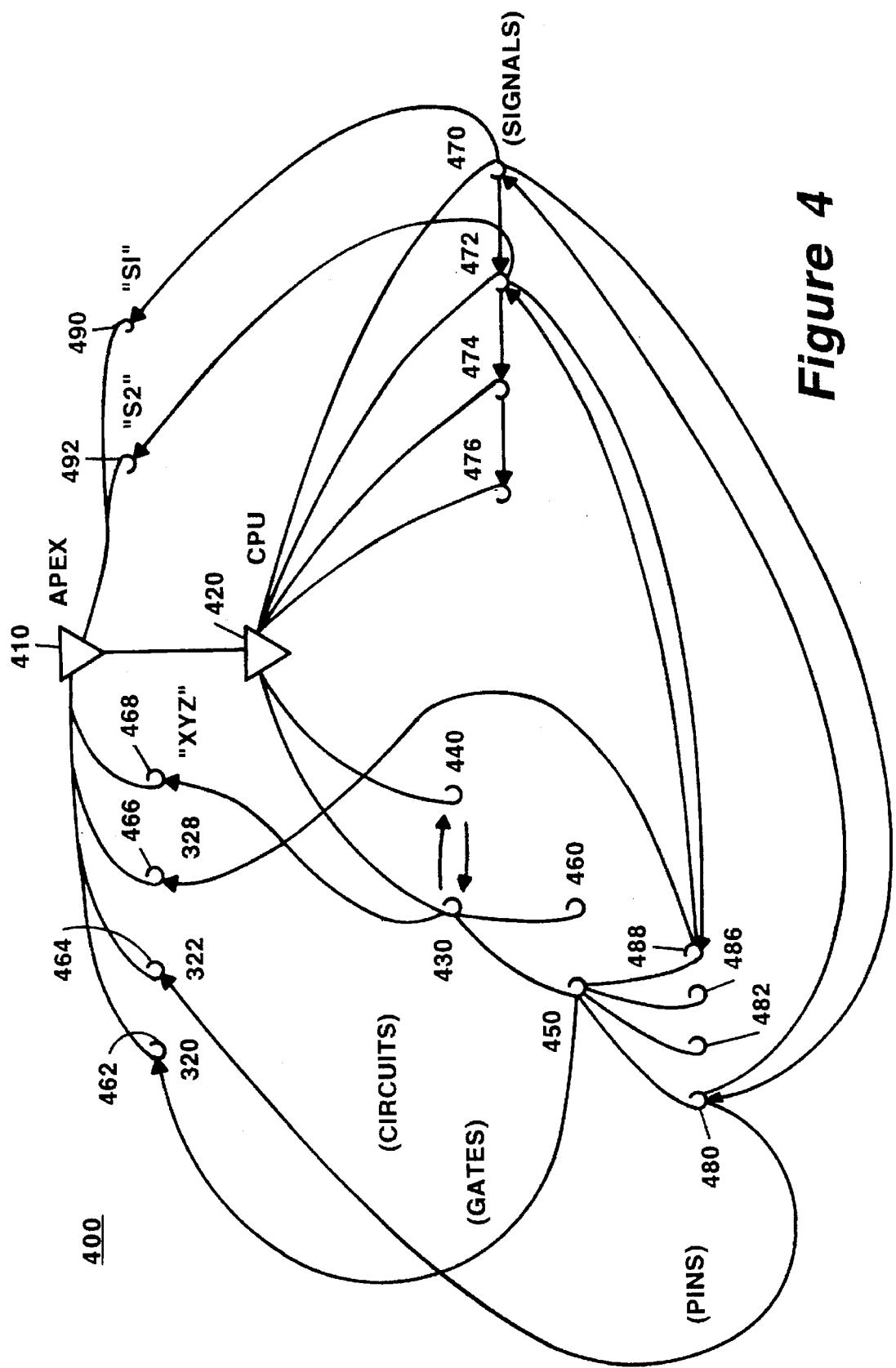
FIG. 4 shows a data structure for representing the circuit of FIG. 3 according to the Attributive data model.

FIG. 4 shows a data structure 400 representing the information in FIG. 3 in accordance with the Attributive data model of this invention. Data structure 400 can be stored in the common data structure 140 in FIG. 1.

Data structure 400 includes an apex 410 which, as described above, does not have a being-held relationship with any other object. In addition, apex 410 holds (i.e., has a holding relationship with) CPU attribute data object 420, which can also be a context. The context is a construct to facilitate naming of attribute data objects, because those names have meaning only in the context holding the named objects, and to establish holding relationships for attribute data objects that are associated with the context, like the circuits and signals in FIG. 3.

CPU attribute data object 420 holds attribute data objects 430 and 440 which are circuit elements. Attribute data object 430 represents the circuit in FIG. 3. Attribute data object 430 in turn holds two attribute data objects 450 and 460 which are gate elements. Gate element 450 in turn holds four attribute data objects 480, 482, 486 and 488 which are pin elements. In this way, a hierarchical holding relationship is imposed upon the information in FIG. 3.

As FIG. 4 shows, the other information from FIG. 3 is also hierarchically organized. Apex 410 also holds elements 462, 464, 466, 468, 490, and 492 representing labels for other elements, and attribute data object 420 (CPU element) holds elements 470, 472, 474, and 476 which represent signal elements.

The hierarchical arrangement of attribute data objects gives rise to a "containment tree," which is used to contain the attribute data objects that collectively represent conceptual objects. A containment tree of an attribute data object, called the root attribute data object or root of the containment tree, includes all attribute data object, held by the root (i.e., directly held), as well as all attribute data objects held by any other attribute data objects in the containment tree (i.e.,, indirectly held). An attribute data object held directly or indirectly by another attribute data object is said to be "contained" by that other attribute data object or in that other attribute data object's containment tree. In a containment tree, the conceptual object represented by that tree corresponds to the root. All other attribute data objects in the containment tree represent conceptual sub-objects, such as components, listed items, or relationships within the conceptual object represented by the tree. The attribute data objects in a containment tree may also represent relationships with attribute data objects outside the containment tree.

In FIG. 4, the containment tree for circuit element 430 would include gate elements 450 and 460, and the relation data objects held by gate elements 430, and 450 (i.e., the relation data objects pointing to elements 440 and 468 and the relation data object pointing to element 462), the elements held by element 450 (i.e., pin elements 480, 482, 486, and 488), and the relation data objects held by pin elements 480 and 488 (i.e., relation data objects pointing to elements 464, 470, 472 and 466).

The use of a containment tree, as explained in detail below, simplifies operations such as erasing complex objects. As an example, erasure of an object involves the removal from the common data structure of the corresponding containment tree. This invention allows all attribute data objects in that tree to be identified quickly, making feasible the elimination of random pauses caused by automatic garbage collection commonly used in prior art databases.

FIG. 4 also contains several other attribute data objects, which are representative of information describing each of the things in FIG. 3 represented in FIG. 4 by attribute data objects. For example, attribute data object 430 holds a relation data object pointing to the name "xyz." This relation data object has "xyz" as a referent attribute data object. The name "xyz" is element 468. In a similar matter, element 450 has a relation data object pointing to element 462, which is the number (320) of the AND gate in FIG. 3 represented by element 450.

FIG. 4 shows other relations as well. For example, elements 470, 472, 474, and 476, representing signals such as S1 and S2, are organized into a linked list which is represented by a series of relations. Furthermore, attribute data object 480 also holds a relation pointing to attribute data object 470 showing that the signal represented by that object is an input to the gate represented by object 450. The converse relationship is also represented by a relation held by element 470 pointing to element 480. The name of the signal represented by attribute data object 470 is reflected by the relation held by attribute data object 470 and pointing the attribute data object 490, which represents the label "S1."

Preferably, a simple constant, such as the integer 35 or the character "K," is an element and is represented by a single attribute data object held by the apex. A character string is also preferably an element held by the apex. The character string element, however, holds a list of relations to its constituent character objects. Thus, for example, the string "CAT" could be represented by an element data object which held first relations to three other element data objects or elements: the letters "C," "A" and "T." The ordering of those letter elements to form the character string "CAT" could be represented by second relations that organize the first relations into a list. For example, the relation from "CAT" to "C" would hold a relation whose referent data object is the relation from "CAT" to "A."

B. Software Utility Organization

Figure 5A:
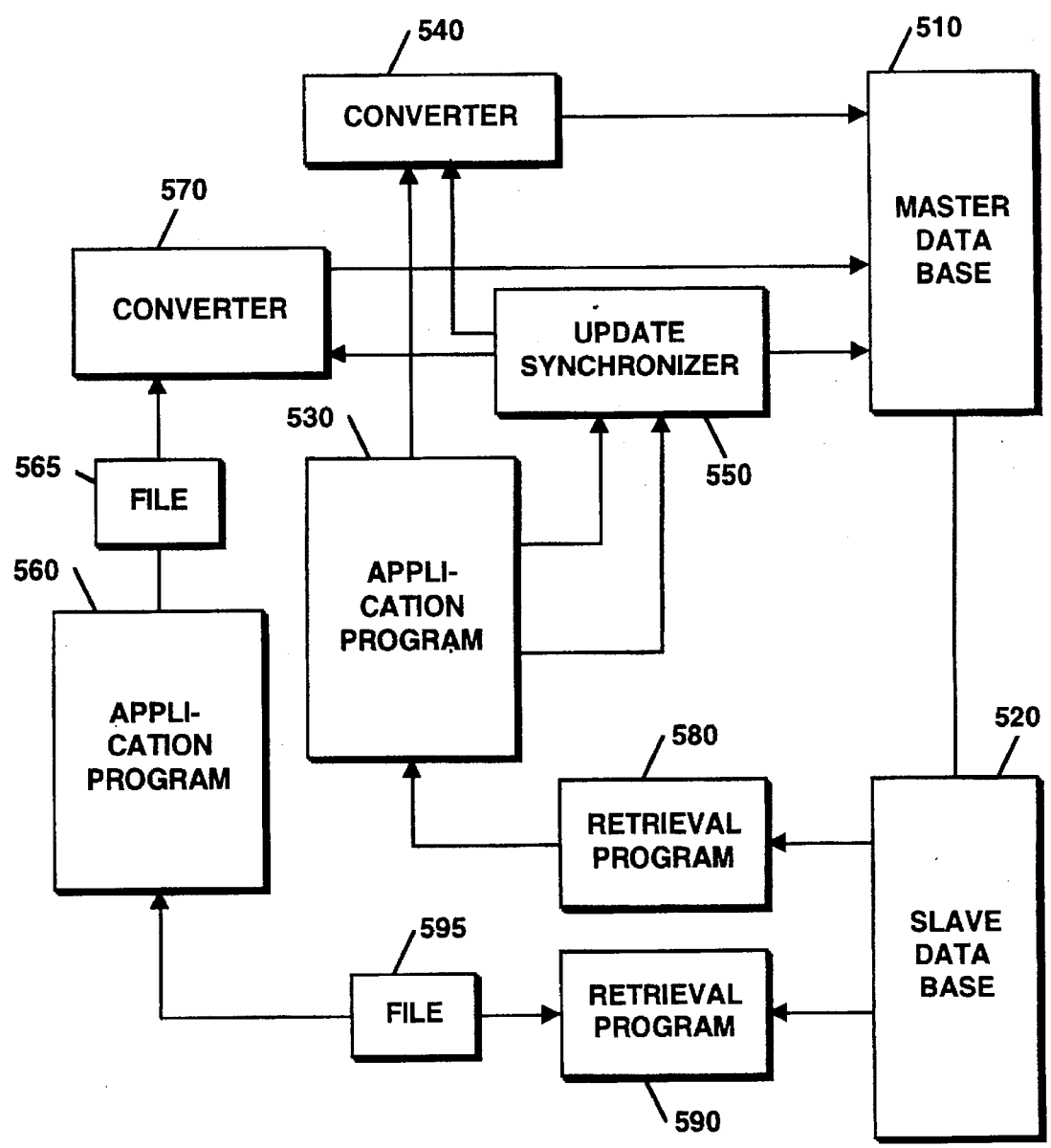
FIG. 5A shows a block diagram of certain components of a software system in accordance with the preferred embodiment of the present invention.

FIG. 5A shows a block diagram of certain components of a software system in accordance with the preferred embodiment of the present invention. The operation of certain of these components is presented in a later section. All that will be described with regard to FIG. 5A is the major functions of each one of the components and their relationship to other components.

Preferably, the common data structure 140 shown in FIG. 1 includes a master database 510 and a slave database 520. Any updates to the common data structure 140 are made to master database 510, and a copy of it is later made to form the next version of slave database 520.

In FIG. 5A, 530 and 560 represent two application programs, such as the application programs 130, 132 and 134 in FIG. 1. In accordance with the present invention, the data processing system includes means for retrieving from the common data structure the referent attribute data object for a specified relation data object. For application program 530 shown in FIG. 5A, retrieval program 580 performs such retreival function. The slave database 520 provides the actual data to the application programs 530 and 560.

The details of an exemplary embodiment of portions of a retrieval program 580 are discussed in a later section. In general, however, application program 530 specifies a relation data object to retrieval program 580 and asks for the referent data object(s) for that specified relation data object. Retrieval program 580 then searches the slave database 520 for the specified relation data object. When that specified relation data object is obtained, retrieval program 580 copies the desired referent attribute data object(s), performs any conversion necessary to place the referent data object into the format applicable for application program 530, and returns the formatted referent data object to application program 530.

The data structure of the present invention also includes means for retrieving from the common data structure all of those attribute data objects which have a being-held relationship with a specified attribute data object. Again, retrieval program 580 in the preferred embodiment shown in FIG. 5A performs this type of retrieval also. In operation, application program 530 specifies an attribute data object and asks for all those other attribute data objects which are held by the specified attribute data object. Retrieval program 580 then translates that request into an appropriate format, and searches through the slave database 520 until the specified attribute data object is located. Once the specified attribute data object is located, retrieval program 580 obtains copies of all of the attribute data objects which are held by that specified data object. Retrieval program 580 then converts those held attribute data objects into the format applicable for application program 530 and transmits those converted attribute data objects to application program 530.

In accordance with the present invention, the data processing system also includes means for retrieving from the common data structure information from all attribute data objects of a specified type. Retrieval program 580, in response to such a request from application program 530, searches the common data structure 140 in slave database 520 for all attribute data objects of the specified type. When those specified attribute data objects are found, the attribute data objects are extracted, converted into the appropriate format, and sent to retrieval program 580.

Preferably, retrieval program 590 performs the same functions as retrieval program 580. The only functional difference between retrieval programs 580 and 590 would reflect the manner in which information is transmitted to application programs 530 and 560. For example, retrieval program 590 could perform a series of retrievals as described above, converting the data so obtained into appropriate format for application program 560, and write this data into a file 595. Application program 560 would then read the retrieved data from file 595.

Further in accordance with the present invention, the data processing system includes means for creating a new attribute data object in the common data structure from an identification of the attribute data object desired to be the holding attribute data object for the created attribute data object. That creating means could also include means for creating the new attribute data object from an identification of a referent data object as well to form the created relation data object.

FIG. 5A shows different ways for creating new attribute data objects in the common data structure 140 according to the preferred embodiment of the invention. For example, application program 530 uses converter program 540 which receives the necessary information from a database in application program 530, extracts the needed information for forming common data structure 140 in master database 510, and then constructs attribute data objects by determining the holder attribute data objects and the referent data objects. Converter program 540 then sends these attribute data objects to master database 510 for storage.

As another example, information created in application program 530's database can be sent to master database 510 as follows. First, application program 530 sends a request to update synchronizer 550. This request includes information characterizing the desired update. Update synchronizer 550 then modifies master database 510 by signaling converter program 540 to modify master database 510 by creating attribute data objects in common data structure 140 using information from application program 530. Update synchronizer may also be used to create attribute data objects in master database 510 in accordance with the characterization information in the update request.

Preferably, converter program 570 performs the same functions as converter program 540. The only difference between converter programs 540 and 570 shown in FIG. 5A is the manner in which information is transmitted from application program 560. Application program 560 first writes data into a file 565. Converter program 570, after receiving a signal from update synchronizer 550, reads file 565 and creates attribute data objects in common data structure 140 of master database 510 in accordance with data in file 565.

Modifications of master database 510 and signals to converter programs 540 and 560 are performed by update synchronizer 550 to ensure that master database 510 is updated in a regular and noninterruptive manner while the common data structure 140 in master database 510 and slave database 520 are used by application programs. Upon completion of modifications to master database 510 by converter program 540 or converter program 570, a copy of the common data structure 140 of master database 510 is then made available as a new version of slave database 520, where it may be accessed by retrieval programs 580 and 590.

The present invention also includes means for removing a specified attribute data object from the common data structure. This is sometimes known as an erase operation and is easily performed due to the hierarchical data arrangement of the common data structure 140. In the preferred embodiment, a database modifying program such as converter 540 first locates a specified attribute data object in response to a request received from application program 530. Then converter 540 removes the attribute data object from the common data structure 140.

In addition, application program 530 can request not only that the specified attribute data object be removed, but also that the entire containment tree for that attribute data object be removed. In response to such requests from application program 530, converter 540 locates the specified attribute data object. Converter 540 also locates all attribute data objects which are held by the specified attribute data object. Converter 540 traverses through the containment tree by examining holding relationships and locating all of the attribute data objects which are held directly or indirectly by the originally specified attribute data object. Converter 540 removes all located attribute data objects from common data structure 140.

Figure 5B:
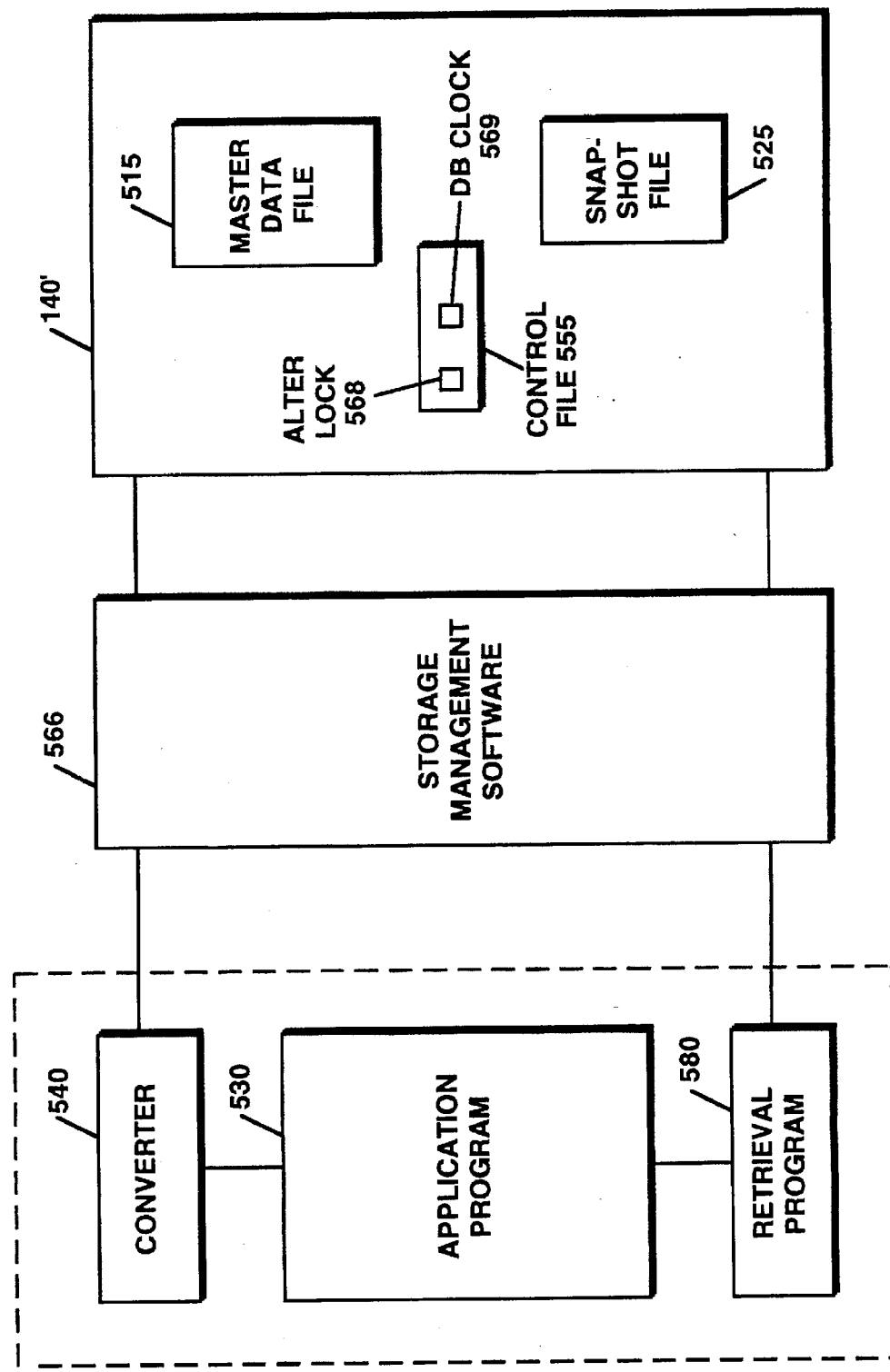
FIG. 5B shows a block diagram of certain components of a software system in accordance with an alternate embodiment of the present invention.

FIG. 5B shows a block diagram of an alternate embodiment of the components of the software system in common data structure 140'. The items surrounded by the dotted line, application program 530, converter program 540 and retrieval program 580, are essentially identical to the corresponding elements in FIG. 5A.

Common data structure 140' in FIG. 5B contains a master data file 515 and a snapshot data file 525. Like slave database 520 of common data structure 140, snapshot file 525 of common data structure 140' contains at least one complete copy of a version of master data file 515. However, unlike slave database 520, snapshot file 525 is designed to represent a plurality of versions of master data file 515 by storing portions of master data file 515 which have been updated. In contrast, slave database 520 is designed to represent complete copies of the current version of master database 510. Common data structure 140' also includes a control file 555 which includes data necessary for the control of the common data structure 140' as well as certain locks to prevent simultaneous access of structure 140' by several application programs. Two of the locks which are shown are ALTER lock 568 and DBC lock 569. These are explained in greater detail below.

In addition, storage management software 566 is shown as providing an interface between common data structure 140' and the software encompassed by the dotted lines in FIG. 5B. A preferred embodiment of portions of storage management software 566 will be explained in greater detail below.

C. Data Structure Representation of the Common Database

In a preferred embodiment of the invention, common data structures 140 or 140' are stored in memory 120 along with application programs such as programs 132 and 134. This arrangement is shown schematically in FIG. 6 as is the preferred organizational structure of common data structure 140 into a plurality of files.

Figure 6:
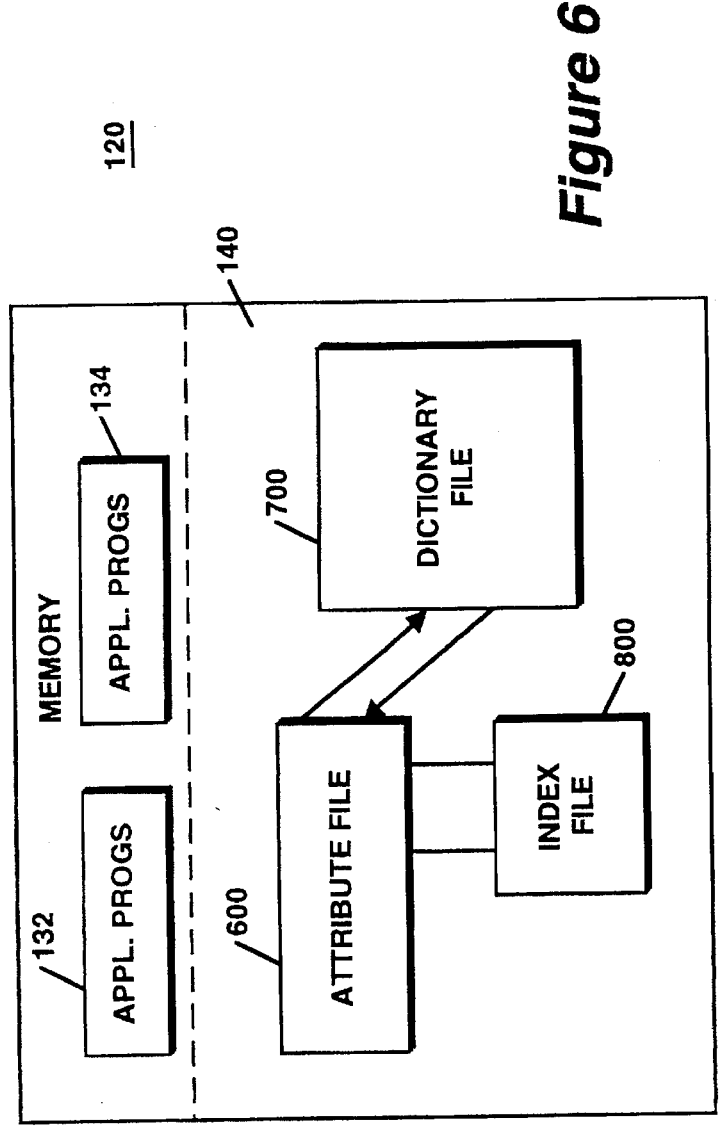
FIG. 6 shows a portion of the contents of a memory system containing a data structure including a plurality of files in accordance with the present invention.

As FIG. 6 shows, the common data structure 140 portion of memory 120 preferably includes an attribute file 600, a dictionary file 700, and an index file 800. Prior to a detailed explanation of these files, a general description of the files' functions will be provided to facilitate an understanding of the entire system.

Attribute file 600 preferably includes all of the attribute data objects or, more precisely, a memory area or data entry for each of the attribute data objects. In the preferred embodiment of attribute file 600, the attribute data objects, including both as element data objects and relation data objects, are organized in a manner which is consistent with the information in the databases of programs 130, 132 and 134. For example, in a manner described in greater detail below, node data and node data descriptors of the databases are corresponded to element and relation data objects, and the hierarchical holding relationship is imposed on the attribute data objects in a logical manner designed to facilitate the access to and identification of desired attribute data objects.

Dictionary file 700 preferably includes data entries for the apex and other contexts, as well as information descriptive of the type of attribute data objects in attribute file 600. The data entries for the apex and contexts could instead be stored in the attribute file, but those entries have been stored in dictionary file 700 in the preferred embodiment of the invention because that file is treated primarily as a read only file, and the apex and context data generally do not change.

Index file 800 preferably includes information used by CPU 110 to obtain quick access to attribute data objects in the attribute file. Index file 600 is designed to take advantage of certain features of many practical implementations of data structure 140 to increase the efficiency with which data structure 140 may be used.

In the preferred embodiment of the present invention, attribute file 600, dictionary file 700, and index file 800 in common data structure 140 are maintained in a "permanent" memory section of memory 120, such as a disk. When CPU 110 needs to access certain portions of files 600, 700, and 800, CPU 110 transfers those portions to a primary memory, such as semiconductor RAM memory. The permanent memory is relatively large in comparison with the primary memory and CPU 110 preferably manages the flow of data between the permanent memory and the primary memory in using known virtual memory techniques and in a preferred manner set forth below.

Preferably, data in each of the files in common data structure 140 are grouped in macropages. Each macropage is a contiguous 64K byte portion of a file which consists of 128 512-byte pages. In known embodiments of the invention, attribute file 600, dictionary file 700, and index file 800 have permitted up to 16K macropages of storage.

In the preferred embodiment of this invention, the standard unit of data in attribute file 600, dictionary file 700, and index file 800 is a longword composed of four bytes or 32 bits. The pages or macropages of the files typically include several blocks each of which consists of a group of several longwords. Often the longword is used as a pointer.

Figure 7:
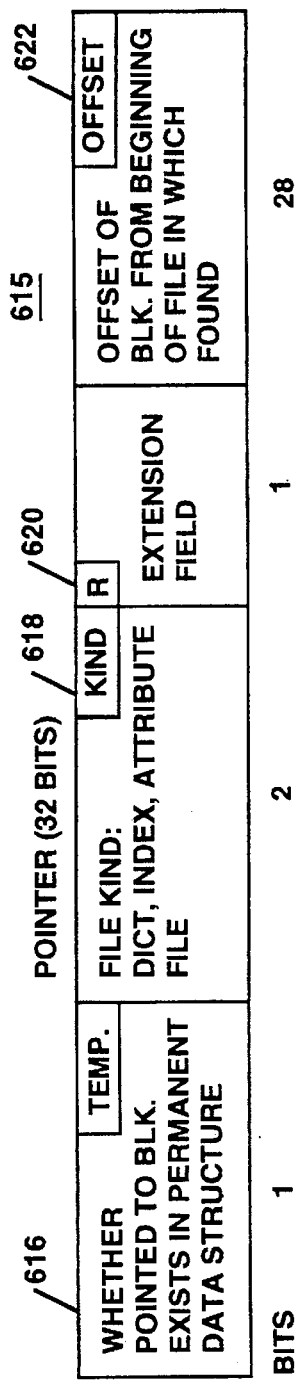
FIG. 7 shows a 32-bit longword used as a pointer in the preferred embodiment of this invention.

FIG. 7 shows a 32-bit longword 615 used as a pointer. In the preferred embodiment, CPU 110 derives longword pointers for each of the data blocks in the files of common data structure 140.

According to the preferred embodiment, longword pointer 615 includes a leftmost bit, or TEMP field 616, which indicates whether the block of memory to which this pointer "points" is not part of the permanent data structure, in which case the rest of the pointer is the virtual address of the block in primary memory. The other fields shown in FIG. 7 apply only when the block is part of the permanent data structure located in permanent memory and transferred to primary memory as needed.

KIND field 618 is two bits long and designates the kind of block to which longword pointer 615 points. For example, in the preferred embodiment, this field indicates where the block pointed to is in attribute file 600, dictionary file 700, or index file 800.

The next field, R field 620, is one bit wide. R field 620 is presently reserved to allow an additional kind of pointer to be defined for use with the present invention.

The final field of longword pointer 615 is OFFSET field 622 which comprises the twenty-eight rightmost bits of longword pointer 615. OFFSET field 622 identifies the referenced information by specifying the location of that information as a longword offset from the beginning of a file containing the referenced block.

The pointers used in the preferred embodiment are not the only ones necessary to effect the present invention. For example, the pointers can directly indicate the location of the corresponding items or can indicate that location indirectly through procedures such as indirect or indexed addressing.

1. Attribute File

Figure 8:
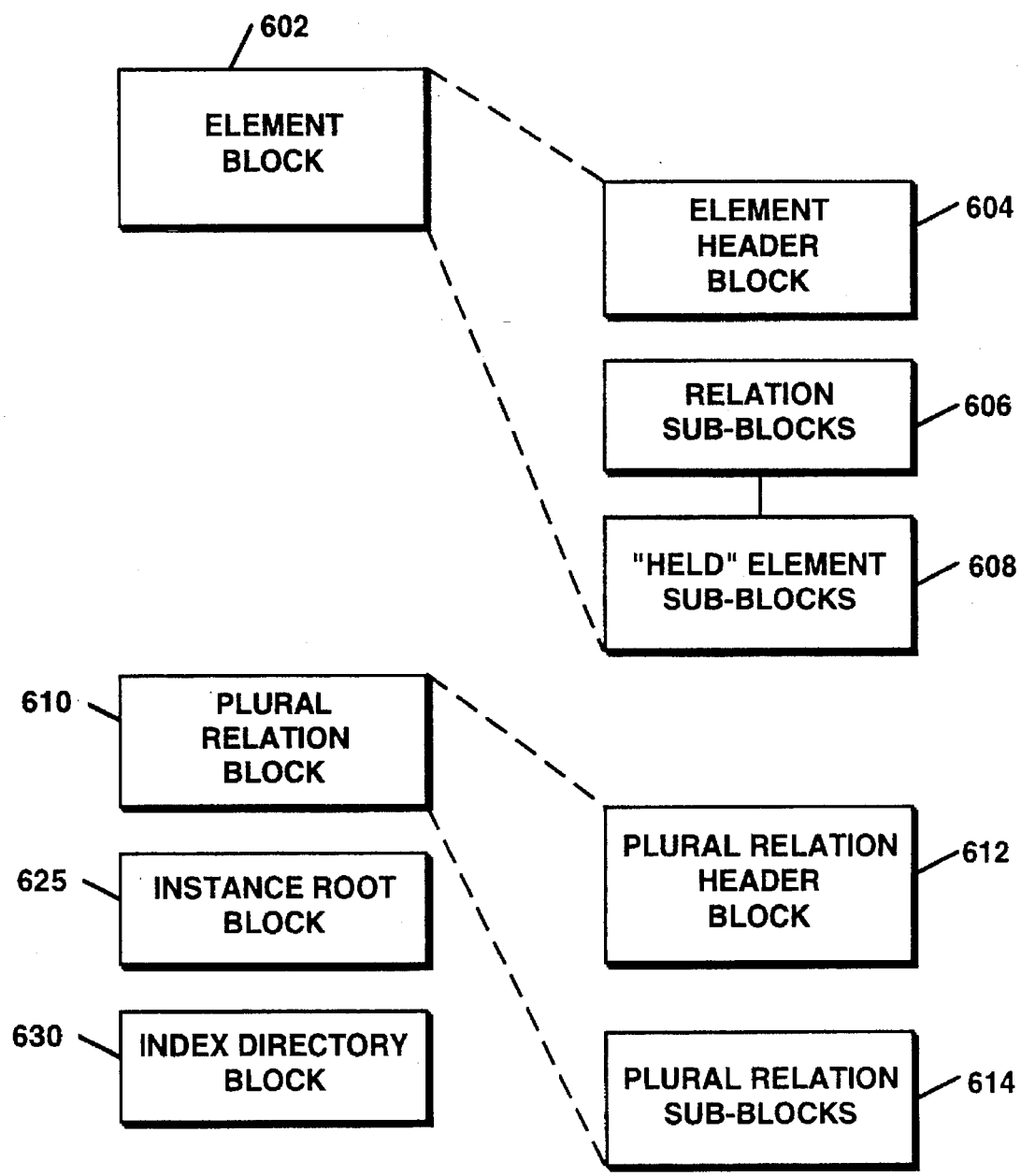
FIG. 8 shows a more detailed block diagram of the constituent portions of the attribute file shown in FIG. 6.

FIG. 8 shows a more detailed block diagram of the constituent portions of attribute file 600. Attribute file 600 includes several element blocks. Only one element block is shown, however, for simplicity, and for description purposes in this section, the attribute data object represented by element block 602 will be called the "represented element." The element block is the basic data unit for representing an element attribute data object in the preferred embodiment of attribute file 600. Element block 602 preferably includes one element header block 604, one or more relation sub-blocks 606 (optional), and one or more "held" element sub-blocks 608 (optional). Information regarding the number and type of contiguous sub-blocks in element block 602 following element header block 604 is preferably provided in dictionary file 700 or through the use of a compiler. These blocks and sub-blocks are described in detail below.

Attribute file 600 also includes plural relation blocks 610, only one of which is shown for simplicity. Each plural relation block 610 contains data for one or more relation data objects representing the non-hierarachical relationships in data structure 140. Plural relation block 610 preferably includes a plural relation header block 612 and one or more plural relation sub-blocks 614. These blocks and sub-blocks are also described in detail below.

Finally, attribute file 600 includes instance root blocks 625 and index dictionary blocks 630, only one of each of which is shown for simplicity. These two blocks are described in detail below.

Figure 9:
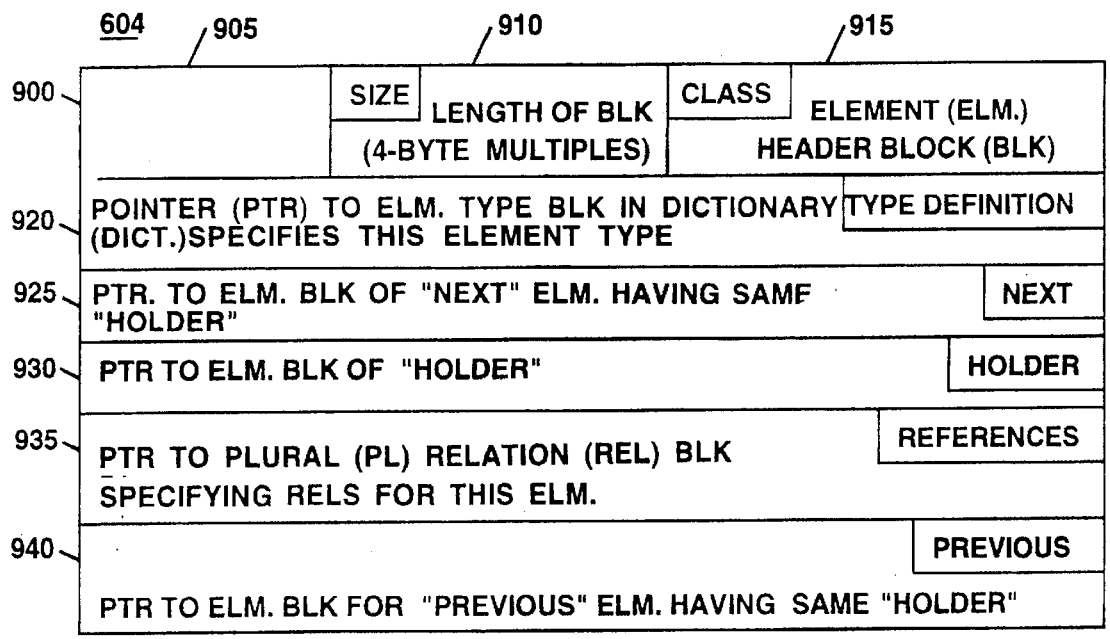
FIG. 9 shows a block diagram of an element header block shown in FIG. 8.

FIG. 9 shows a block diagram of element header block 604 in the preferred embodiment of the invention. In this embodiment, each attribute data object in data structure 140 would be represented by an element header block, such as element header block 604. As shown, element header block 604 includes six longwords 900, 920, 925, 930, 935, and 940.

Longword 900 preferably includes a blank field 905, a SIZE field 910, and a CLASS field 915. SIZE field 910 indicates the number of longwords in element header block 604. CLASS 915 indicates that block 604 is an element header block.

Longword or TYPE DEFINITION pointer 920 specifies a location in dictionary file 700 containing element type information for the represented element. Type information could also have been made available to common data structure 140 by some other means, for example, through the use of a special compiler which also could establish the apex, other contexts, and identifiers for contexts.

NEXT and PREVIOUS pointers 925 and 940, respectively, designate the locations of element blocks for attribute data objects having the same holder attribute data object as the represented element. In the preferred embodiment of the present invention, attribute data objects of a common type having the same holder attribute data objects are linked by use of these longword pointers. The NEXT and PREVIOUS pointers 925 and 940, respectively, effect such linking.

HOLDER and REFERENCES pointers 930 and 935 of element header block 604 respectively indicate the hierarchical being-held relationships and non-hierarchical relations between the represented element and other attribute data objects represented in attribute file 600. HOLDER pointer 930 points to the element block for an attribute data object, i.e., the "holder object" with which the represented attribute data object has a being-held relationship. Thus, HOLDER pointer 930 points to the element block of the attribute data object which holds the attribute data object represented by element block 602.

The REFERENCES pointer 935 points to a first of a sequence of plural relation blocks (e.g., block 610 in FIG. 8) in attribute file 600. Those plural relation blocks indicate the attribute data objects which hold relations of which the represented element is a referent data object. The details of plural relation blocks are discussed below.

Relation sub-block 606 and "held" element sub-block 608 of object block 602 (shown in FIG. 8) are preferably contiguous sub-blocks which are also contiguous to element header block 604. For each object block there may be several relation sub-blocks and several "held" element sub-blocks. Relation sub-blocks 606 specify referent attribute data objects for singular relations held by the represented element. "Held" element sub-block 608 specifies the attribute data objects which have a being-held relationship with the represented element. The relation sub-blocks 606 and "held" element sub-blocks 608 for the represented object possibly appear in mixed order.

Figure 10A:
FIGS. 10A and 10B show block diagrams of the preferred embodiment of a relation sub-block shown in FIG. 8.
Figure 10B:
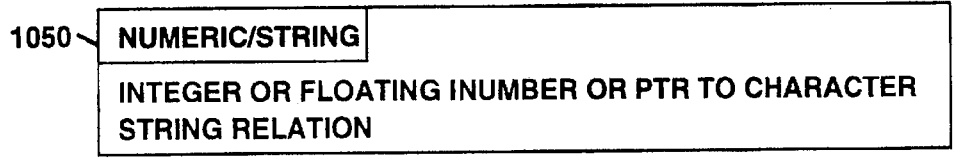

FIGS. 10A and 10B show block diagrams of the preferred embodiment of relation sub-block 606. Relation sub-block 606 preferably contains one of two kinds of information. If relation sub-block 606 is a relation pointer, then it appears as a longword or RELATION pointer 1000 (FIG. 10A) which specifies either an element block of a single referent attribute data object or a plural relation block (e.g., block 610 in FIG. 8) which in turn identifies several referent attribute data objects for the relations held by the represented element.

Alternatively, relation sub-block 606 may be a NUMERIC/STRING identifier for identifying a number or date, or a string. If relation sub-block 606 is a numeric or date identifier, then it appears as double longword. Identifier 1050 may be a pointer to an element block representing an attribute data object for a character string or may itself be an integer or floating point constant or a date.

Figure 11:
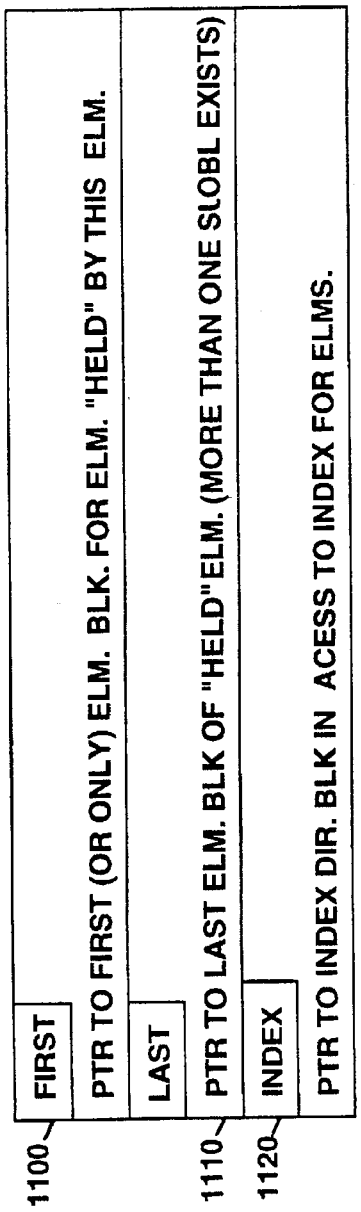
FIG. 11 shows a block diagram of the preferred embodiment of a "held" object sub-block shown in FIG. 8.

FIG. 11 shows a block diagram of the preferred embodiment of "held" element sub-block 608 shown in FIG. 8. Sub-block 608 includes longword pointers 1100, 1110 and 1120. Longword or FIRST pointer 1100 identifies an element data block of the first in a selected order of attribute data objects which have a being-held relationship with the represented element. If only one attribute data object has that relationship, then FIRST pointer 1100 identifies that attribute data object. Longword or LAST pointer 1110 identifies the last in the selected order of such attribute data objects, but also identifies the first attribute data object of only one held object exists. The selected order of attribute data objects having a being-held relationship with the represented object is the linkage defined by the NEXT and PREVIOUS pointers of those "held" attribute data objects.

Longword or INDEX pointer 640 contains a pointer to an index directory block. These blocks are described in greater detail below, and the function of INDEX pointers 640 will be understood from that description.

As explained above, plural relation blocks 610 provide an efficient means of reference when several referent attribute data objects must be identified. Each plural relation block 610 includes a plural relation header block 612 and one or more plural relation sub-blocks.

Figure 12:
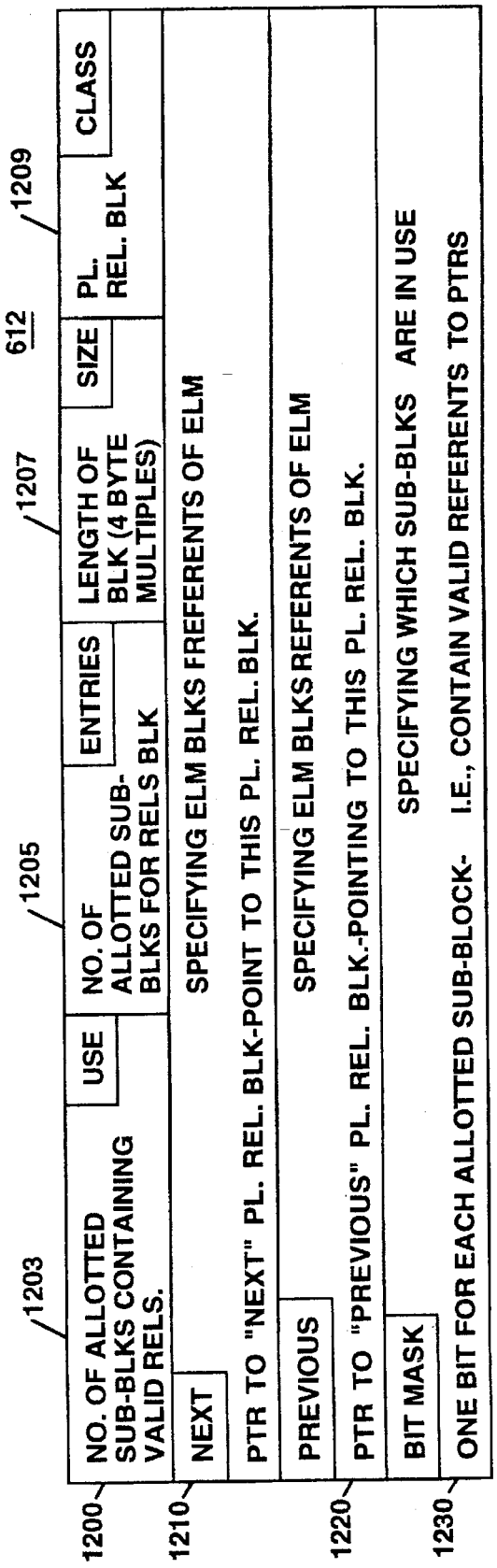
FIG. 12 shows a block diagram for a plural relation header block shown in FIG. 8.

FIG. 12 shows a block diagram for plural relation header block 612 according to a preferred embodiment of the present invention. Plural relation header block 612 comprises longwords 1200, 1210, 1220 and 1230. Longword 1200 includes a USE field 1203, an ENTRIES field 1205, a SIZE field 1207, and a CLASS field 1209. USE field 1203 indicates the last one of the plural relations sub-blocks 614 for header block 612 which may contain a valid pointer. ENTRIES field 1205 contains the number of contiguous plural relation sub-blocks 614 following header block 612 which are included in plural relation block 610, whether those sub-blocks contain pointers or not. SIZE field 1207 and the CLASS field 1209 indicate, respectively, the number of longwords in plural relation block 610 and that this header block is a plural relation header block.

BIT MASK field 1230 contains bits indicating which sub-blocks 614 contain valid pointers. Thus, although the USE field indicates the largest numbers of contiguous sub-blocks which may have valid pointers, not all of those pointers may necessarily by valid. BIT MASK field 1230 supplies this latter information.

Plural relation blocks are linked in a manner similar to the linkage of element blocks for attribute data objects having the same holder attribute data object. Accordingly, header block 612 includes NEXT and PREVIOUS longword pointers 1210 and 1220, respectively, which specify next and previous plural relation blocks in a selected order of such blocks. The plural relation header blocks in that order are all used by the same holder attribute data object.

FIGS. 13A and 13B show block diagrams of preferred embodiments of two kinds of plural relation sub-blocks 614. If the referent attribute data object is an element attribute data object other than a string, number, or date, then, RELATION pointer 1300 is a longword which points to the element block for that attribute data object. If the referent attribute data object is a number or date or a character string, then NUMERIC/STRING field 1310 is used to point to a floating point number, or date, or a block representing a character string.

Creation and use of element block 602 and plural relation block 610, according to the teachings of the present invention, are described in further detail below. As can now be readily appreciated, the data structure representations for attribute file 600 discussed above embody the principles of an Attribute data model according to this invention.

The contents and structure of an instance root block are shown in FIG. 14. "Instances" of an element type refer to a set of attribute data objects all having the same element type and all having the same holder attribute data object. It has been determined that such groups of attribute data objects are referenced often. Thus, the instance root block was developed to provide an efficient mechanism to access such attribute data objects. Locating instance root block 625 in attribute file 600 allows it to be dynamically updated more easily than if this block were located in essentially read-only dictionary file 700.

Instance root block 600 comprises a longword 1410 which includes a SIZE field 1413 and a CLASS field 1416 indicating, respectively, the number of longwoods in root block 625 and that block 625 is an instance root block.

Instance root block 625 also includes FIRST and LAST pointers 1420 and 1430, respectively, which indicate first and last attribute data objects in any set. Preferably, pointers 1420 and 1430 identify the locations of the element type blocks (discussed in a later section in relation to dictionary file 700) of those attribute data objects.

An INDEX pointer 1440 of block 625 points to an index directory block (described in detail below) in attribute file 600 which permits ready access to each instance of the linked list of attribute data objects, the first and last object of which are specified by pointers 1420 and 1430 of instance root block 600.

(2) Dictionary File

Figure 15:
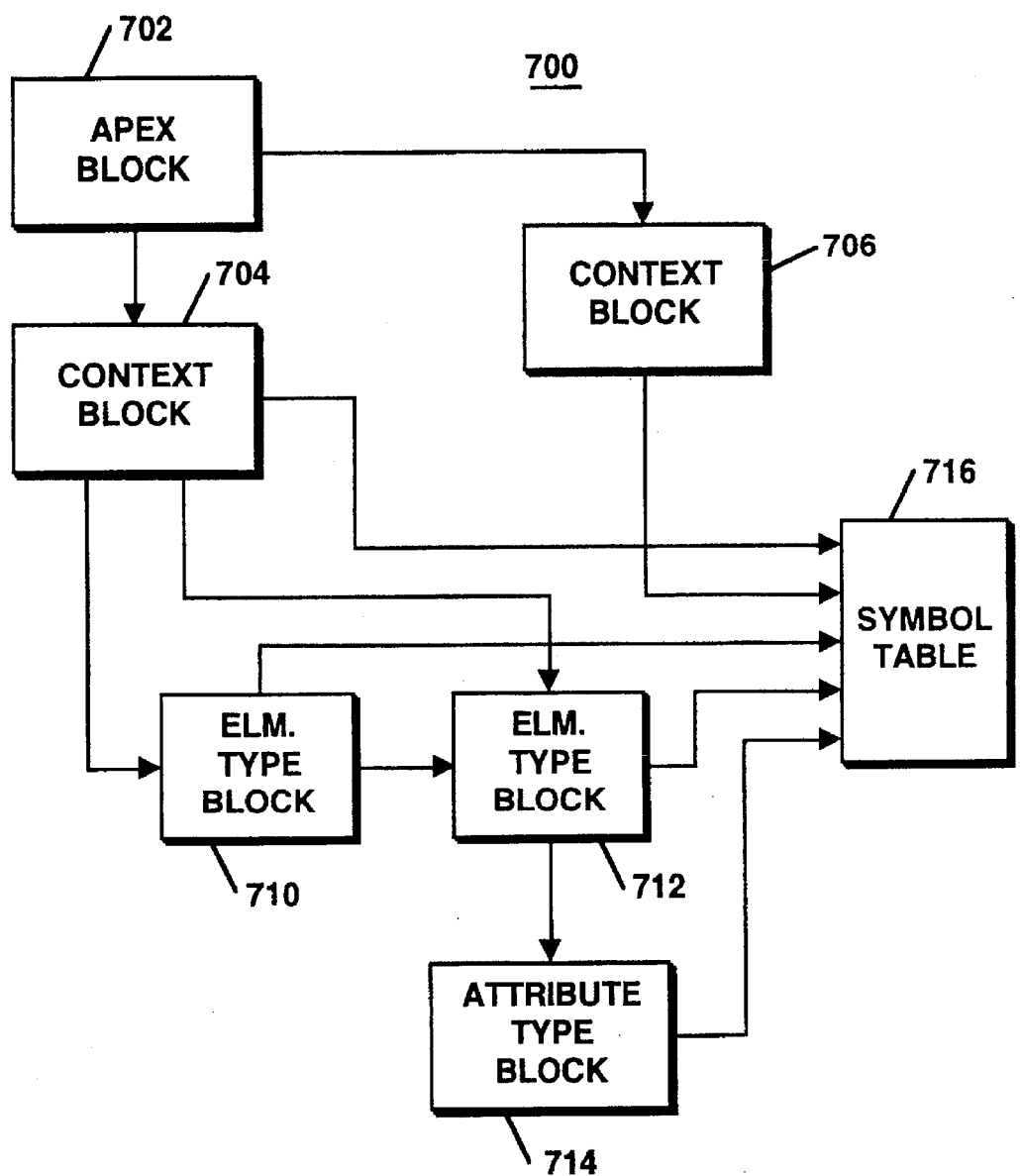
FIG. 15 shows a block diagram of a preferred embodiment of a dictionary file shown in FIG. 6.

FIG. 15 shows a block diagram of a preferred embodiment of dictionary file 700. In the preferred embodiment, the portions of the common database structure in dictionary file 700 include an apex block 702, other context blocks 704 and 706, element type blocks 710 and 712, attribute type blocks 714 and symbol table 716.

Apex block 702 is a special kind of context block which represents the apex data object. According to the basic rules of the Attribute data model of the present invention, the apex data object holds contexts or attribute data objects, but is not itself held by any context or attribute data object.

Context blocks 704 and 706 are used to represent a context such as CPU 420 described in connection with FIG. 4. Element type blocks 710 and 712 each represent a different type of attribute data object in attribute file 600. Preferably, for each different type of attribute data object there is a corresponding element type block. Attribute type block 714 includes information regarding the type of relations which exists between attribute data objects of a specified type and referents for these attribute data objects. Symbol table 716 contains identifiers for the apex, contexts, element types, and attribute types represented in the different blocks of dictionary file 700.

As explained above, apex block 702 and context blocks 704 and 706 are preferably stored in dictionary file 700 because dictionary file 700 is usually a read only file. Apex block 702 and context blocks 704 and 706, which are very similar and will be discussed together, are generally not modified and thus are primarily for a read only file.

Figure 16:
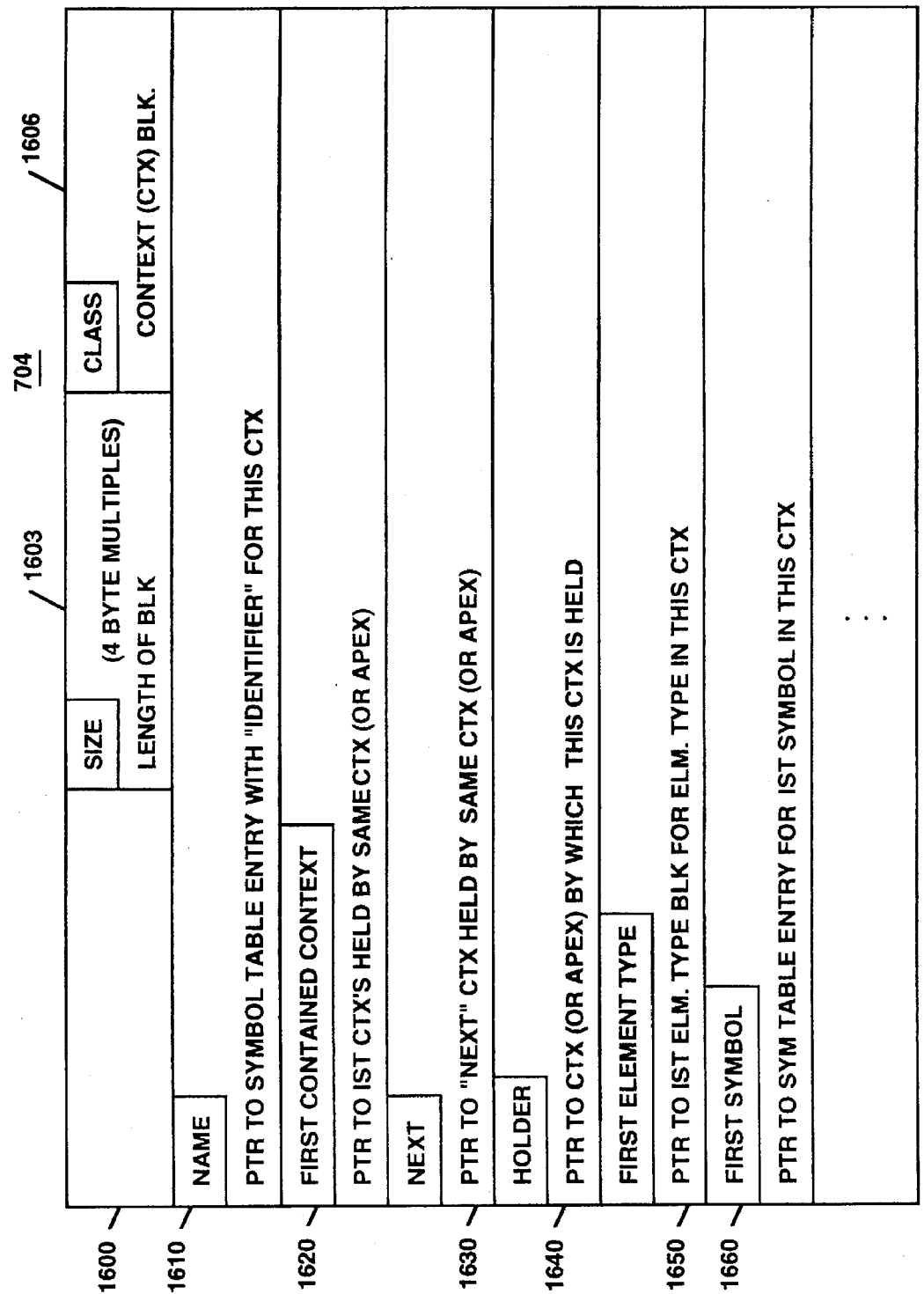
FIG. 16 shows a block diagram for the basic structure and contents of the preferred embodiment of either an apex block or a context block shown in FIG. 15.

FIG. 16 shows a block diagram for the basic structure and contents of the preferred embodiment of either apex block 702 or context blocks 704 or 706. Because of the similarities of apex and context blocks, only the file structure for context blocks will be discussed with the understanding that the file structure for apex blocks is similar.

In context block 704, longword 1600 includes a SIZE field 1603 and a CLASS field 1606. SIZE field 1603 indicates the number of longwords of context block 704, and CLASS field 1606 indicates either that the block is an apex block or a context block.

Longword or NAME pointer 1610 identifies an entry in symbol table 716 (see FIG. 14) specifying an identifier for the apex or other context represented by block 704.

Longword or FIRST CONTAINED CONTEXT pointer 1620 points to the first context block of a set of contexts which are held by context block 704. Pointers 1630 and 1640 described below, are empty in apex block 702.

For context block 704, Longword or NEXT pointer 1630 points to the next context in the ordered set of contexts just described. Longword or HOLDER pointer 1640 points to the context block or apex block of the context or apex which holds the context for block 704.

Longword or FIRST OBJECT TYPE pointer 1650 points to a first one of an ordered set of element type blocks, e.g., blocks 710 or 712. The element type blocks in that ordered set represent element types of attribute data objects held by the context represented by context block 704. The ordered set is preferably a linked list as explained below in the description of element type blocks.

Longword or FIRST SYMBOL pointer 1660 identifies an entry in symbol table 716 which is designated as a first symbol for the first of an ordered set of symbols for other contexts, objects or relations held by the context represented by block 704.

Preferably, the apex data object or a context attribute data object provides the first or top portion of a containment tree. Access to an attribute data object of a specified element type in a context may be obtained by entering the containment tree through the apex and by proceeding through the tree to the the context in which the desired attribute data object is found. Because the apex and contexts are represented by apex and context blocks in dictionary file 700 in the preferred embodiment of the invention, entry into the preferred embodiment of the data structure through the apex or context requires access to the information stored in the apex or context blocks in dictionary file 700. In different embodiments according to this invention, access through a dictionary file would not be required.

FIG. 17 shows a block diagram of a preferred embodiment of an element type block such as element type blocks 710 or 712. For purposes of this description, element type block 712 alone will be described with the understanding that element type block 710 has the same components.

For each type of element in attribute file 600, there exists an element type block 712 in dictionary file 700. In the preferred embodiment, the creation of an element of a certain type in attribute file 600 must be preceded by a declaration that elements of that type may exist. The mechanism for representing the existence of objects of a specified type is element type block 712.

Element type block 712 contains general parameters for certain element blocks in attribute file 600, for example, information regarding the length of those element blocks and information regarding the instances of a given element type.

The contents and structure of element type block 712 are as shown in FIG. 17. Included in element type block 712 is longword 1700 which has SIZE field 1703 and CLASS field 1706. As in the case with other data blocks, SIZE field 1703 indicates the number of longwords in element type block 712 and the CLASS field indicates that block 712 is an element type block.

Longword or NODE FORM field 1710 indicates whether attribute data objects of the type specified by element type block 712 have a predetermined order and whether the elements of this type are held by a context or held by other elements. Longword or NAME pointer 1720 points to an entry in symbol table 716 having a name or identifier for attribute data objects of this type. INSTANCE LENGTH field 1730 specifies the length of an element block 602 for attribute data objects of the type specified by block 712.

As indicated above, element type blocks for types of attribute data objects contained by (i.e., in the containment tree for) the same context are preferably organized into ordered sets. In fact, these blocks are preferably linked using longword or NEXT pointer 1740, which specifies the next element type block.

Longword or CONTEXT pointer 1750 points to the context block or apex block in which elements of the type specified by block 712 are contained. Longword or INSTANCE pointer 1760 points to an instance root block in attribute file 600 which contains pointers affording access to each of the instances of an element of this type in attribute file 600. The remaining field of element type block 712 includes longword or ATTRIBUTE pointer 1770. ATTRIBUTE pointer 1770 points to the first relation type for relation types contained by this element type.

Dictionary file 700 also provides a mechanism for specifying the types of relations which may exist between attribute data objects of a type specified by an element type block 712 and their referent attribute data objects. This mechanism includes attribute type blocks such as block 714 (see FIG. 15).

Figure 18:
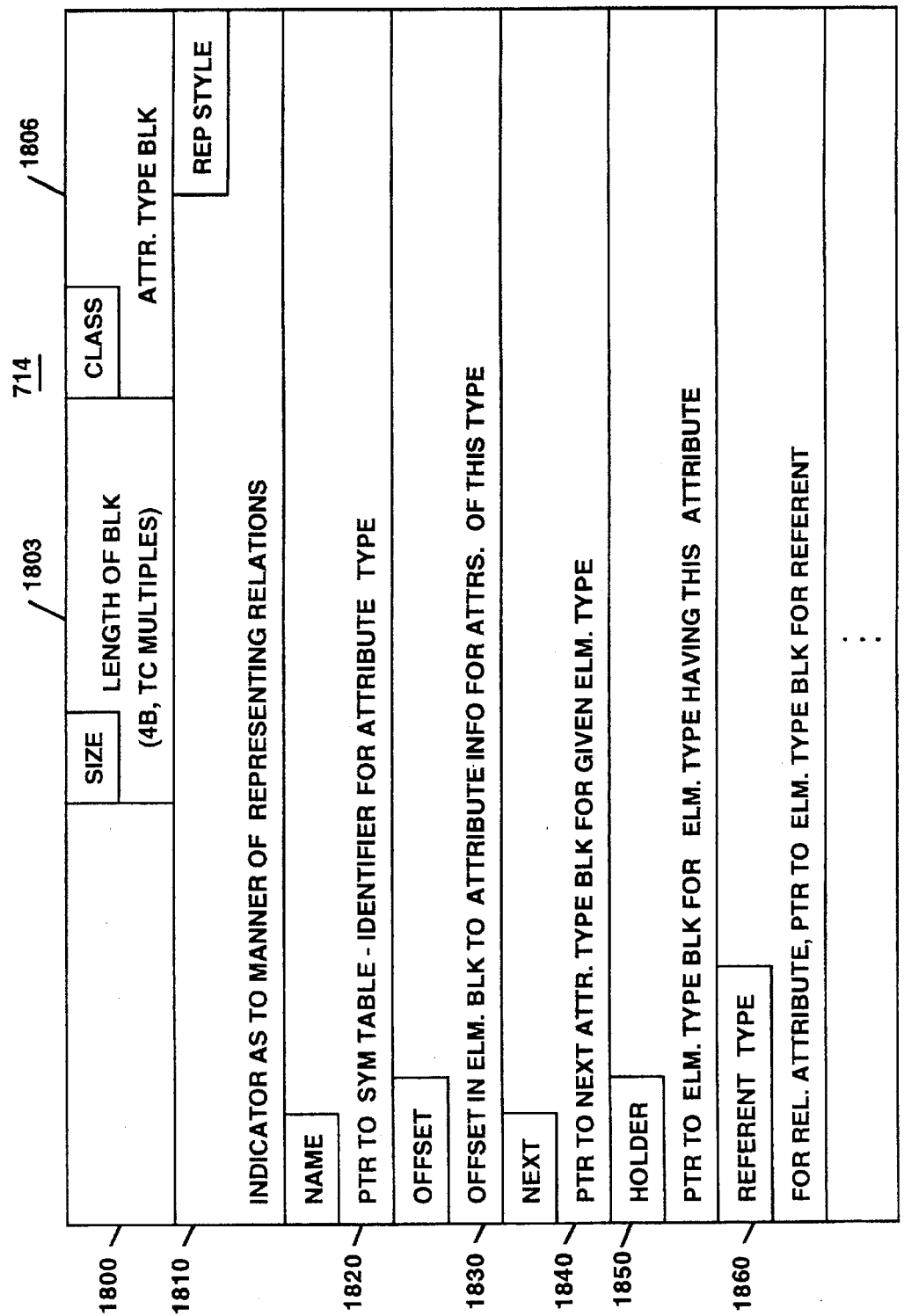
FIG. 18 shows a block diagram for an attribute type block shown in FIG. 15.

FIG. 18 shows a block diagram for attribute type block 714 according to a preferred embodiment of the present invention. Attribute type block 714 includes longwords 1800, 1810, 1820, 1830, 1840, 1850 and 1860. Longword 1800 contains SIZE field 1803 and CLASS field 1806 which indicate, respectively, the number of longwords in block 714 and that block 714.

Longword or REPSTYLE field 1810 indicates the manner in which relations for attribute data objects are to be specified. According to the preferred embodiment of the present invention, relations between attribute data objects and their referent attribute data objects may be specified either directly or indirectly. For directly specified or singular relations, a relation sub-block 606 (see FIGS. 7 and 10A) in the element block 602 contains the pointer for a referent attribute data object. For indirectly specified or plural relations, a plural relation sub-block 614 of a plural relation block 610 (see FIGS. 8 and 13) accessed from the object block 602 for the referenced object contains pointers to the referent attribute data objects.

Longword or NAME pointer 1820 of block 714 points to an identifier entry in symbol table 716 for attribute type block 714. Longword or OFFSET field 1830 contains an offset from the beginning of an element block 602 for a relation sub-block 606 representing relations of this type, or an offset for a held element sub-block 608 representing elements of this type.

Attribute type blocks 714 for a given element type are linked by means of a NEXT pointer 1840 in the manner described above for other linked blocks. Longword or HOLDER pointer 1850 points to the element type block 712 for the type of attribute data object which holds the type of relation specified by attribute type block 714. Longword or REFERENT TYPE pointer 1860 also points to an element type block, but that element type block is one specifying the type of the referent attribute data objects in the event that attribute type block 714 corresponds to a relation.

(3) Index File

Index file 800 provides another efficient and direct means to access attribute data objects which share a common holder attribute data object. Specifically, index file 800 provides a means for accessing certain ones of the attribute data objects to which unique key values have been assigned.

In the preferred embodiment, index file 800 comprises several index branch blocks organized into at least one index having a tree structure. The branch blocks of an index include leaf blocks each of which corresponds to a different set of the key values. Each key value for an attribute data object is in only one of the different sets of key values and, therefore, only one leaf block has a correspondence with that key value and the attribute data object to which that key value is assigned.

Leaf blocks include pointers, each of which corresponds to a key value of the leaf block and to the location in attribute file 600 for the attribute data object having the key value as its assigned key value. Quick accessing of a desired attribute data object is achieved by entering an index with a key value for the desired attribute data object, and by locating a unique pathway through the tree structure of the index to the leaf block having that key value and the corresponding pointer to the desired attribute data object.

Accordingly, in the preferred embodiment an index's tree structure includes a root block to provide an entry into the tree structure. The root block "branches" to a plurality of branch blocks each of which corresponds to a different, non-overlapping group of the sets of key values to which certain leaf blocks correspond. The branch blocks are organized to provide a unique pathway from the root block through one or more middle branch blocks to a single leaf block having a corresponding set of key values for which the unique pathway exists. By organizing the root, middle branch and leaf blocks in such a manner, the leaf block having a corresponding set of key values, which includes a key value for a desired object, can be located expeditiously. In turn, the pointer to an attribute data object having that key value as its key value can be quickly located, as can the attribute data object itself.

Figure 19:
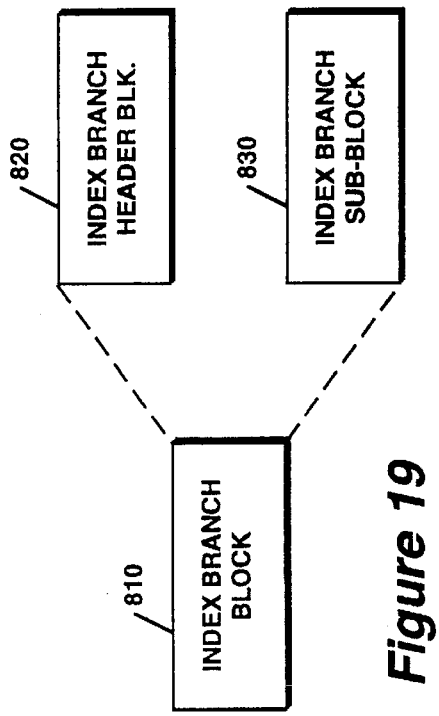
FIG. 19 shows a preferred embodiment of a block diagram of an index branch block in accordance with the present invention.

The root branch, middle branch, and leaf blocks of an index are preferably represented by index branch blocks. FIG. 19 shows an index branch block 810 which comprises an index branch header block 820 and several index branch sub-blocks 830.

Figure 20:
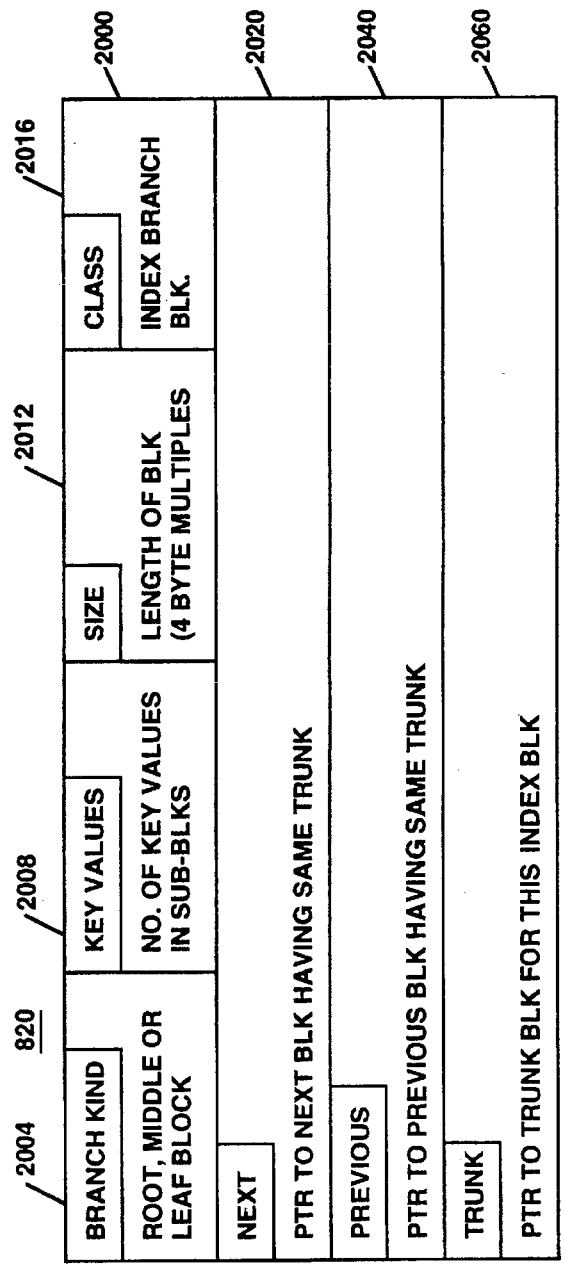
FIG. 20 shows a block diagram of a preferred embodiment of an index branch header block shown in FIG. 19.

FIG. 20 is a block diagram of an index branch header block 820. In the preferred embodiment, branch header block 820 includes longwords 2000, 2020, 2040 and 2060. Longword 2000 includes a BRANCH KIND field 2004, a KEY VALUES field 2008, a SIZE field 2012, and a CLASS field 2016.

BRANCH KIND field 2004 specifies whether index branch block 810 is a root, middle branch, or leaf block. A KEY VALUES field 2008 indicates the number of key values specified in sub-blocks 830. SIZE field 2012 and CLASS field 2016, respectively, indicate the number of longwords in branch block 810 and that block 810 is an index branch block.

Different index branch blocks 810 having the same trunk block are linked through longword or NEXT pointer 2020 and longword or PREVIOUS pointer 2040, which point to designated next and previous branch blocks for the same trunk, respectively. Longword or TRUNK pointer 2060 points to the trunk block for an index branch block 810.

In the preferred embodiment, index branch header block 820 is followed contiguously by one or more index branch sub-blocks 830.

Figure 21:
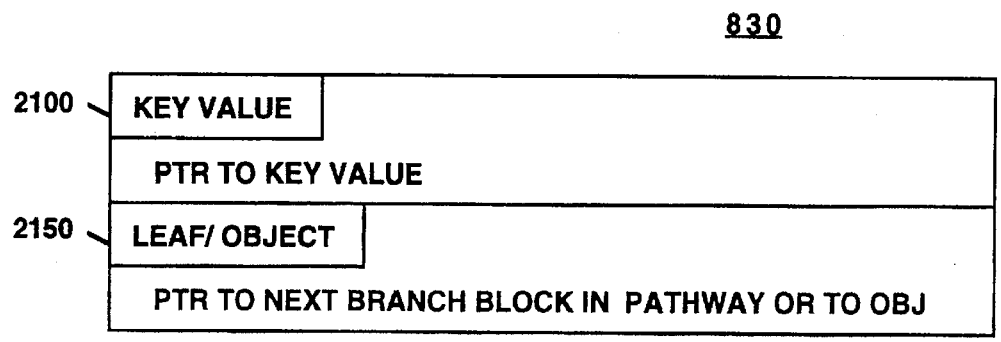
FIG. 21 shows a block diagram of an index branch sub-block shown in FIG. 19.

The index branch sub-blocks 830 shown in FIG. 21 preferably include a longword or KEY VALUE pointer 2100 and a longword or LEAF/OBJECT pointer 2150. KEY VALUE pointer 2100 specifies a location attribute file 600 holding a key value.

If index block 810 is a leaf branch block, its LEAF/OBJECT field 2150 points to an element block 602 for an attribute data object in attribute file 600 having the key value denoted by the corresponding KEY VALUE field 2100 in sub-block 830. Otherwise, if the index branch block 810 is a branch block, the LEAF/OBJECT field 2150 points to a branch block in the unique pathway to a leaf block, the set of key values of which are within the group of sets for that branch block.

In the preferred embodiment, each index branch block 810 is used either as an ordering index or as an accessing index. The ordering index is used to insert elements into a list according to prescribed ordering rules and enables quick access to the place in the list of elements, e.g., as described by an instance root block 625 or a held element sub-block 608. An accessing index is used to access existing elements quickly using a key value.

Figure 22:
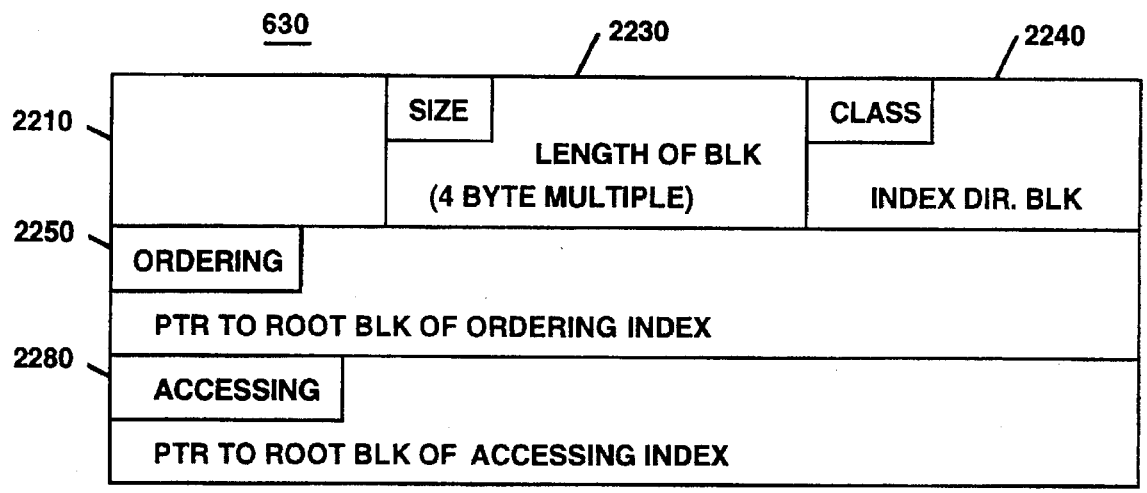
FIG. 22 shows a block diagram of a preferred embodiment of an index directory block shown in FIG. 8.

In the preferred embodiment of the invention, both the ordering and accessing index require use of index directory block 630, discussed briefly with regard to the constituents of attribute file 600 (see FIG. 7). A block diagram of index directory block 600 is shown in FIG. 22.

Index directory block 630 includes longwords 2210, 2250 and 2270. Longword 2210 includes SIZE and CLASS field 2230 and 2240, respectively, which indicate the number of longwords in index directory block 600 and that block 600 is an index directory block. Longword or ORDERING pointer 2250 identifies the instance root block for an ordering index, and longword or ACCESSING pointer 2200 indicates a root branch block for an accessing index.

Access to an index directory block 630 which designates indices for quickly accessing attribute data objects is obtained either through an instance root block 625 or through a "held" object sub-block 608. Preferably, for attribute data objects held by a context, index pointer 1440 of an instance root block 625 points to the index directory block 630 so that attribute data objects held by a specified context can be accessed easily. For attribute data objects held by another attribute data object, index directory block 630 is accessed using the INDEX pointer 1120 of the "held" object sub-block 608 specifying designated first and last ones of the held objects. The accessing operations are explained in greater detail below.

D. Basic Database Operations

Using the preferred embodiment of the invention, certain basic data operations such as creation, erasure, and access, can be easily and efficiently carried out according to preferred methods described below. The following description presumes that, whether by use of a compiler or dictionary 700, certain data like an apex or the contexts which are necessary to the creation of attribute data objects, already exist in common data structures 140 or 140'. It is also assumed that the elements and relations to be created and the element types and relation types for the elements and relations to be created have already been specified to data structure 140, so that the appropriate element type blocks and referent type blocks have already been created.

(1) Element Creation

Figure 23A:
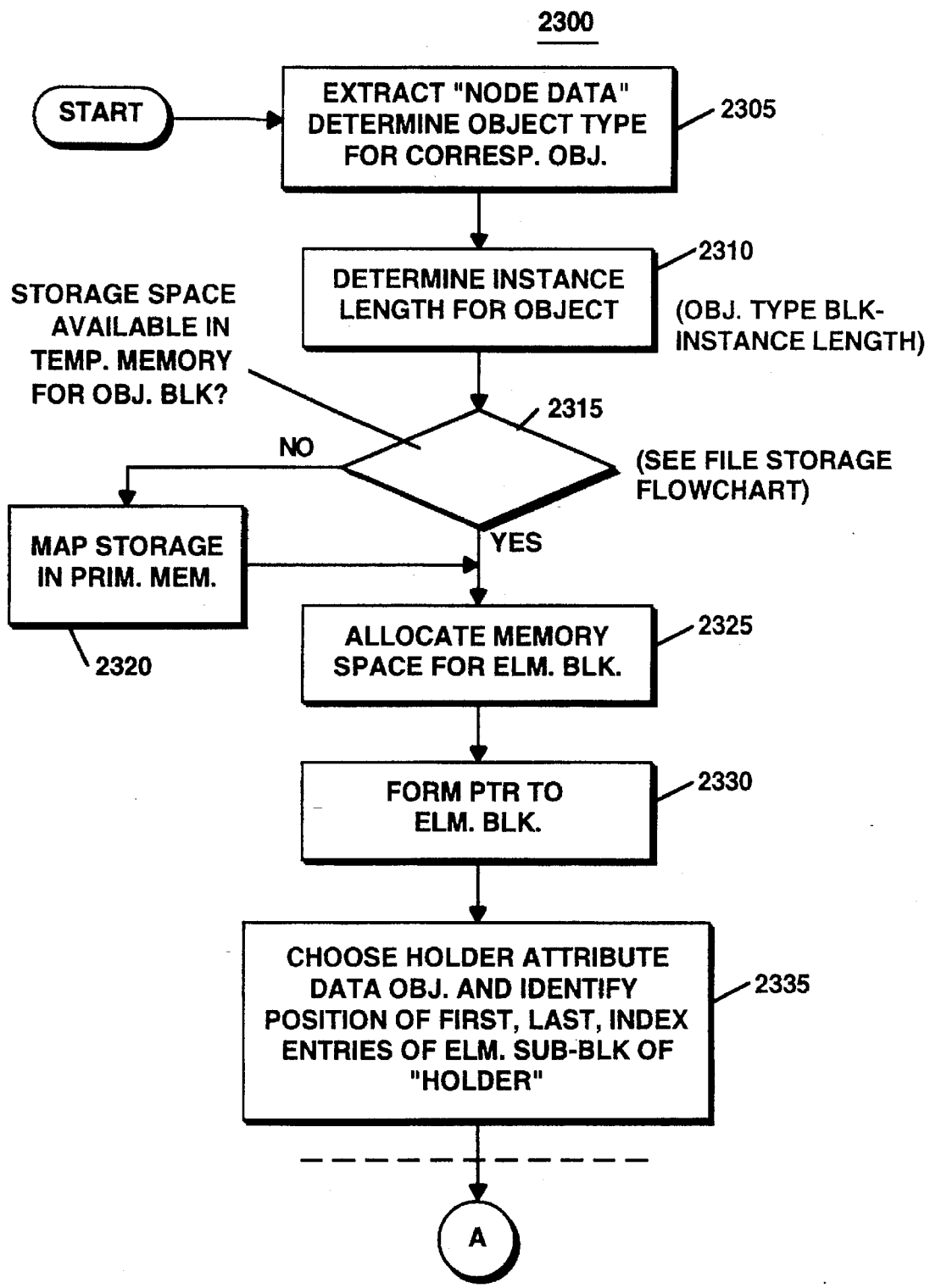
FIGS. 23A and 23B show a flow diagram depicting the steps involved in a preferred method of creating an element data object according to the present invention.
Figure 23B:
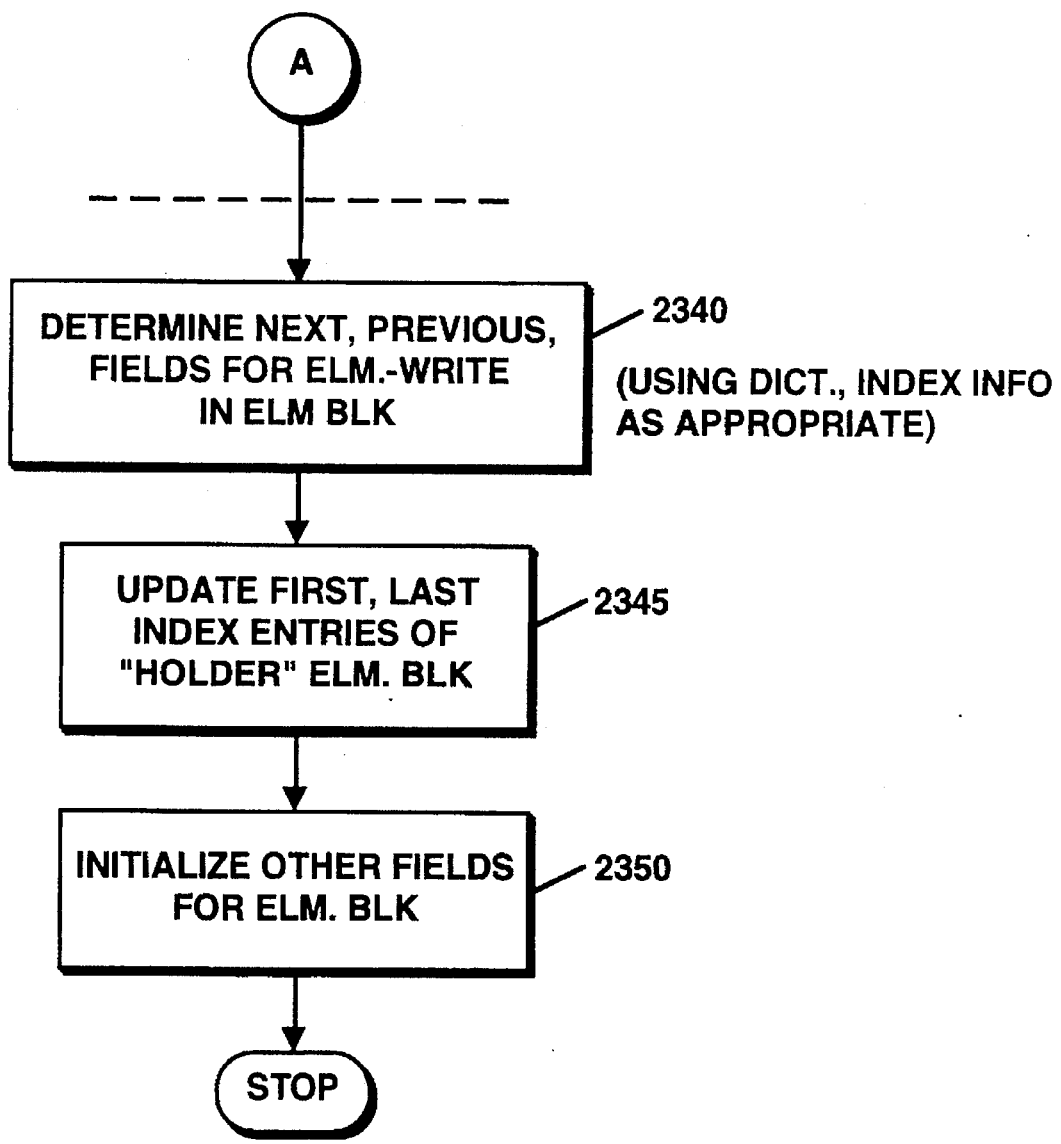

FIGS. 23A and 23B show a flow diagram 2300 for a preferred method of creating an element data object ("new element") according to the present invention. As stated above in connection with the description of application programs 132 and 134, these programs either contain the information needed for forming common data structure 140 in memory 120 or have their databases alrady organized in accordance with the Attributive data model of this invention.

If the application program databases need to be converted to the Attributive data model of this invention, the information needed from these programs to create an element is in the form of "node data." Attribute data objects to be created may correspond to node data from the application programs or may be specifically derived for creation. Accordingly, creation of an element data object may involve the extraction of node data from an application program and a determination of the type of corresponding element data object to be created from the node data. (Step 2305). Examples of such extraction appear in the next section.

Once the type of the new element has been determined, the instance length, that is the length of element block 602 for the new element, can be determined by reference to the INSTANCE LENGTH field 1730 of an existing element type block 712 for the new element (Step 2310).

Once the instance length is determined, primary memory is checked to see whether storage space is available for element block 602 (Step 2315). If storage space does not exist, then primary memory space for that element block is created (Step 2320). The details for managing storage space by CPU 110 in permanent and primary memory is described in more detail in a later section and involves virtual memory and mapping techniques readily ascertainable to artisans of ordinary skill.

After storage space for element block 602 in primary memory is located or created, that space is allocated for element block 602 for the new element (Step 2325). CPU 110 then forms a pointer to that allocated primary memory space (Step 2330).

Next, a holder attribute data object is chosen for the new element such that a being-held relationship exists between the new element and its holder attribute data object (Step 2335). Selection of the holder attribute data object, allows FIRST, LAST and INDEX pointers, 1100, 1110 and 1120, respectively, in "held" object sub-block 608 of element block 602 for the holder attribute data object to be located (Step 2335).

FIRST, LAST and INDEX pointers 1100, 1110 and 1120, respectively, may be updated then to reflect the existence of the new element as an element now held by the holder attribute data object. Of course, updating these fields is not necessary if the new element is not the first or last element held by the holder attribute data object.

After locating the sub-block 608 pointers, NEXT, PREVIOUS, and HOLDER pointers 925, 940 and 930, respectively of element header block 604 in element block 602 of the new attribute data object are used to link the new element to the element blocks for the other elements having the same holder as that new element and indicates the holder attribute data object for the new element (Step 2340). This is done by locating HOLDER pointer 930 in object header block 604 for the new object. That HOLDER pointer 930 points to a memory area in which an element block 602 for the holder attribute data element of the object being created may be found. In addition, element pointers to other attribute data objects which have the same holder attribute data object as the new attribute data object are provided as NEXT pointer 925 and PREVIOUS pointer 940. If the new element is the only attribute data object held, no pointer will be provided in a NEXT pointer 925 of element header block 604 and no object pointer will exist as PREVIOUS pointer 940.

Next, the FIRST, LAST, and INDEX pointers 1100, 1110 and 1120, respectively, on the "held" element sub-block 608 of the holder attribute data object, which have been previously located, are updated to reflect the existence of the new element and to reflect its "being-held" relationship with the holder attribute data object (Step 2345). With regard to such updating, if the new object is the first attribute data object held by the holder attribute data object, then a pointer to the element block 602 of the holder attribute data object will be provided in the FIRST pointer 1100. INDEX pointer 1130 will also be updated to identify an index directory block 630 if appropriate.

To complete the creation of the new element in method 2300, other fields of element block 602 must be initialized. For example, TYPE DEFINITION pointer 920 of element header block 604 for the new attribute data object must be provided with appropriate pointers, such as a pointer to the element type block 712 in dictionary file 700 which specifies the type of the new element. "Held" element sub-block 608 and relation sub-block 606 for the new element are initialized for such time as the new attribute data object comes to hold or comes to have relations with other attribute data objects.

(2) Creating a Relation

Figure 24A:
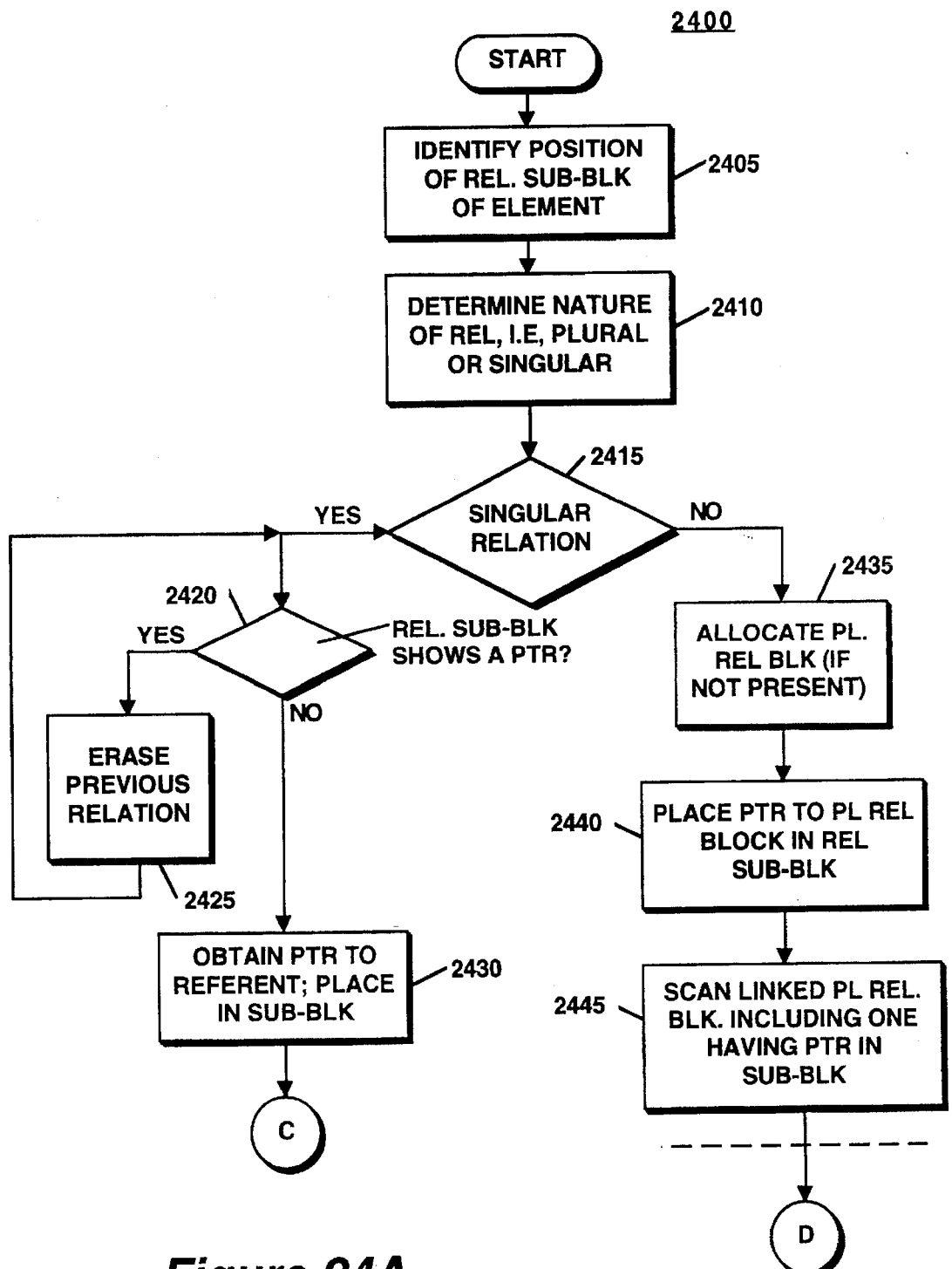
FIGS. 24A and 24B show a flow chart depicting the steps involved in a preferred method of creating a relation in accordance with the present invention.
Figure 24B:
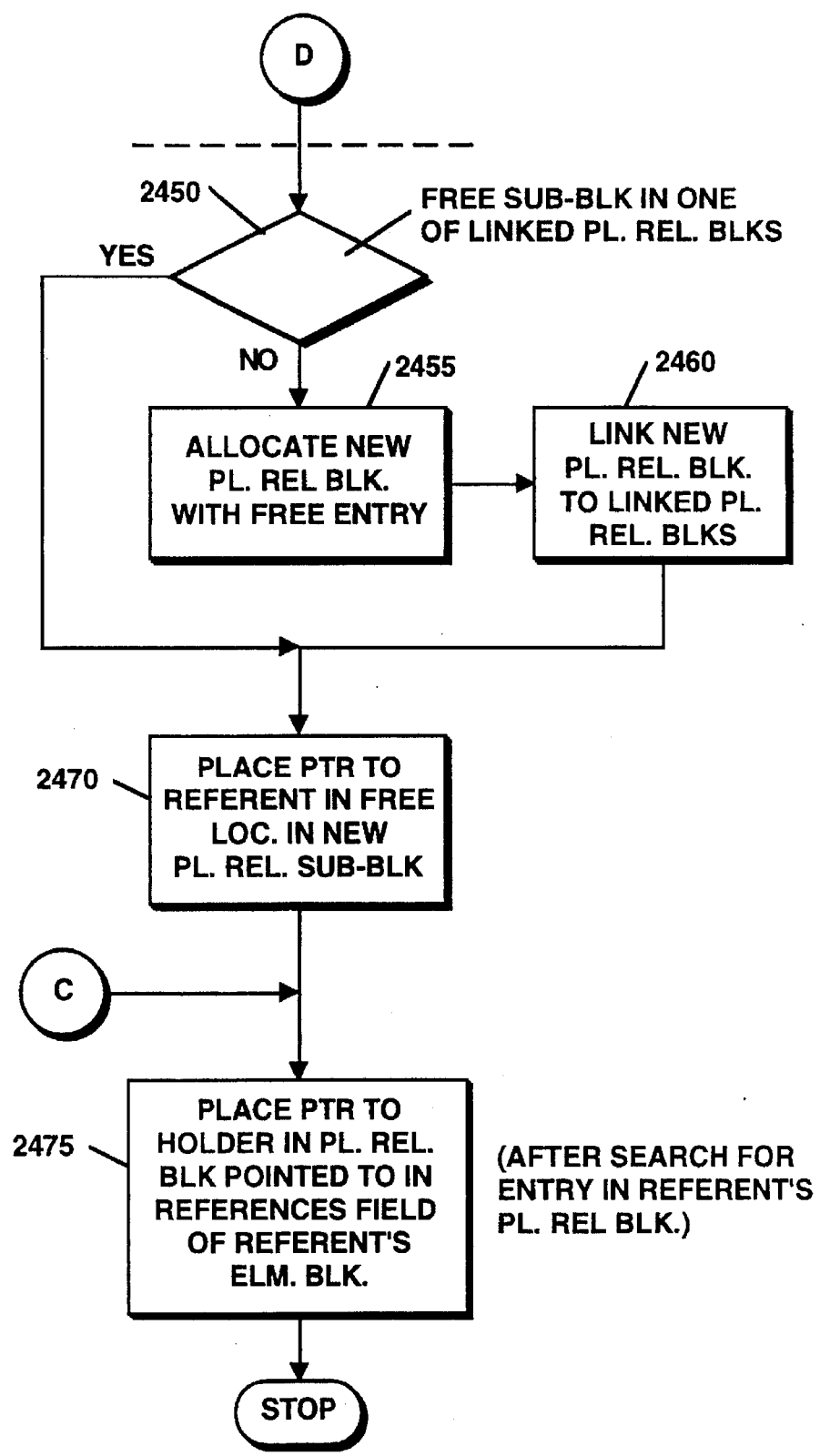

The steps shown in FIGS. 23A and 23B are sufficient for creation of an element data object. To create a relation data object, additional steps are needed. FIGS. 24A and 24B show a flow chart 2400 depicting the steps involved in creating a relation between the new element and a referent attribute data object. As indicated previously, node data descriptors in an application program database may be used to form a relation. Alternatively, the relation may be formed by computations performed by one of the application programs. Thus, a node data descriptor from one of the application programs can be extracted for use in creating a relation attribute data object. This extraction function is described in greater detail below. When extracting the node data descriptor, the appropriate attribute data object to be the referent attribute data object for the relation data object is selected.

Once the extraction and selection are complete, the relations sub-block 606 in the proper element block 602 is then identified (Step 2405). From the position of the relation sub-block 606 in element block 602, the nature of the relation between the holder attribute data and the referent attribute data object (i.e., plural or singular) can be determined (Step 2410).

If the relation is singular, a pointer from the holder attribute data object to the referent data object will be provided in relation sub-block 606 of the element block for the corresponding element. If the relation is to be plural, a pointer to a plural relation block 612 will be provided in that relation sub-block 606. A referent pointer to the referent data object will then be provided in the plural relation block 612 identified by the pointer in the element block 602 for the corresponding element.

If the new relation is singular, a determination must be made whether the relation sub-block 606 (see FIGS. 8, 10A and 10B) of the holder attribute data object already contains a pointer (Step 2420). If this is also true, creation of the relation will be temporarily halted while a previous relation specified in relation sub-block 606 is erased so that a new singular relation can be created (Step 2425). When relation sub-block 606 does not contain a pointer to a referent attribute data object, then a object pointer to the referent attribute data object for this relation is obtained and placed in relation sub-block 606 (Step 2430).

If the relation to be created is not singular, then a plural relation block 610 is allocated for specifying the new relation data object, unless one has already been allocated (Step 2435). A pointer to the plural relation block for the new relation is then placed into the appropriate relation sub-block 606 (Step 2440).

Next, the plural relation sub-blocks 614 (see FIGS. 8, 13A and 13B) of the allocated plural relation block 610 are scanned as well as plural relation sub-blocks 606 in other plural relation blocks linked to the pointed to plural relation block 610 (Step 2445). As described above, plural relation blocks 610 are linked by means of NEXT and PREVIOUS pointers, so scanning preferably proceeds using those pointers.

If none of the scanned plural relation sub-blocks 614 are free (Step 2450), then a plural relation block which contains a free plural relation sub-block 614 is allocated (Step 2455). A sub-block is free if it does not contain a valid pointer to an object block 602 for a referent data object. The newly allocated plural relation block 610 is then linked with the other plural relation blocks 610 for the new object (Step 2460).

After the allocation and linking of a new plural relations block 610, or if a free sub-block in one of the linked plural relations block was located, pointer to the referent data object is obtained and placed in the free plural relation sub-block 614 of the plural relation block 610 (Step 2470). Next, or after the pointer for a singular relation is obtained, the pointer for the referent is placed into one of the plural relation blocks 610. That block 610 is the one accessed from the REFERENCES pointer 935 of element header block 604 for the element block 602 of the holder attribute data object (Step 2475).

(3) Relation Erasure

Figure 25:
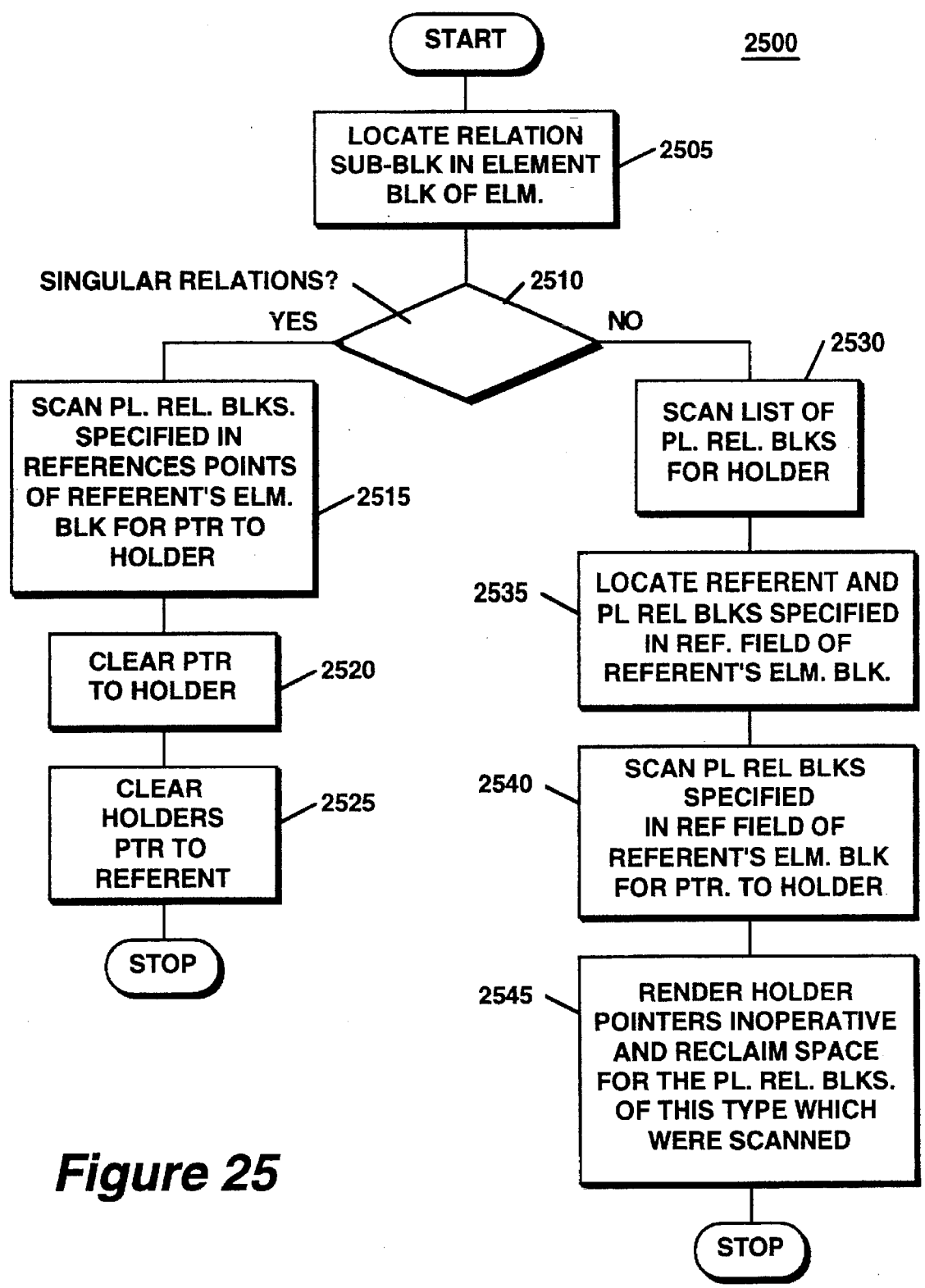
FIG. 25 shows a flow chart depicting the steps involved in the preferred method of erasing a relation in accordance with the present invention.

This section describes erasure of all relations of a given type held by a given element. Relation erasure involves freeing the memory of space used to hold the pointers which relate an attribute data object to its referent attribute data object. FIG. 25 shows a flow chart 2500 depicting the steps involved in the preferred method of erasing a relation.

First, the relation sub-block 606 used to relate the relation's holder attribute data object and referent attribute data object is located (Step 2505) using the OFFSET 1830 of the relation type.

Next, a determination is made, according to the relation type, whether the relation is singular (Step 2510). If so, the plural relation blocks 610 specified in the REFERENCES pointer 935 of the referent's element block 602 are scanned to find the object pointer to the holder attribute data object for this relation (Step 2515) when the type is not numeric, a date or a string. Then the object pointer to the holder attribute data object is cleared from the plural relation block pointed to by the REFERENCES pointer 935 of the referent's element block 602 (Step 2520). Finally, sub-block 606 in the holder attribute data object which contains a pointer to the referent attribute data object is cleared along with any string data pointed to (Step 2525).

If the relation to be erased is not a singular relation, then plural relation blocks 610 of the holder attribute data object are scanned unless the referent type is numeric, a date or a string (Step 2530). The purpose of the scanning is to locate the plural relation blocks 610 accessed by the REFERENCES pointer of the element block 602 for the indicated referent attribute data objects those referent attribute data objects are the ones pointed to by the referent pointers in those plural relation blocks 610 of the appropriate type for the holder attribute data object of the relation to be erased (Step 2535). Next, the plural relation blocks 610 accessed by the REFERENCES pointer 935 of those referent attribute object blocks are scanned to find a pointer to the holder attribute data object (Step 2540).

When the pointer to the holder attribute data object is found in a plural relation block 610, the holder pointer to the referent attribute data object is rendered inoperative by resetting the corresponding bits in BIT MASK field 1230. That BIT MASK field 1230 is found in the plural relation header blocks 612 for the plural relation blocks 610 in which pointers to the holder attribute data object pointer are found. Finally, the space for plural relation blocks 610 which were scanned is reclaimed along with any string data pointed to and the relation sub-block is cleared (Step 2545).

(4) Element Erasure

Figure 26:
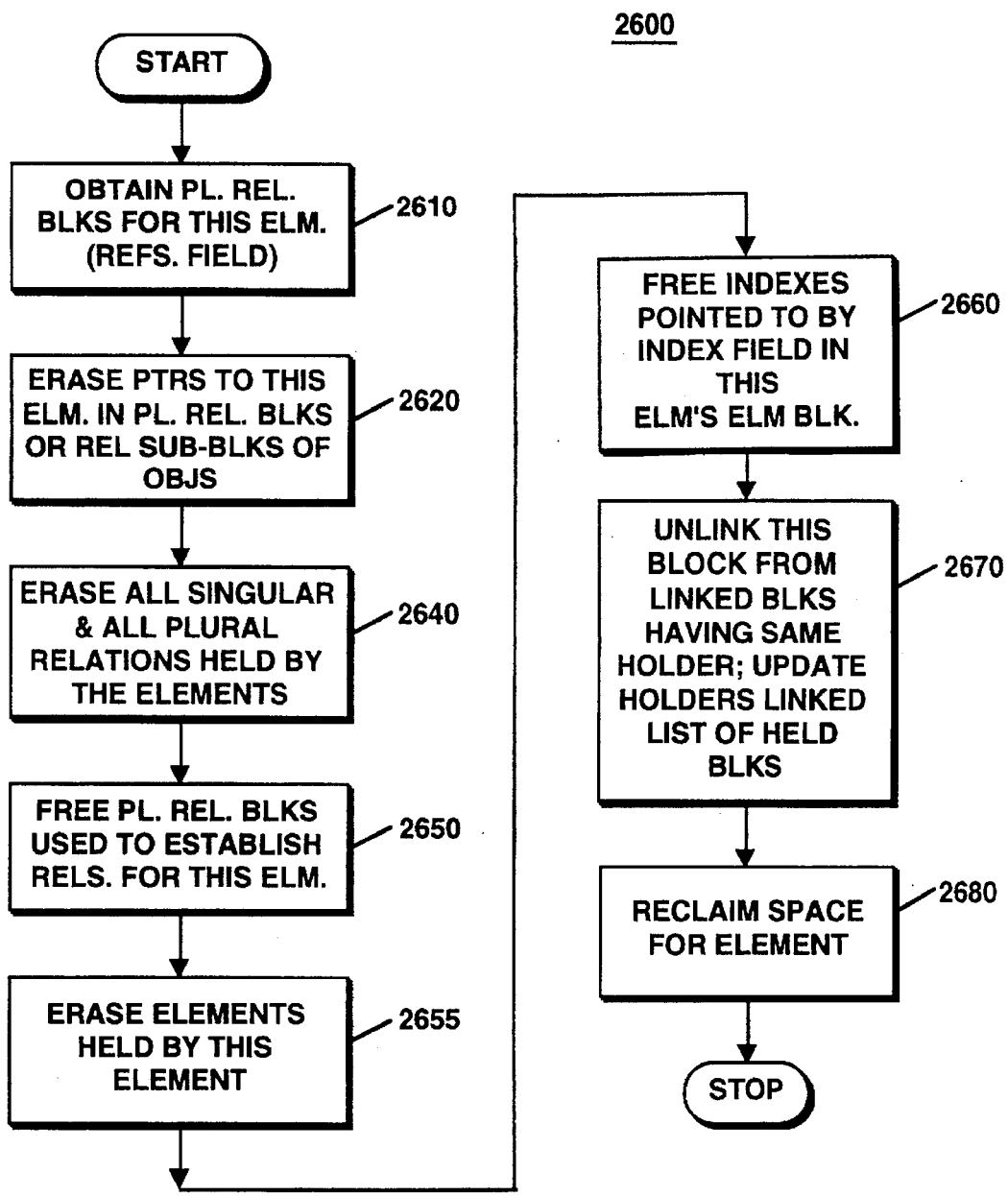
FIG. 26 shows a flow chart describing the steps involved in erasing an element data object in accordance with the present invention.

FIG. 26 shows a flow chart 2600 describing the steps by which an element object is erased. After this element is accessed, plural relation blocks 610 for the object being erased are obtained from REFERENCES pointer 935 for the element to be erased (Step 2610).

Next, pointers to this element are erased from the plural relation blocks under the elements accessed from those plural relation blocks (Step 2620).

After erasing these pointers, all singular and plural relations held by the element are erased (Step 2640) and space used by any plural relation blocks associated with this element is also freed (Step 2650). All element blocks held by the element are erased by recursive use of this procedure. Elements or objects held by this element are then erased (Step 2655). Next, indices pointed to by the INDEX pointer 1120 in the element block for the element being erased are freed (Step 2660). The element block for the element being erased is unlinked from element blocks for the other elements having the same holder (Step 2670). Finally, space for the element is reclaimed (Step 2680).

(5) Accessing an Attribute Data Object

From the organization of the preferred data structures described above, as well as from the preferred methods for creating and erasing elements and relations also described above, different ways of accessing elements and relations will be apparent to persons of ordinary skill in the art. Accessing, of course, depends upon the type of information desired, and the data structure provided in the preferred embodiment show pathways for such accessing.

Figure 27A:
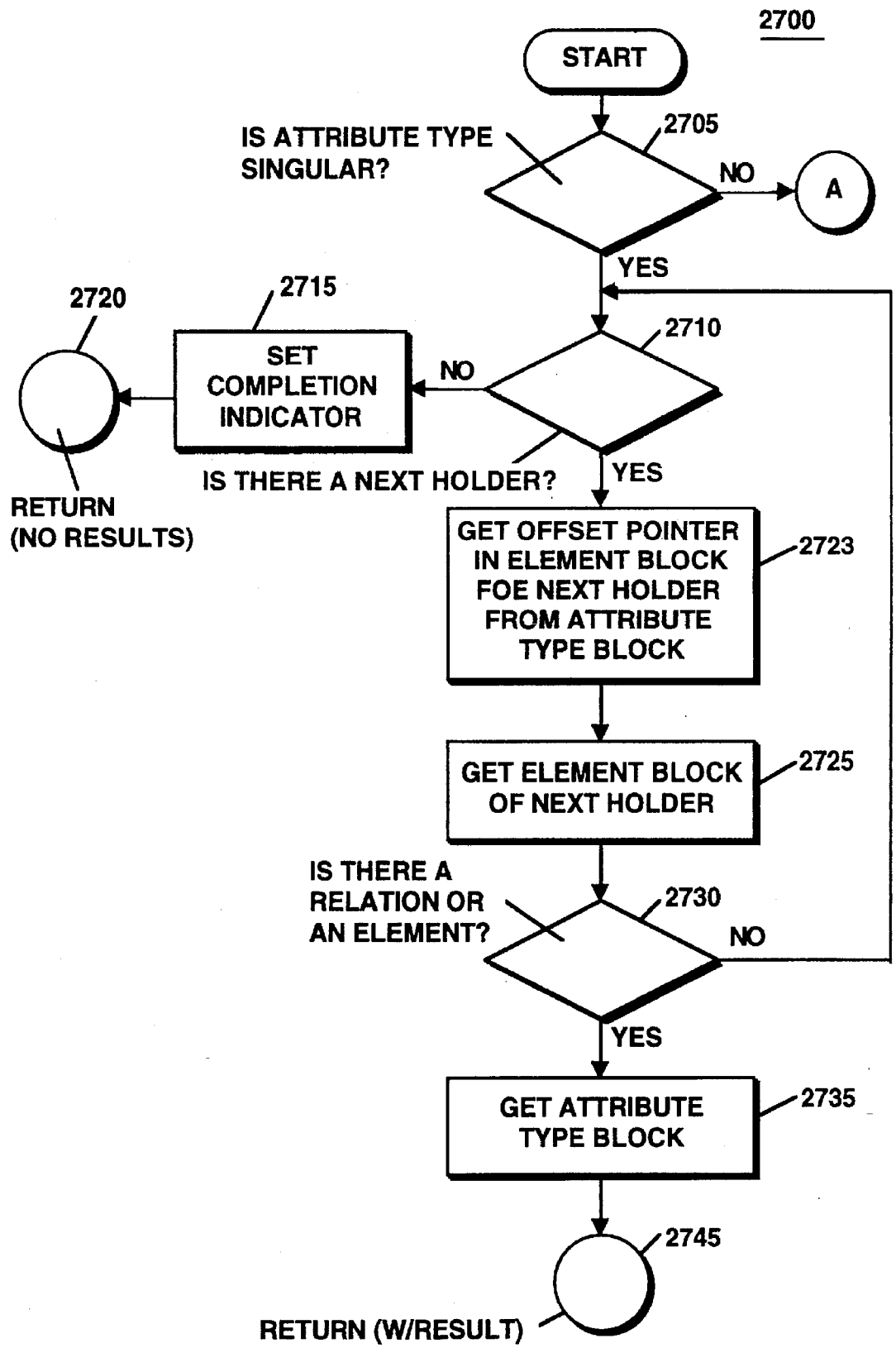
FIGS. 27A and 27B show a flow chart describing the steps involved in the preferred method of accessing the common data structure in accordance with the present invention.
Figure 27B:
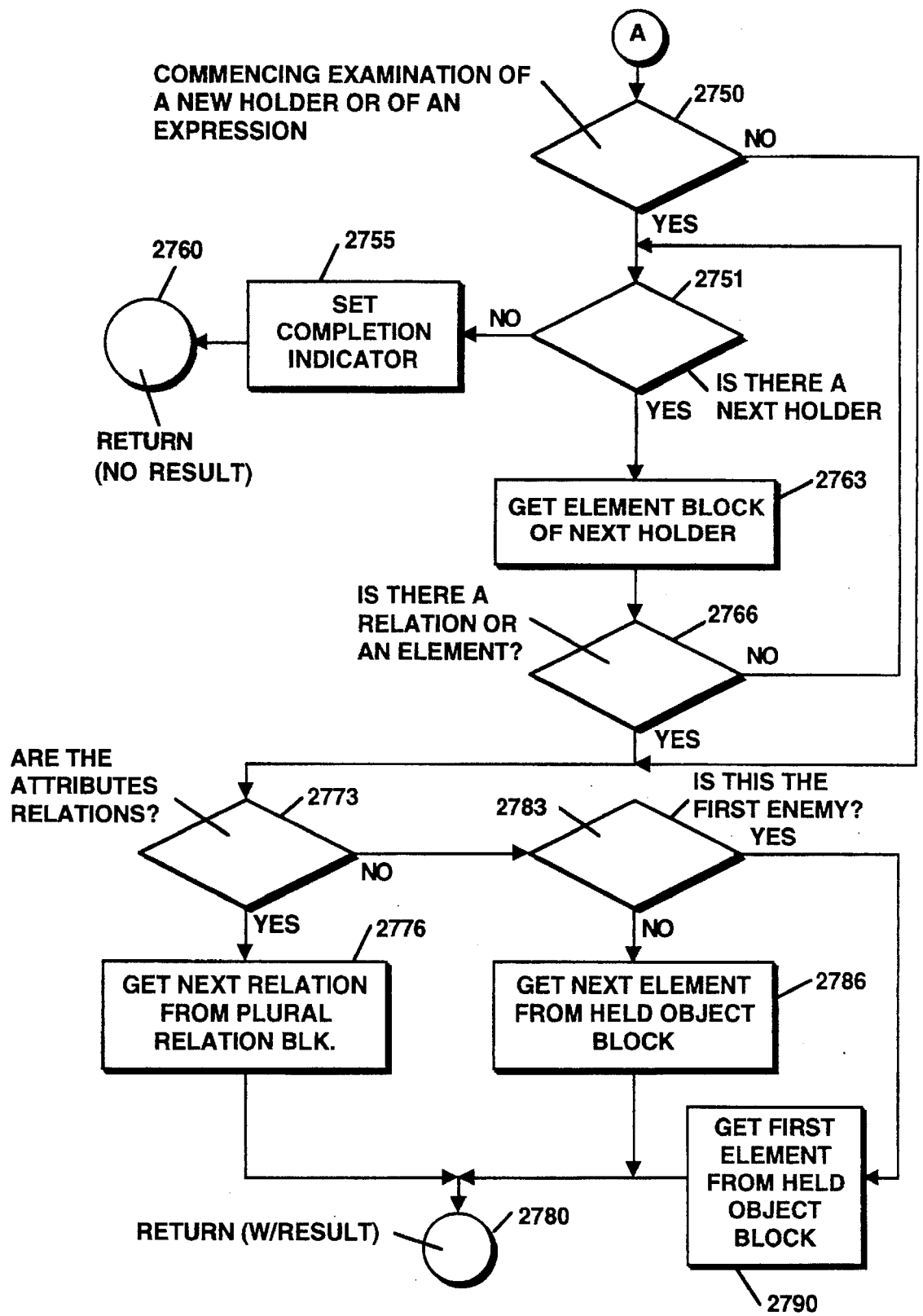

FIGS. 27A and 27B show a flow chart 2700 describing a preferred method of accessing common data structure 140 or 140' to find either the elements having a being-held relationship with a given element or to find referents of certain relations of that element. The procedure reflected by flow chart 2700 may also be used to obtain held elements and referents of relations for multiple attribute data elements. The described method is not the only such method, but it is provided as illustrative of the types of methods which can be used to carry out the purposes of this invention.

Flow chart 2700 assumes that during the creation of the common data structure 140, a compiler or some similar sort of language processing software (included in converter programs 540 and 570) generated a virtual address or offset for each identifier. The flow chart further assumes that common data structure placed that virtual address or offset in an address table located in a common area of memory 120 so it could be accessed by retrieval programs, such as retrieval programs 580 and 590 shown in FIGS. 5A and 5B. Those retrieval programs are preferably interpreters, but they could also be any other type of language processing software, such as compilers.

Flow chart 2700 also assumes that prior to its execution, a virtual address for accessing a referent or held element of the given element has already been retrieved as have the virtual addresses of the attribute type block 714 corresponding to the relations or elements (collectively called attributes) to be fetched. The given element(s) will be referred to as the holder(s).

The first determination to be made upon entering flow chart 2700 is whether the relations for a holder of a given type are singular or plural (Step 2705). If singular, the next determination is whether there is a first or next holder of the element(s) or relation(s) to be accessed (Step 2710). If there is no such holder, then a completion indicator is set (Step 2715), indicating that the search for all the holders is complete, and the execution of the access routine is ended with a return of no result (Step 2720).

If there was a next holder, the offset field (e.g., 1830 shown in FIG. 18) from the attribute type block is then used to find the offset from the start of the holder's element block to find a pointer to any element block for the relation or element desired (Step 2723). The element block of that next holder is then retrieved by using the virtual address from the address table in the common area of memory 120 (Step 2725). Next, a determination must be made to see whether there is a relation or held element for this particular holder (Step 2730). If so, (i.e., if the appropriate pointer is not zero), then the virtual address for the attribute type block of the desired attribute is examined to access that attribute (Step 2735). When there is a non-zero pointer, the information about the desired referent or held element is returned (Step 2745).

If the appropriate pointer is zero (Step 2730), then there is no relation or element of the required type in the element block of the next holder attribute data object. In this case, if a plurality of holders is specified, then a search continues either until a holder is found with a relation or an element to be returned (Steps 2710, 2723 and 2725), or until there are no more holders (Steps 2710, 2715 and 2720).

If, in the initial determination, the attribute type was found to be plural (Step 2705), then a determination is made whether execution of the access is first commencing (i.e., is the examination of the entire expression commencing) or at least commencing examination of a new holder element (Step 2750). If so, then as with the single attribute type, the next determination is whether there is some next holder (Step 2751). If not, the completion indicator is set (Step 2755), and a return is made with no results (Step 2760).

If there is a next holder, then the element block for that next holder is retrieved (Step 2763), and a determination is made from that element block whether there is a relation block 610 or a first held element for the next holder. This can be determined by examining the element block for the next holder (Step 2766). If no attribute exists for the next holder, then subsequent holders are obtained and examined until either a holder is obtained which has an attribute (Steps 2751 and 2763) or until there are no more holders (Steps 2751, 2753 and 2760).

From the attribute type block, a determination is made whether those attributes are relations (Step 2773). If so, then the next relation is retrieved from the corresponding plural relation block (Step 2776). Associated with the access of this plural relation block is a "place indicator" which keeps track of the next one of the relations from the plural relation blocks to be accessed. This is done because the routine in flow chart 2700 only returns one result in each access. When the last relation from the plural relation block 610 is obtained, the "place indicator" directs that the next inquiry into the existence of a relation or an element to be obtained be answered in the negative. Each time a relation is obtained, the "place indicator" is updated to the next position, and a return from the procedure is made with the indicated result (Step 2780).

If the desired attributes were instead found to be elements or if the examination was not commencing (Step 2773), then a determination would be made whether that element was the first in a linked list of elements having a being-held relationship with the holder (Step 2783). If not, then the next held element is obtained using NEXT field 925 from the element accessed immediately prior to the present element (Step 2786). A different "place indicator" which keeps track of the next associated one of the elements to be accessed is updated to point to the next of the held objects. The return is then made with indicated result (Step 2780).

If the desired element was the first of the held elements (Step 2783), then the held object block is obtained using the offset pointer and the holder attribute data object's element block, and the appropriate place indicator is initialized (Step 2790). The return is then made with the indicated result (Step 2780).

Figure 28:
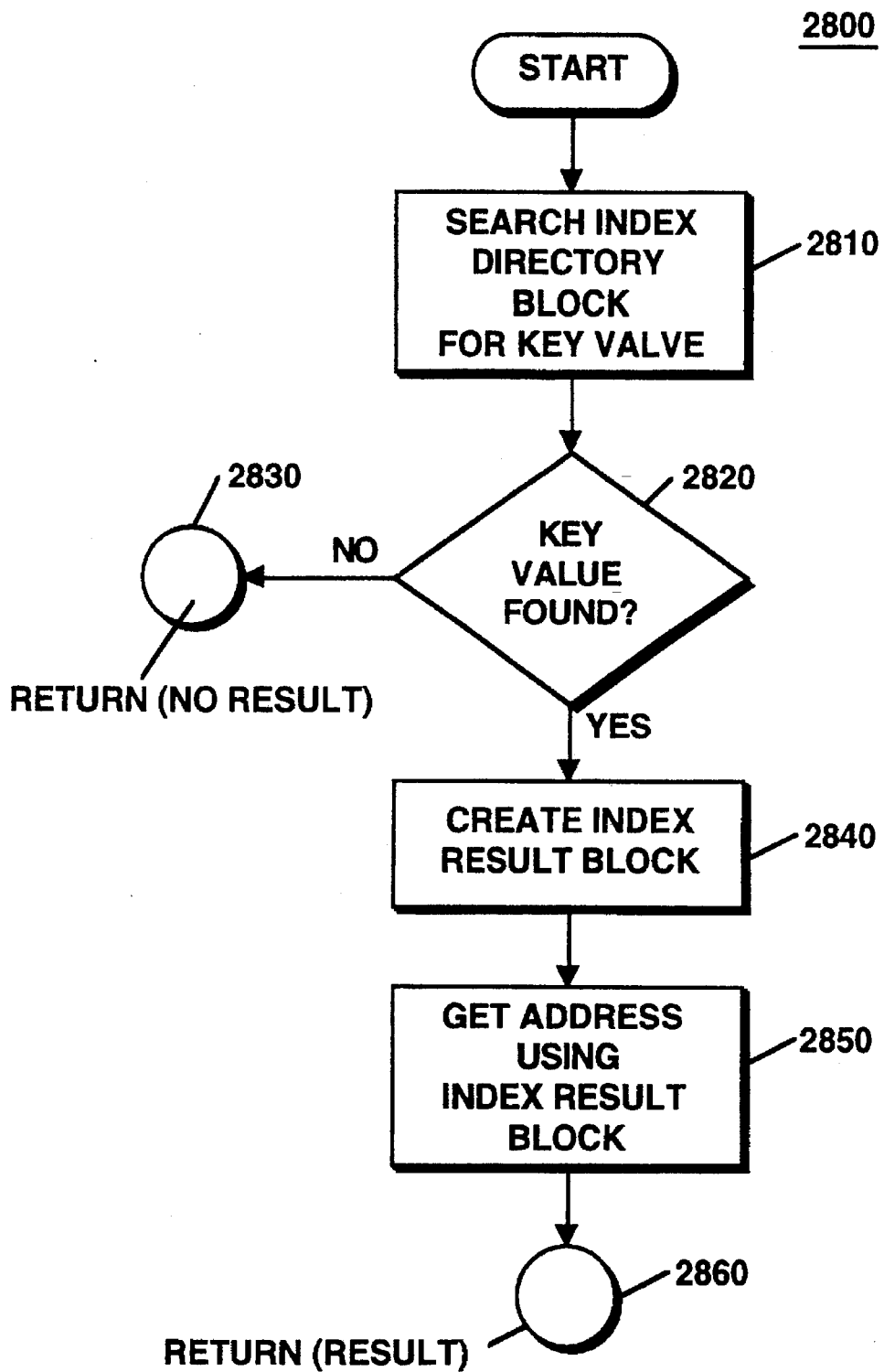
FIG. 28 shows a flow chart describing the steps involved in an alternative preferred method of accessing the common data structure using key values in accordance with the present invention.

FIG. 28 shows another example of an access procedure. The flow chart 2800 in FIG. 28 is used for finding an attribute data object using the index file 800 and a key value. Again, it must be remembered, that flow chart 2800 is only one method of access and is not meant to limit the invention.

When using a key value to identify and find an attribute data object, the index directory block (see index directory block 630 in FIG. 8) is searched for that key value (Step 2810). If that key value is not found (Step 2820), then a return is made from the routine in FIG. 28 with no result (Step 2830).

Figure 28A:
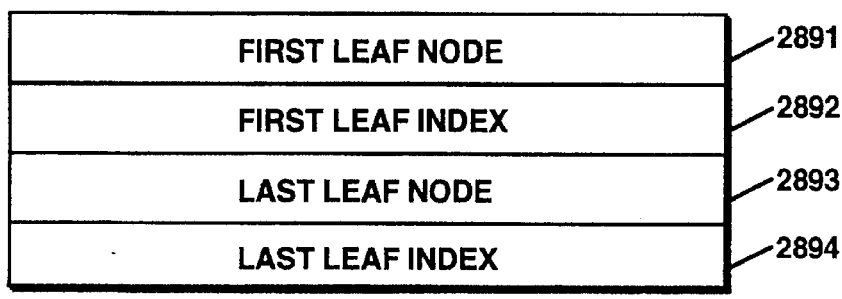
FIG. 28A shows an index result block.

If a key value is found, then an index result block 2890 shown in FIG. 28A is created with four longwords set to the following values (Step 2840). First leaf node 2891 is set to the pointer of the leaf index branch block 810 containing the first occurrence of the desired key value. First leaf index 2892 contains the ordinal of the index branch sub-block 830 in the index branch block 810 which is the first occurrence in the leaf index branch block. Similarly, last leaf node 2893 and last leaf index 2894 contain a pointer and ordinal, respectively, for the last occurrence of the desired key value. Index result block 2890 is a temporary data structure created only for access using index file 800.

Next, the address of the desired element(s) is found using index result block 2890 (Step 2850). If the key is unique, then first and last occurrences are the same. If the key is not unique, as may be the case for the ordering index, then the complete set of valid results can be found using the index result block 2890 because the index branch blocks are linked. The pointer to the attribute data object is found using the result block.

If the key value is found, it will contain an address in the attribute data file 600 for a corresponding attribute data object. A return from this procedure is then made with the indicated result (Step 2860).

E. Data Organization, Extraction, and Conversion

In accordance with this invention, the information used by application programs such as programs 530 and 560 shown in FIGS. 5A and 5B, must be fit into an organization of common data structure 140 (or 140'). In many cases the application programs are previously written in terms of their own databases, and in other cases application programs may already use attribute data objects organized in accordance with the present invention.

The process of extraction and conversion refers to the methods by which data from application program databases are converted to the common data structure 140 (or 140'). As shown in FIGS. 5A and 5B, converter programs 540 and 570 take data from the application databases and convert that data from the format in those databases into a format proper for common data structure 140 (or 140').

There are several ways to organize a common data structure according to the present invention for each application program database. The organization and conversion of the application program data for the the common data structure likely depends upon the contents of the data in the application program database, as well as upon the anticipated usage of the common data structure.

Organization of the common data structure, and consequently extraction and conversion, need not follow absolute and unwavering rules. Instead, this section contains some general guidelines and design considerations for persons desiring to practice this invention. Additional guidelines and design considerations will be apparent to persons of ordinary skill in the art, without undue experimentation, from the entire description of the preferred embodiment such as the construction of the preferred data structures and the preferred methods of access, creation, and erasure.

Quite often, the first concern in building a common data structure according to this invention is the selection of element data objects. The information in the application program from which element data objects are often selected can be referred to as node data. Node data generally includes "things" that are either "objects" or "subjects" in the database. In terms of parts of speech, therefore, element data objects are most likely data that would be described by nouns. For example, node data can include physical objects, such as circuits, gates, portions of an engine, or persons. Node data can also include events, such as time line entries or filing dates. Another example of node data are concepts, such as ideas and colors.

Once the elements are selected, then the holding relationships between elements are established. The determination of holding relationships usually reflects some hierarchy among the elements. As with the selection of elements themselves, the determination of the hierarchy reflected by the holding relationship is, in most cases, not unique. Preferably, the determination of the holding relationship should also take into account the anticipated use of the data. The existence of a relationship between two elements (or between an element and a relation) does not necessarily mean that such a relationship should be reflected as a holding relationship in the common data structure. That relationship can also be represented by the nonhierarchical relationship indicated by the relation data objects.

The types of relationships which are most often reflected in the holding relationship reflect some natural hierarchy, such as officers of a corporation, or reflect the constituent parts of a thing, such as the parts of a machine, the chapters of a book, or cities in a state. The holding relationships can also reflect the possession of one thing by another.

Once the holding relationships are determined, however, a context must usually be selected. As explained in an earlier section, the context is a construct to help in naming attribute data objects since the names of such objects have meaning only in the context holding those objects. The context should be used to reflect groupings of related attribute data objects for convenience of reference and to allow the use of specialized vocabulary. For example, design information about printed circuit boards might be organized into a different context from design information about VLSI chips, so that terminology familiar in either application area can be used without conflict. In the example demonstrated in FIGS. 3 and 4, the term "gate" can have different meanings in these two application areas. The use of separate contexts allows the same term "gate" to have different meaning in each context.

One can also have several layers of contexts. For example,. a first context may contain objects related to general application concepts such as version tracking and project management. Each of a plurality of contexts held by the first context might contain attribute objects for particular technologies, such as mechanical or electrical.

Relations are usually determined next. After the node data are assigned as elements, the information remaining usually concerns the relations or attributes of such node data which, if not reflected in the hierarchical holding relatioships, can be thought of as generally reflecting descriptors of the node data. The purpose of the relations is to reflect nonhierarchical relationships that exist among attribute data objects. The relations are created so that they associate the appropriate objects in order to reflect the relationships between node data and their descriptors as expressed by the original application data. Examples of node data descriptors, preferably represented by relations, include the connection of gates to signals, the identification of the designer of a circuit, and the connection of events in a project plan.

The final steps of data organization involve type determination and selection of key values. The "typing" of an attribute generally follows the designation of elements and relations, as well as the designation of holding relationships. The types generally reflect the sets into which the elements and relations have already been grouped and describe the commonalities of the elements or relations in those sets.

The selection of key values depends again on the data. The use of key values is primarily an aid to access, so the determination and selection of the keys should follow the anticipated usage of common data structure 140 or 140'. In addition, the use of key values may reflect an ordering of the information in the application programs databases to facilitate use of such information by the application programs.

The details of converter programs 540 and 570 are specific to the requirements of application programs 530 and 560, respectively, the following example of the processing performed by such converter programs is provided to illustrate the guidelines provided above. If an application program 560 generates the circuit shown in FIG. 3, file 565 (FIG. 5A) might contain the following information descriptive of the circuit.

| | |
| --- | --- |
| 1) | ADD 3-I-A; 320; |
| 2) | ADD 320.322/S2 |
| 3) | 320.324 |
| 4) | 320.326 |
| 5) | 320.328/S1 |
| 6) | |
| 7) | ADD 2-I-A: 330; |
| 8) | ADD 330.332 |
| 9) | 330.334/S1 |
| 10) | 330.336/S2 |

Each non-blank line of this file represents a node datum. Line 1 calls for the creation of three-input AND gate 320. Lines 2 through 5 call for the creation of pins 322, 324, 326, and 328 of gate 320. Line 7 calls for the creation of two-input AND gate 330. Lines 5 and 9 indicate that pin 328 is connected to pin 334 by signal "S1." Similarly, lines 2 and 10 indicate that pin 322 is connected to pin 336 by signal "S2."

Converter program 570 could be designed to read file 565 and create common data structure 140 or 140' representing the circuit of FIG. 3 using operations described in the proceeding sections. Part of the common data structure so created is shown in FIG. 4. Each of the "things" (i.e., gates and pins or signals) is an element. The holding relationships represent the hierarchy implicit in the creation—first the AND gates, then the pins or signals. The remaining relationships, such as signal connections and names, are created as relations.

F. Storage Management

As may be expected, the amount of storage required to implement an embodiment according the present invention can be quite great. This section discusses a preferred embodiment of a storage management technique for maintaining, updating and accessing common data structure 140' in order to achieve benefits such as a reduction in the amount of required storage. This preferred embodiment of a storage management technique is also designed to provide an easy and efficient means of accessing and updating the data structure 140' of memory 120 by application programs.

The description of the storage management technique is based upon the representation of the system shown in FIG. 5B showing common data structure 140' as including a copy of master data file 515, snapshot data file 525, and control file 555 with locks 568 and 569. Storage management software 566 controls the files in common data structure 140'.

Figure 29:
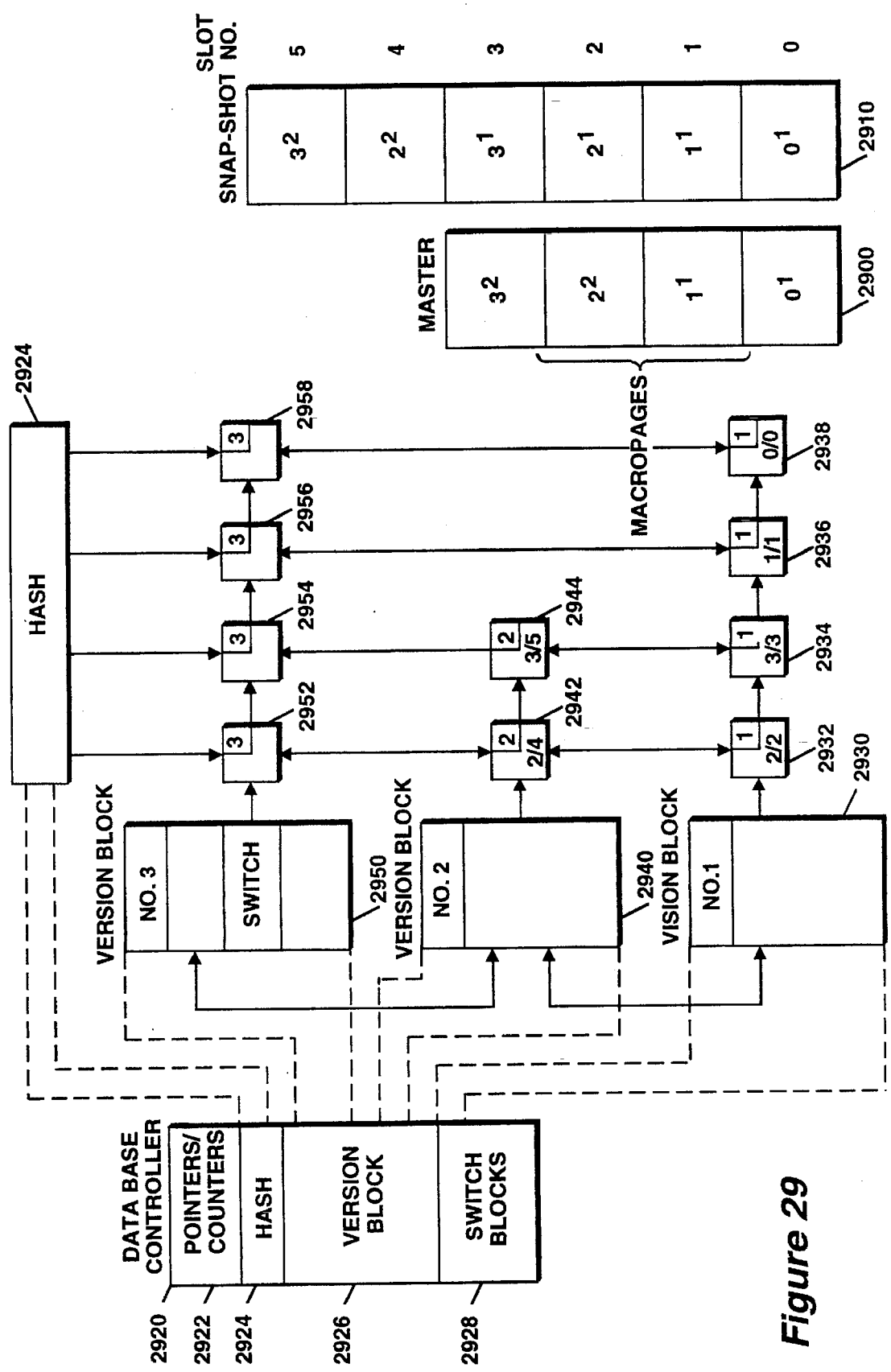
FIG. 29 shows a detailed block diagram of a preferred embodiment of common data structure 140' in accordance with the present invention.

A block diagram of an embodiment of common data structure 140' is shown in greater detail in FIG. 29. FIG. 29 includes a master data file 2900, which corresponds to master data file 515 in FIG. 5B. Master data file 2900, shown as including macropages 0–3, corresponds to the most recent version of the common data structure 140'. That most recent version is either the version currently being modified or the one which was most recently modified.

As FIG. 29 shows, each macropage in master data file 2900 has an associated numbered entry composed of two portions. The larger number of an entry refers to the macropage number and the superscript portion of an entry refers to the version number. The version number indicates a version of the database as updated by a single user. In accordance with the preferred embodiment, newer versions always have a higher number than older versions. The total number of macropages depends on the total size of the database.

Snapshot data file 2910 corresponds to snapshot data file 525 in FIG. 5B and includes several slots 0–5. Each slot contains a macropage and corresponds to one of the macropages from either the current version of master data file 2900 or from a previous version of that file. The macropages from previous versions of the master data file 2900 still maintained in snapshot file 2910 are for versions which are still active. A version is still active if there is at least one application program or user which is currently accessing macropages of that version.

The numbered entries associated with each macropage in snapshot data file 2910 include as the larger number a value for the corresponding macropage in master data file 2900, and include as a superscript a number indicating the version of that macropage.

After master data file 2900 is updated, those macropages from the master data file 2900 which were changed are copied into slots of snapshot data file 2910. This copying accounts for the multiple versions of macropages from the master data file 2900 which are stored in snapshot data file 2910. The snapshot data file must not grow indefinitely, so housekeeping routines, which are explained in greater detail below, are invoked to remove outdated macropages.

Certain of the slots of snapshot data file 2910 are referred to as a "natural slots." A "natural slot" refers to a slot in snapshot data file 2910 having a slot number which is the same as the corresponding macropage number. This is the state of snapshot data file 2910 when it originally receives the contents of the master data file 2900. This initial state, in which all the macropages are in their natural slots, is desired for efficiency.

Data Base Controller (DBC) 2920 controls the storage management functions. DBC 2920 corresponds to the control file 555 in FIG. 5B. In general, DBC file 2920 controls the modification of data structure 140' as well as the access to that data structure. DBC 2920 controls the modification of data structure 140' by managing and keeping track of changes to the data structure and by ensuring, through the use of ALTER lock (See FIG. 5B) that only one user can make modifications to a version of a macropage of the data structure. DBC file 2920 controls access to the data structure by keeping track of the location of all active macropages and by preventing collisions with certain users through the use of DBC lock (See FIG. 5B).

DBC 2920 contains four major components. One component is pointer/counter section 2922 which indicates where the other portions of DBC 2920 reside. Another component is HASH table 2924 which provides a means for locating the active macropages in snapshot file 2910. Version block section 2926 contains version blocks, such as blocks 2930, 2940, and 2950, which contain information about different versions of data structure 140'. Switch block section 2928 contains section blocks, examples of which are 2932, 2934, 2936, 2938, 2942, 2944, 2952, 2954, 2956 and 2958, which contain information about the active macropages. Preferably, different kinds of switch blocks are used for changes in attribute file 600 and in index file 800. If, however, the information in attribute file 600 and index file 800 resided in a single file, one kind of switch block would be needed. In the ensuing discussion, the discussion about switch blocks applies to changes either in attribute file 600 or index file 800.

FIG. 30 shows a preferred embodiment of pointer/counter sections 2922 in greater detail. As shown in FIG. 30, pointer/counter section 2922 preferably contains a user count 3005 and several other fields and pointers. User count 3005 indicates the total number of users which are accessing or modifying common data structure 140'. Each time a new user wants to access common data structure 140', the storage management software obtains the DBC lock, increments user count field 3005, and returns the DBC lock. The purpose of the DBC lock in this instance is to prevent multiple users from simulataneously accessing the user count and improperly incrementing it.

Rollback version number field 3010 and rollback version pointer 3015 refer to a rollback function. This function allows a user to retract certain changes made to a version of common data structure 140'. Rollback occurs only while changes which are being made to common data structure 140' by a user are still in progress. Rollback occurs either because the user performing the changes "voluntarily" decides it does not want to proceed with the changes and wishes instead to restore master data file 2900 to its state before the modifications started, or because an error makes it impossible to complete the changes.

In the preferred embodiment, the version being rolled back is fully modified in accordance with the changes specified by the user. The storage management and updating steps described below are executed, but this to-be-rolled-back version of common data structure 140' is not made available to other users. Immediately after the to-be-rolled-back version has been created, a new version, the rollback version, is created. The rollback version, by use of switch blocks in section 2928 and snapshot data file 2910, undoes all the changes brought by the to-be-rolled-back version. Accordingly, after the roll back the master data file 2900 for the rolled back version has been returned to its state before the roll back sequence was initiated.

Snapshot data file 2910 is not returned to its state before creation of the to-be-rolled back master file 2900. After roll back, snapshot data file 2910 contains two additional versions, the "bad version" that was rolled back and the new current version. As stated above, however, users are not able to read the "bad version" and the new current version is just a copy of the macropages initially changed by the "bad version." The "bad version" is already obsolete at the completion of roll back and will be deleted by housekeeping routines to be described later.

In pointer/counter section 2922, roll back version number 3010 refers to the number of the version which is "rolling back" the "bad version" and roll back version pointer 3015 points to the version block of that version number.

Next version number 3020 and next version pointer 3025 in section 2922 refer to the version of common data structure 140' which is either currently being updated or, if there is no version currently being updated, which will be the version to be updated next.

Current version number 3030 and current version pointer 3035 refer to the most recent version which is currently readable. This is the most current version which is available in snapshot data file 2910. The oldest version number field 3040 and the oldest version pointer 3045 refer to the the active version which is the least recent. Field 3040 and pointer 3045 are changed as common data structure 140' is being updated and obsolete (i.e., inactive) versions are freed.

The initial version number 3050 refers to a version of common data structure 140' existing at the time an event referred to as a "checkpoint" occurs. For purposes of error recovery, the contents of common data structure 140' in master data file 515 are replaced with a checkpoint. This "checkpoint version" may be used to continue operation of the system after the loss or destruction of part or all of the data structure 140' contents.

Initial version number 3050 indicates the newest version in snapshot data file 2910 when the most recent checkpoint occurred.

HASH table 2924 provides a means for accessing the active macropages in a manner described in greater detail below. HASH table 2924 is preferably a standard HASH Table and thus will not be described in any further detail. HASH Table 2924 preferably contains pointers to the switch block corresponding to the most recent version of each macropage. As described below, each switch block is linked to its earlier versions. Thus, by entering through HASH table 2924, a user can locate every active version of each macropage in snapshot data file 2910. Version area 2926 preferably includes a plurality of version blocks 2930, 2940 and 2950 shown in FIG. 29. Each one of those version blocks preferably contains the fields and pointers shown in version block 3100 of FIG. 31.

Version block 3100 includes a version number field 3110 which identifies the number of the version to which version block 3100 pertains. This field is also shown schematically in FIG. 29 by the numbers 1, 2, and 3 at the top of version blocks 2930, 2940, and 2950, respectively.

Version use-count field 3120 refers to the number of users currently accessing the version corresponding to version block 3100. Each time a user wishes to initiate a new version, version use-count field 3120 of the current version 3120 is incremented by one. When the user finishes with the version, use-count field 3120 is decremented by one. The purpose of the version use-count 3120 is to identify versions which are no longer being accessed so that the macropages of that version can be replaced if newer versions of master data file 2900 become available.

Newer version field 3130 points to the version block for the next most recent version of the master data file 2900. The pointer in field 3130 effects a type of linking shown schematically in FIG. 29 as version block 2930 points to version block 2940 and version block 2940 points to version block 2950.

Related to newer version field 3130 is older version field 3140 which points in the opposite direction to the version block for the next version of master data file 2900. Thus the linking between version blocks is bidirectional. As demonstrated in FIG. 29, version block 2950 points to version block 2940, which in turn points to version block 2930.

The version last changed field 3150 contains a pointer to the macropages for the corresponding version which was first changed most recently. The function of this field is explained in greater detail below, but as a brief explanation, the first time a macropage is changed for a particular version, a "next updated field" of that macropage is changed to contain the contents of version last changed field of the version block 3100, and version last changed field 3150 of version block is changed to point to this macropage. Version last changed field 3150 of version block 3100 is initially set to zero. The first time each macropage is first changed, it is linked to the head of a list of macropages changed in this version. The version last changed pointer thus points to the macropage that was first changed most recently.

The reason for this procedure is efficiency in data operation. When a new macropage is first modified, it is very possible that the macropage modified next most recently has been placed back on disk to save space in the primary memory. It would be inefficient to retrieve this macropage from disk merely to update one pointer. It is instead easier to update the corresponding field of version block 3100, since that version block always resides in primary memory.

A first attribute switch field 3160 and a first index switch field 3165 point to the switch blocks for the attribute and index files, respectively, which were the first ones created for the corresponding version. Of course if the attribute and index files are combined, then only one of these fields is necessary.

Completing version block 3100 are four version initial macropage number fields 3170, 3175, 3180, and 3185. The initial attribute macropage number field 3170 identifies the highest macropage number for the master data file 2900 corresponding to attribute file 600 at the start of that version. For the example in FIG. 29, the number in field 3170 would be 3. The initial snapshot macropage number field 3175 contains the highest macropage number in snapshot file 2910 for attribute file 600 at the start of that version. In the example shown in FIG. 29, this field would contain the number 5.

The initial index macropage number file 3180 and the initial snapshot index macropage number field 3185 have functions equivalent to those of fields 3170 and 3175, but relate to master data and snapshot data files for index file 800. The master and snapshot data files for index file 800 are not shown but are preferably identical to the master and snapshot data files for attribute file 600. Of course if the index file 800 is combined with attribute file 600, fields 3180 and 3185 are not needed.

Figure 32:
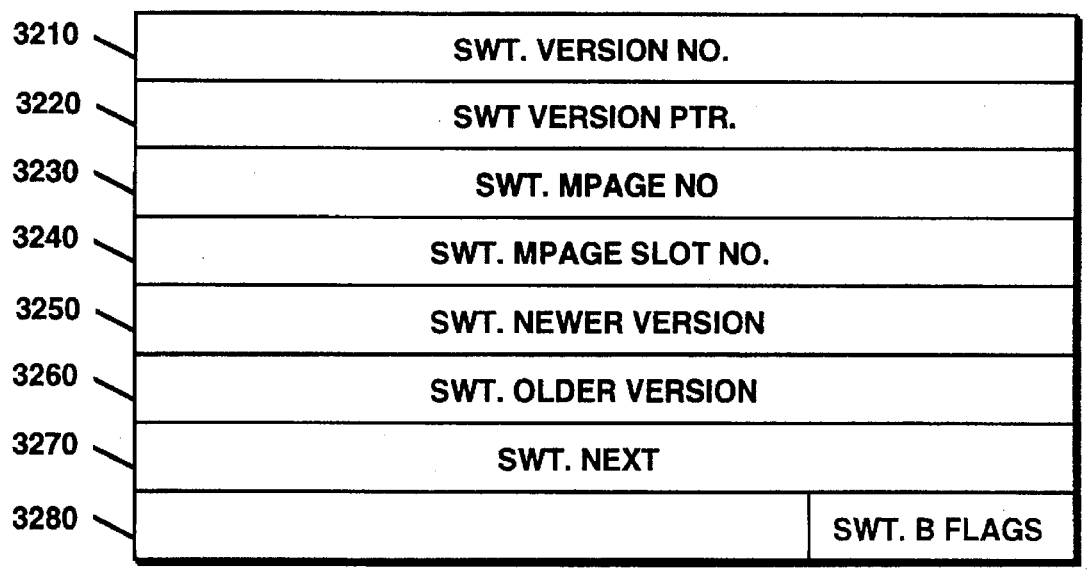
FIG. 32 shows a block diagram of switch blocks shown in FIG. 29.

The switch block section 2928 in database control file 2920 include the switch blocks, such as blocks 2932, 2934, 2936, 2938, 2942, 2944, 2952, 2954, 2956, and 2958 shown in FIG. 29. Switch block 3200 in FIG. 32 is an example of such switch blocks. The preferred embodiment of switch block 3200 applies to switch blocks which are for attribute file 600 as well as index file 800. If there is a single attribute/index file, there is only one type of switch block.

Switch block 3200 includes a version number field 3210 which identifies the version number for which that switch block exists. This number is also shown in representative fashion in FIG. 29 by the number in the upper right-hand corners in each of these switch blocks.

Switch block 3200 preferably also contains a version pointer 3220 which identifies the location of the version block for the version to which switch block 3200 corresponds. The next field, macropage number field 3230, identifies the corresponding macropage in master data file 2900, or in the equivalent master data file for index file 800. Micropage slot number 3240 identifies the slot number in snapshot data file 2910 (or in the snapshot data file for index file 800) into which the version of the macropage corresponding to switch block 3200 is stored.

The next two fields in switch block 3200 are the newer and older version fields 3250 and 3260, respectively, which contain pointers to the switch blocks corresponding to the immediately more recent and the immediately less recent versions, respectively, of the same macropages in master data file 2900 to which switch block 3200 corresponds. Although the use of these fields is explained in greater detail below when discussing how to access common data structure 140', an example of the use of such fields can be appreciated by considering FIG. 33.

To access a macropage, one enters HASH table 2924 with a desired macropage number and obtains a pointer to the switch block corresponding to the most recent version of that macropage. To obtain an earlier version of that macropage, one continues to use the older version pointers 3260 until the switch block for the desired version of the macropage is located.

Switch block 3210 also contains a switch next pointer 3270 which identifies the next switch block for the same version. The linking effected by switch next field 3270 is shown schematically in FIG. 29 by the rightward pointing arrows between switch blocks 2952, 2954, 2956, and 2958; between switch blocks 2942 and 2944; and between switch blocks 2932, 2934, 2930 and 2938. The final field in switch block 3200 is the switch b flags field which are switch b flags include a switch-v-shared-slot flag. This flag is used in roll back error recovery described above. The flag indicates that another switch block is identical to this switch block. For example, a version n of a macropage x may be a slot y. So also a version n+2 of a macropage x may be in slot y, these versions corresponding to the identical state of a version just before and just after roll back.

With the understanding of the common structural data 140' just provided, the creation and access procedures described generally for the common data structure of this invention can understood with regard to the specific implementations of this invention. Flow charts 3300, 3400, 3500, 3520, 3530 and 3700 in FIGS. 33–36 show preferred methods for updating and accessing common data structure 140' shown in FIGS. 29–32. Preferably, the procedures in FIGS. 33–36 are carried out by storage and management software 566.

Figure 33:
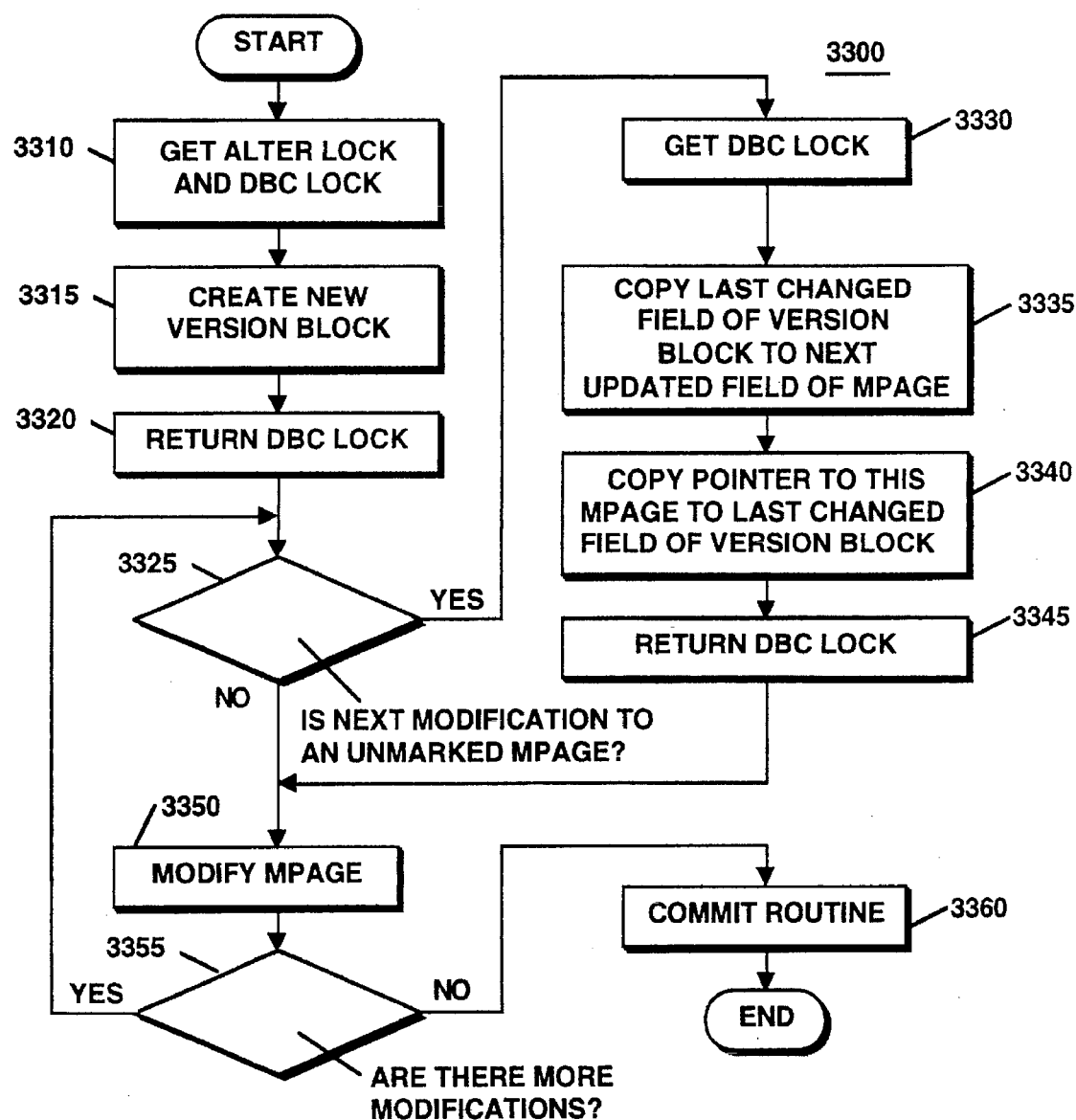
FIG. 33 shows a flow chart describing the steps involved din updating data structure 140' in accordance with the present invention.

At the outset of the procedure in FIG. 33, the ALTER and DBC locks are obtained (Step 3310). The purpose of ALTER lock 568 is to ensure that only one application is modifying the common data structure 140' at any one time. The purpose of the DBC 569 lock is to make sure that only one application is modifying the database control file 2920 at any one time.

Next, a new version block is created for this particular version (Step 3315). Then DBC lock 569 can be returned (Step 3320).

The next step is to determine whether the next modification to be made is to an unmarked (i.e., previously unmodified in this version macropage (Step 3325). If so, then several actions have to take place.

First, the application obtains DBC lock 569 (Step 3330). Next, the current contents of the last changed field of version block 3150 is copied to the next updated field of the macropage (Step 3335). Then the pointer to the macropage is copied to the version last changed field 3150 of the version block (Step 3340). Finally, DBC lock 569 is returned (Step 3345).

If the next modification was not to an unmarked page, or after the macropage has been linked to the version block, the modifications to the macropage can be made (Step 3350). Subsequently it is determined whether there are any more modifications to be made (Step 3355). If so, then the process is repeated beginning with the inquiry whether the next modification is to an unmarked page (Step 3325). If there are no more modifications to be made, then the COMMIT routine is called (Step 3360) to store the master data file 2900 macropages to snapshot data file 2910, and to indicate that this version of data structure 140' can now be accessed by other applications programs.

Figure 34:
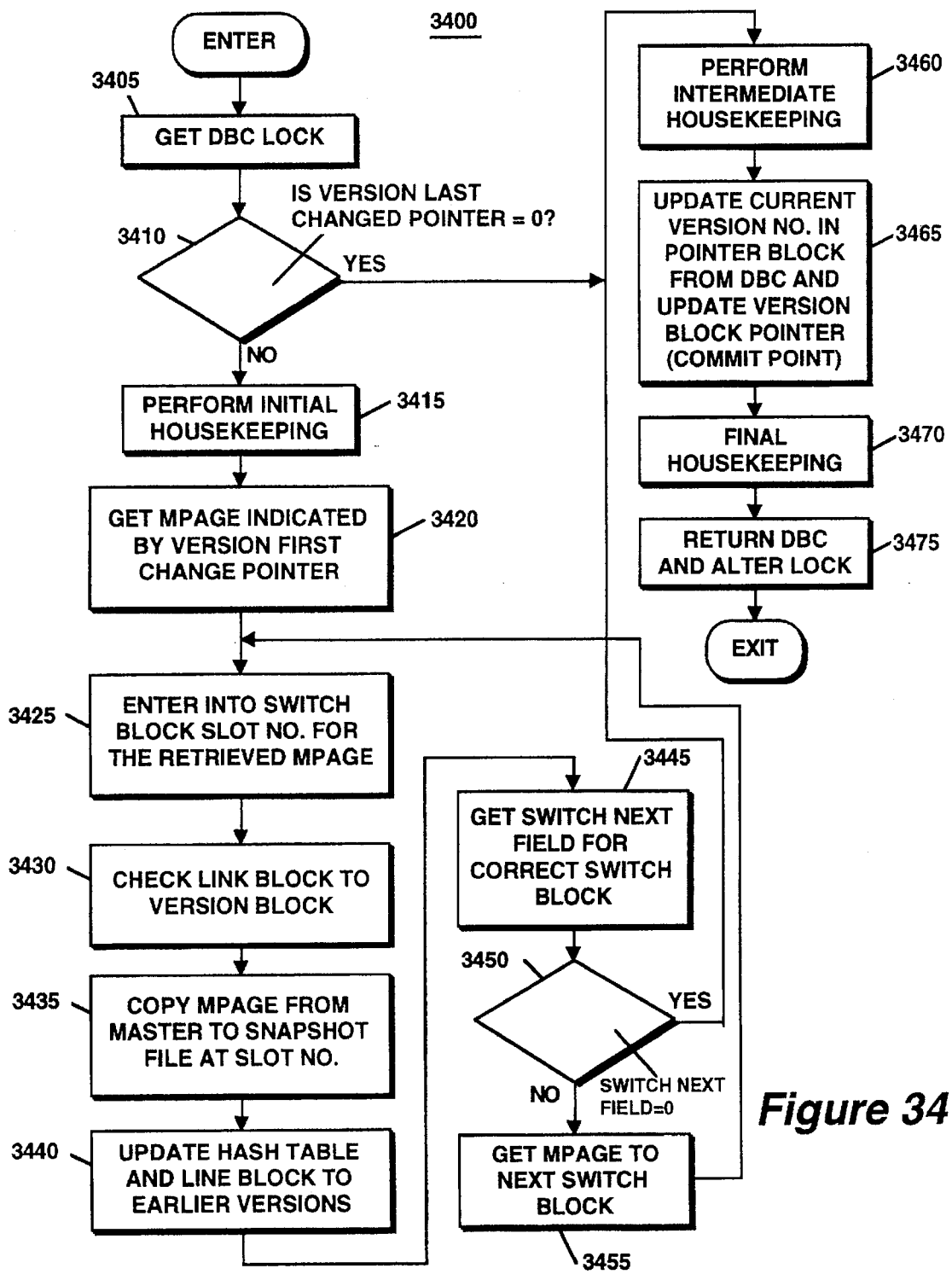
FIG. 34 shows a flow diagram for a preferred COMMIT routine indicated in FIG. 33.

FIG. 34 shows a preferred flow diagram for the COMMIT routine. The first step is to get the DBC lock (Step 3405). Next, a determination must be made as to whether the last changed field 3150 in version block 3100 is equal to zero. If so, then no changes have been made. If version last changed pointer is not equal to zero, changes have been made and initial housekeeping must be performed (Step 3415). This housekeeping is explained in greater detail below.

Next, the macropage indicated by the version last changed pointer must be retrieved (Step 3420). Then the slot number for that retrieved macropage must be updated to indicate the slot number of snapshot data file 2910 into which the retreived macropage is to be stored (Step 3425). That slot number is preferably in some sort of list contained by the storage and software 565 of free slots for snapshot data file 2910.

Next, the linkage of the switch block to the version is verified (Step 3430), and the macropage is copied from master data file 2900 into snapshot data file 2910 at the appropriate slot number (Step 3435). Then, HASH table 2924 is updated to point to the switch block for this most recent version of the modified macropage, and to link that switch block to earlier versions of the switch block for that same macropage (Step 3440).

After this updating, the next updated field of the current macropage is obtained (Step 3445). If that next updated field is not equal to zero (Step 3450), indicating that there are additional macropages which were modified, then the next updated macropage is obtained and the procedure is repeated beginning with the entry into the proper switch block (Step 3425).

If the next updated field of the current macropage is zero, then there are no more modified macropages, and intermediate housekeeping is performed (Step 3460). This step also takes place if the version first field is zero (step 3410). This intermediate housekeeping is also explained in detail below. Next, the current version number 3030 and the version block pointer field 3035 in the pointer/counter block 2922 of the data base control file 2920 are updated. This is now the commit point at which time the other applications become aware of the newest version of the master data file 2900 (Step 3465). Then final housekeeping is performed (Step 3470), and both the DBC and ALTER locks are returned (Step 3475).

FIGS. 35A–C show the procedures followed in the initial, intermediate and final housekeeping steps of the COMMIT routine in FIG. 34. Flow chart 3500 shown in FIG. 35A corresponds to the initial housekeeping; flow chart 3520 shown in FIG. 35B corresponds to the intermediate housekeeping; and flow chart 3540 shown in FIG. 35C corresponds to the final housekeeping.

In the initial housekeeping procedure, the first step is to delete obsolete version blocks and switch blocks (Step 3505). A version block is obsolete when it is not the most recent version and when, as indicated by version user count field 3120, there are no current users. A deletion occurs by unlinking these switch blocks and version blocks and by placing the memory corresponding to these unlinked blocks onto the list of free blocks.

The size of master data file 2900 is then compared to the size of snapshot data file 2910. If new macropages were added to master data file 2900 making it larger than the snapshot file 2910, then snapshot data file 2910 must be increased accordingly (Step 3510). When this occurs, the added macropages to the snapshot file are also put on the list of natural slots for the corresponding macropages added to the master data file.

In the intermediate housekeeping, shown in flow chart 3520, the first step is to evict all squatters (Step 3525). A squatter is a macropage which is in the natural slot for another existing macropage. Thus, if the natural slot for macropage 3 (in other words slot number 3) has a macropage not equal to 3, then that macropage is moved somewhere else in snapshot data file 2510.

Next, the macropage corresponding to the vacant natural slots are moved into those natural slots (Step 3630). In our example, the most recent version of the macropage number 3 is then found and inserted back into its natural slot.

In the final housekeeping, the only actions that occur are the deletion of obsolete versions and switch blocks (Step 3545).

Figure 36:
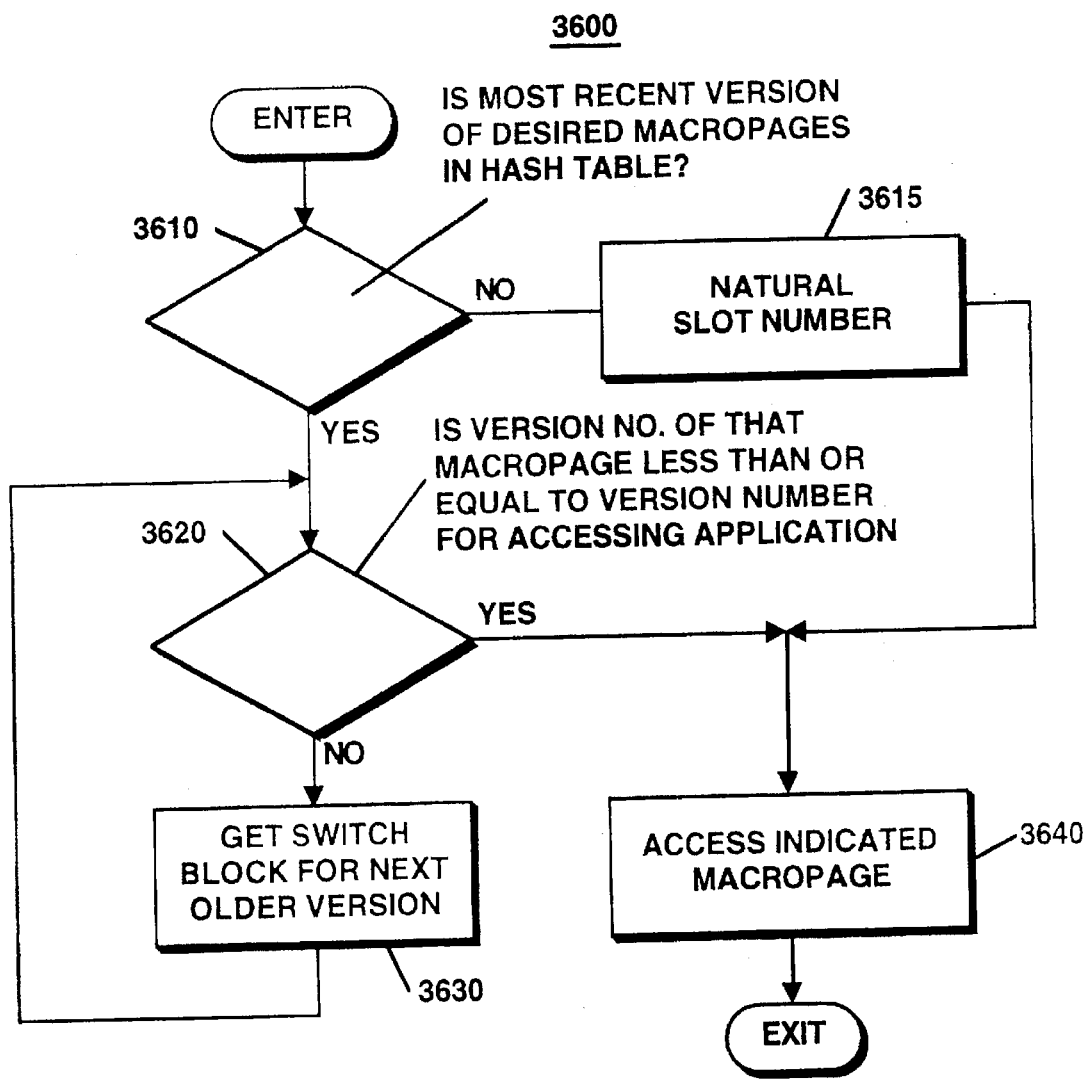
FIG. 36 shows a preferred embodiment of a flow chart for accessing the desired version of common data structure 140' in accordance with the present invention.

FIG. 36 shows a preferred embodiment of a flow chart 3600 for accessing a desired version of a macropage. In the first step, the HASH table is searched to determine the location of the most recent version of the desired macropage (Step 3610). Next, if the HASH table indicates a location for the macropage, the version number of that macropage is tested to see if it is less than or equal to the desired version number (Step 3620). This is necessary because an application already operating with one version must continue to access the same version for all the other macropages. While accessing one macropage, however, several other versions may have been completed, so the current version may not be the appropriate version.

If the version number of the macropage currently accessed is larger than the version number for the application, then the switch block pointer is accessed to find the next older version macropage, in the same test as made (Step 3630). Once the proper version is found, then the switch block for the desired macropage is used to point to the location in the snapshot file 2910 for that macropage (Step 3640).

If the entry is not found in the HASH table (Step 3610), then the macropage number itself is used as the macropage's slot number to access the macropage (Step 3640). The routine is then exited.

G. Summary

It should be apparent to those skilled in the art that various modifications may be made to this invention without departing from the scope or spirit of the invention. Thus, it is intended that the invention cover modifications and variations of the invention, provided they come within the scope of the appended claims and their legally entitled equivalents.

What is claimed:

1. A memory for storing data for access by an application program being executed on a data processing system, comprising:
    a data structure stored in said memory, said data structure including information resident in a database used by said application program and including:
    a plurality of attribute data objects stored in said memory, each of said attribute data objects containing different information from said database;
    a single holder attribute data object for each of said attribute data objects, each of said holder attribute data objects being one of said plurality of attribute data objects, a being-held relationship existing between each attribute data object and its holder attribute data object, and each of said attribute data objects having a being-held relationship with only a single other attribute data object, thereby establishing a hierarchy of said plurality of attribute data objects;
    a referent attribute data object for at least one of said attribute data objects, said referent attribute data object being nonhierarchically related to a holder attribute data object for the same at least one of said attribute data objects and also being one of said plurality of attribute data objects, attribute data objects for which there exist only holder attribute data objects being called element data objects, and attribute data objects for which there also exist referent attribute data objects being called relation data objects; and
    an apex data object stored in said memory and having no being-held relationship with any of said attribute data objects, however, at least one of said attribute data objects having a being-held relationship with said apex data object.

2. The memory of claim 1 wherein more than one of said attribute data objects can have a being-held relationship with another one of said attribute data objects.

3. The memory of claim 1 wherein at least one of said attribute data objects is a referent attribute data object for a plurality of said attribute data objects.

4. The memory of claim 1 wherein at least one of said attribute data objects includes type data descriptive of a relationship between that at least one of said attribute data objects and the other ones of said attribute data objects having a being-held relationship with that one attribute data object.

5. The memory of claim 1 wherein at least one of said relation data objects includes type data descriptive of a relationship between that at least the one of said relation data objects and the referent attribute data object of that one relation data object.

6. A data processing system executing an application program and containing a database used by said application program, said data processing system comprising:
    cpu means for processing said application program; and
    memory means for holding a data structure for access by said application program, said data structure being composed of information resident in said database used by said application program and including
    a plurality of attribute data objects stored in said memory, each of said attribute data objects representing different information from said database;
    a single holder attribute data object for each of said attribute data objects, each of said holder attribute data objects being one of said plurality of attribute data objects, a being-held relationship existing between each attribute data object and its holder attribute data object, and each of said attribute data objects having a being-held relationship with only a single other attribute data object thereby establishing a hierarchy of said plurality of attribute data objects;
    a referent attribute data object for at least one of said attribute data objects, said referent attribute data object being nonhierarchically related to a holder attribute data object of the same at least one of said attribute data objects and also being one of said plurality of attribute data objects, attribute data objects for which there exist only holder attribute data objects being called element data objects, and attribute data objects for which there also exist referent attribute data objects being called relation data objects; and
    an apex data object stored in said memory and having no being-held relationship with any of said attribute data objects, however, at least one of said attribute data objects having a being-held relationship with said apex data object.

7. The data processing system of claim 6 wherein more than one of said attribute data objects can have a being-held relationship with another one of said attribute data objects.

8. The data processing system of claim 6 wherein at least one of said attribute data objects is a referent attribute data object for a plurality of attribute data objects.

9. The data processing system of claim 6 wherein at least one of said attribute data objects includes type data descriptive of a relationship between that at least one of said attribute data objects and the other ones of said attribute data objects having a being-held relationship with that one attribute data object.

10. The data processing system of claim 6 wherein at least one of said relation data objects includes type data descriptive of a relationship between that at least one of said relation data objects and the referent attribute data object of that one relation data object.

11. The data processing system of claim 6 further including means for retrieving from said data structure the ones of said attribute data objects having a being-held relationship with a specified attribute data object, in response to a request for access from said application program.

12. The data processing system of claim 6 further including means for retrieving from said data structure the ones of said referent attribute data objects for a specified relation data object, in response to a request for access from said application program.

13. The data processing system of claim 6 further including means for creating a new attribute data object in said data structure from one of said attribute data objects which is the holding data object for the new attribute data object.

14. The data processing system of claim 13 wherein said means for creating a new attribute data object also includes means for creating that new attribute data object as one of said relation data objects from a referent attribute data object for the new relation data object.

15. The data processing system of claim 9 further including means for retrieving from said data structure each of said attribute data objects having type data that are the same, in response to a request for access from said application program.

16. The data processing system of claim 9 further including means for retrieving from said data structure the type data from a specified attribute data object, in response to a request for access from said application program.

17. The data processing system of claim 6 further including means for removing from said data structure a specified attribute data object, in response to a request for access from said application program.

18. The data processing system of claim 17 wherein said means for removing also includes means for removing from said data structure all attribute data objects which have a being-held relationship with said specified attribute data object and all attribute data objects which have a being-held relationship with any attribute data object removed from said data structure by said removing means.

19. The data processing system of claim 6 wherein said cpu means executes a plurality of application programs, and wherein said data structure is a common data structure for access by all of said application programs and composed of information resident in databases used by said application programs.

20. In a data processing system executing an application program, wherein said application program is accessing a data structure composed of information resident in a database used by said application program, wherein said data structure resides in a memory of said data processing system and includes a plurality of attribute data objects each representing different information from said database, wherein for each of said attribute data objects there exists a holder attribute data object and for certain of said attribute data objects there also exists a referent attribute data object related to a holder attribute data object for that attribute data object, each of said holder and referent attribute data objects being one of said plurality of attribute data objects, and wherein each of said plurality of attribute data objects has a being-held relationship with its holder attribute data object thereby establishing a hierarchy of said plurality of attribute data objects, a method of accessing attribute data objects in said data structure comprising the steps of:

selecting, by said application program, information resident in said database;

searching, by a data management program executed by said data processing system, said data structure for one of said attribute data objects representing said selected information;

retrieving, by said data management program, the attribute data objects having a being-held relationship with said one of said attribute data objects representing said selected information; and transmitting to said application program by said data management program, information related to said retrieved attribute data objects.

21. In a data processing system executing an application program, wherein said application program is accessing a data structure composed of information resident in a database used by said application program, wherein said data structure resides in a memory of said data processing system and includes a plurality of attribute data objects each representing different information from said database, wherein for each of said attribute data objects there exists a holder attribute data object and for certain of said plurality of attribute data objects there also exists a referent attribute data object related to a holder attribute data object for that attribute data object, each of said holder and referent attribute data objects being one of said plurality of attribute data objects, and wherein each of said attribute data objects has a being-held relationship with its holder attribute data object thereby establishing a hierarchy of said plurality of attribute data objects, a method of accessing attribute data objects in said data structure comprising the steps of:

selecting, by said application program, information resident in said database;

searching, by a data management program executed by said data processing system, said data structure for one of said attribute data objects representing said selected information;

retrieving, by said data management program, a referent attribute data object for said attribute data object representing said selected information; and transmitting to said application program by said data management program, information related to said retrieved referent attribute data object.

22. In a data processing system executing an application program, wherein said application program is accessing a data structure composed of information resident in a database used by said application program, wherein said data structure resides in a memory of said data processing system and includes a plurality of attribute data objects each representing different information from said database, wherein for each of said attribute data objects there exists a holder attribute data object and for certain of said attribute data objects there also exists a referent attribute data object related to a holder attribute data object for that attribute data object, each of said holder and referent attribute data objects being one of said plurality of attribute data objects, and wherein each of said attribute data objects has a being-held relationship with its holder attribute data object thereby establishing a hierarchy of said plurality of attribute data objects, a method of creating attribute data objects in said data structure comprising the steps of:

selecting, by said application program, information to be entered into said database;

creating, by a data management program executed by said data processing system, an attribute data object for said selected information;

choosing, by said data management program, one of said attribute data objects as a holder attribute data object for said created attribute data object, the chosen holder attribute data object being chosen according to said selected information; and entering, by said data management program, the created data object into said data structure.

23. The method of claim 22 further including the step of choosing a referent attribute data object for said created attribute data object from said data structure, said chosen referent attribute data object being chosen according to said selected information.

24. A method for creating a data structure for access by an application program, said application program being executed by a data processor which also creates said data structure in a memory coupled to the data processor, said data structure being created from application data originating in said application program, and said method comprising the steps, executed by said data processor, of:

(a) creating a different one of a plurality of attribute data objects from said application data;

(b) organizing said plurality of attribute data objects hierarchically according to a being-held relationship by choosing from said plurality of attribute data objects for each of said attribute data objects, a holder data object, a hierarchical being-held relationship existing between each attribute data object and a single holder data object;

(c) establishing nonhierarchical relationships for certain ones of said attribute data objects created from said application data by choosing, from said attribute data objects, referent data objects for the ones of said selected attribute data objects, each chosen referent data object corresponding to one of said attribute data objects, said selected attribute data objects being called relation data objects and attribute data objects without referent data being called element data objects;

(d) creating an apex data object with which at least one of said attribute data objects has a being-held relationship, said apex data object having no being-held relationship with any of said attribute data objects;

(e) creating an attribute file for said attribute data objects;

(f) entering each of said attribute data objects into said attribute file;

(g) entering holding pointers for each of said attribute data objects, each of said holding pointers indicating one of said attribute data objects having a being-held relationship with that attribute data object; and (h) entering referent pointers into said attribute file, said referent pointers reflecting said nonhierarchical relationships between said attribute data objects.

25. In a data processing system including a central processor and a memory, said memory containing a data structure with a plurality of attribute data objects each having hierarchical being-held relationships with a single other one of said attribute data objects or with an apex, wherein certain ones of said attribute data objects have non-hierarchical relationships with others of said attribute data objects, and wherein each of said attribute data objects has an associated memory area including pointers to memory areas for other ones of said attribute data objects which have a being-held relationship with that attribute data object, a method for adding new attribute data objects to said data structure comprising the steps, executed by said central processor, of:

creating a memory area for said new attribute data object;

choosing, as a holder attribute data object, one of said attribute data objects, said new attribute data object having a being-held relationship with the chosen one of said attribute data objects;

adding in the memory area for said holder attribute data object, a pointer to the memory area of said new attribute data object; and linking said new attribute data object with other ones of said attribute data objects having a being-held relationship with said holder attribute data object.

26. In a data processing system including a central processor and a memory, said memory containing a data structure with a plurality of attribute data objects each having hierarchical being-held relationships with a single other one of said attribute data objects or with an apex, wherein certain ones of said attribute data objects have non-hierarchical relationships with others of said attribute data objects, and wherein each of said attribute data objects has an associated memory area, a method for creating a non-hierarchical relationship between one of said attribute data objects and a referent one of said attribute data objects comprising the steps, executed by said central processor, of:

determining a location of said referent attribute data object;

accessing the memory area for the one of said attribute data objects; and placing a pointer to said referent attribute data object location in said memory area of the one of said attribute data objects.

27. The method according to claim 26 wherein said non-hierarchical relationship is one of a predetermined type of relationships, wherein said memory includes a type area identifying said types of non-hierarchical relationships and identifying where in a memory area for said attribute data objects to find pointers to referent attribute data objects having said predetermined type of relationship to said attribute data objects, and wherein the step of placing a pointer includes the substeps of determining the one of a predetermined type of said non-hierarchical relationship;

finding, in said type area, a location in said memory area for relationships of the type of said desired non-hierarchical relationship; and placing said pointer into said memory area of said given attribute data object found for said desired non-hierarchical relationship type.

28. In a data processing system including a central processor and a memory, said memory containing a data structure with a plurality of attribute data objects each having hierarchical being held relationships with a single holder one of said attribute data objects or with an apex, wherein certain ones of said attribute data objects have non-hierarchical relationships with others of said attribute data objects, and wherein each of said attribute data objects has an associated memory area containing sequence pointers to ones of said attribute data elements having a being-held relationship with a single holder one of said attribute data objects, a holder pointer to said single holder one of said attribute data objects, and referent pointers to any of said attribute data objects with which that attribute data object has a non-hierarchical relationship, a method for erasing a memory area for one of said attribute data objects comprising the steps, executed by said central processor, of:

locating said memory area for the one of said attribute data objects;

erasing from said memory area for the one of said attribute data objects any referent pointers to any of the ones of said attribute data objects with which the one of said attribute data objects has a non-hierarchical relationship;

locating the memory area for said holder attribute data object;

erasing from said memory area for the one of said attribute data objects said holder pointer for the one of said attribute data objects;

adjusting said sequence pointers in said memory area for the one of said attribute data objects to remove any pointers to the one of said attribute data objects; and erasing the memory area for all containment tree ones of said attribute data objects which have a being-held relationship with the one of said attribute data objects or which have a being-held relationship with another one of said containment tree attribute data objects.

29. In a data processing system including a central processor and a memory, said memory containing a data structure with a plurality of attribute data objects each having hierarchical being-held relationships with a single other one of said attribute data objects or with an apex, wherein certain ones of said attribute data objects have non-hierarchical relationships with referent ones of said attribute data objects, and wherein each of said attribute data objects has an associated memory area containing referent pointers to any of said attribute data objects with which that attribute data object has a non-hierarchical relationship, said associated memory area for each of said referent attribute data objects containing a non-hierarchical relationship pointer to that attribute data object having a non-hierarchical relationship with that referent attribute object, a method for erasing a desired non-hierarchical relationship between one of said attribute data objects and a referent one of said attribute data objects comprising the steps, executed by said central processor, of:

locating the memory area for the one of said attribute data objects;

locating the referent pointer to said referent attribute data object in the memory area for the one of said attribute data objects;

locating said referent attribute data object using said referent pointer;

locating the non-hierarchical relationship pointer to the one of said attribute data objects in the memory area for said referent attribute data object;

erasing said non-hierarchical relationship pointers; and erasing said referent pointer.

* * * * *